United States Patent
Egami et al.

(10) Patent No.: US 12,397,367 B2
(45) Date of Patent: Aug. 26, 2025

(54) PROCESSING SYSTEM AND PROCESSING METHOD

(71) Applicant: NIKON CORPORATION, Tokyo (JP)

(72) Inventors: Shigeki Egami, Tokyo (JP); Yosuke Tatsuzaki, Kumagaya (JP)

(73) Assignee: NIKON CORPORATION, Tokyo (JP)

(*) Notice: Subject to any disclaimer, the term of this patent is extended or adjusted under 35 U.S.C. 154(b) by 801 days.

(21) Appl. No.: 17/286,502

(22) PCT Filed: Oct. 31, 2019

(86) PCT No.: PCT/JP2019/042736
§ 371 (c)(1),
(2) Date: May 21, 2021

(87) PCT Pub. No.: WO2020/090962
PCT Pub. Date: May 7, 2020

(65) Prior Publication Data
US 2021/0379693 A1    Dec. 9, 2021

(30) Foreign Application Priority Data

Oct. 31, 2018 (WO) .................. PCT/JP2018/040626

(51) Int. Cl.
*B23K 26/03* (2006.01)
*B23K 26/04* (2014.01)
(Continued)

(52) U.S. Cl.
CPC .............. *B23K 26/03* (2013.01); *B23K 26/04* (2013.01); *B23K 26/0853* (2013.01); *B23K 26/50* (2015.10)

(58) Field of Classification Search
CPC ....................................................... B23K 26/50
See application file for complete search history.

(56) References Cited

U.S. PATENT DOCUMENTS 8,378,252 B2 *  2/2013  Alpay ................. B23K 26/042
                                                    257/797
2002/0017509 A1  2/2002  Ishide et al.
(Continued)

FOREIGN PATENT DOCUMENTS

DE   102015012565 B3 * 10/2016
JP   H10-15684 A      1/1998
(Continued)

OTHER PUBLICATIONS

DE102015012565B3 (Lessmuller, Eckhard) Oct. 27, 2016 [retrieved on Dec. 16, 2023]. Retrieved from Espacenet Database, translation by EPO and Google. (Year: 2016).*
(Continued)

*Primary Examiner* — Ibrahime A Abraham
*Assistant Examiner* — Franklin Jefferson Wang
(74) *Attorney, Agent, or Firm* — Oliff PLC

(57) ABSTRACT

A processing system has: an irradiation optical system irradiating an object with an energy beam from a light source; an object placing apparatus on which the object is placed; a light receiving apparatus that is disposed at the object placing apparatus and that optically receives the energy beam from the irradiation optical system; and a measurement apparatus that measures at least one of the light receiving apparatus and a part that is related to the light receiving apparatus. The processing system moves the object placing apparatus to a position at which the light receiving apparatus optically receives the energy beam and moves the object placing apparatus to a position at which the measurement apparatus measures a position of the light receiving apparatus.

39 Claims, 40 Drawing Sheets

(51) Int. Cl.
*B23K 26/08* (2014.01)
*B23K 26/50* (2014.01)

(56) References Cited

U.S. PATENT DOCUMENTS

| | | | | |
|---|---|---|---|---|
| 2003/0038121 | A1* | 2/2003 | Christensen | B23K 26/04 |
| | | | | 219/121.68 |
| 2005/0205778 | A1* | 9/2005 | Kitai | B23K 26/364 |
| | | | | 250/309 |
| 2007/0225692 | A1* | 9/2007 | Somani | G01J 1/4257 |
| | | | | 250/252.1 |
| 2008/0318395 | A1* | 12/2008 | Farnworth | H01L 22/20 |
| | | | | 257/E21.702 |
| 2010/0326962 | A1* | 12/2010 | Calla | B23K 26/0344 |
| | | | | 219/76.1 |
| 2017/0297107 | A1 | 10/2017 | Oka et al. | |
| 2017/0361399 | A1* | 12/2017 | Toyama | B23K 26/0853 |
| 2018/0029159 | A1* | 2/2018 | Toyama | B23K 26/042 |

FOREIGN PATENT DOCUMENTS

| | | | |
|---|---|---|---|
| JP | H11-5185 A | | 1/1999 |
| JP | 2001-044136 A | | 2/2001 |
| JP | 2002-347128 A | | 12/2002 |
| JP | 2006337873 A | * | 12/2006 |
| JP | 5383920 B2 | | 1/2014 |
| JP | 2016-212521 A | | 12/2016 |
| JP | 2016-216773 A | | 12/2016 |
| JP | 2017-190505 A | | 10/2017 |

OTHER PUBLICATIONS

Claus Bagger "Focal point position optimization with neural networks in CO2 laser welding", 1997, Technical University of Denmark (Year: 1997).*
JP-2006337873-A (Fukui Takashi) Dec. 14, 2006 [retrieved on Aug. 6, 2024]. Retrieved from Espacenet Database, translation by EPO and Google. (Year: 2006).*
Sep. 27, 2022 Office Action issued in Japanese Patent Application No. 2020-554701.
Nov. 22, 2022 Office Action issued in Chinese Patent Application No. 201980071312.2.
Nov. 16, 2022 Extended European Search Report Issued in European Patent Application No. 19880538.4.
Jan. 28, 2020 Written Opinion issued in International Patent Application No. PCT/JP2019/042736.
May 23, 2023 Office Action issued in Japanese Patent Application No. 2020-554025.
Nov. 14, 2023 Office Action issued in Japanese Patent Application No. 2023-025263.
May 14, 2024 Office Action issued in Japanese Patent Application No. 2023-025263.
Jul. 18, 2025 Office Action issued in European Patent Application No. 19 880 538.4.

* cited by examiner

AREA AT WHICH REMOVABL PROCESSING OF LAYERED STRUCTURAL PART SL#1 IS PERFORMED

AREA AT WHICH REMOVABL PROCESSING OF LAYERED STRUCTURAL PART SL#2 IS PERFORMED

AREA AT WHICH REMOVABL PROCESSING OF LAYERED STRUCTURAL PART SL#3 IS PERFORMED

AREA AT WHICH REMOVABL PROCESSING OF LAYERED STRUCTURAL PART SL#N IS PERFORMED

PROCESSING SYSTEM AND PROCESSING METHOD

TECHNICAL FIELD

The present invention relates to a processing system and a processing method that are configured to process an object.

BACKGROUND ART

A Patent Literature 1 discloses a processing apparatus that is configured to process an object by irradiating the object with a laser light. In a technical field such as the processing of the object, it is desirable to improve a convenience and a performance of the processing of the object.

CITATION LIST

Patent Literature

Patent Literature 1: US2002/0017509A1

SUMMARY OF INVENTION

A first aspect provides a processing system that is provided with: an irradiation optical system that irradiates an object with an energy beam from a light source; an object placing apparatus on which the object is placed; a light receiving apparatus that is disposed at the object placing apparatus and that optically receives the energy beam from the irradiation optical system; a measurement apparatus that measures a position of at least one of the light receiving apparatus and a part that is related to the light receiving apparatus; a movement apparatus that moves the object placing apparatus; and a control apparatus that controls at least the movement apparatus, wherein the control apparatus: controls the movement apparatus to move the object placing apparatus to a position at which the light receiving apparatus is allowed to optically receive the energy beam from the irradiation optical system and moves the object placing apparatus to a position at which the measurement apparatus is allowed to measure the at least one; and controls at least one of a position of the object placing apparatus at a time of the irradiation by the irradiation optical system and a position of the object placing apparatus at a time of the measurement by the measurement apparatus by using first information relating to a position of the object placing apparatus when the light receiving apparatus optically receives the energy beam and second information relating to a position of the object placing apparatus when the measurement apparatus measures the at least one.

A second aspect provides a processing system that is provided with: an irradiation optical system that irradiates an object with an energy beam from a light source; an object placing apparatus on which the object is placed; a light receiving apparatus that is disposed at the object placing apparatus and that optically receives the energy beam from the irradiation optical system; a measurement apparatus that measures at least one of the light receiving apparatus and a part that is related to the light receiving apparatus; a movement apparatus that moves the irradiation optical system and the measurement apparatus; and a control apparatus that controls at least the movement apparatus, wherein the control apparatus: controls the movement apparatus to move the irradiation optical system to a position at which the light receiving apparatus is allowed to optically receive the energy beam from the irradiation optical system and moves the measurement apparatus to a position at which the measurement apparatus is allowed to measure the at least one; and controls at least one of a position of the object placing apparatus at a time of the irradiation by the irradiation optical system and a position of the object placing apparatus at a time of the measurement by the measurement apparatus by using first information relating to a position of the irradiation optical system in a plane along which the irradiation optical system moves when the light receiving apparatus optically receives the energy beam and second information relating to a position of the measurement apparatus in the plane along which the irradiation optical system moves when the measurement apparatus measures the at least one.

A third aspect provides a processing system that is provided with: an irradiation optical system that irradiates an object with an energy beam from a light source; an object placing apparatus on which the object is placed; a light receiving apparatus that is disposed at the object placing apparatus and that optically receives the energy beam from the irradiation optical system; a measurement apparatus that measures a position of at least one of the light receiving apparatus and a part that is related to the light receiving apparatus; a movement apparatus that moves the object placing apparatus; and a control apparatus that controls at least the movement apparatus, wherein the control apparatus: controls the movement apparatus to move the object placing apparatus to a position at which the light receiving apparatus is allowed to optically receive the energy beam from the irradiation optical system and moves the object placing apparatus to a position at which the measurement apparatus is allowed to measure the at least one; and calculates a positional relationship between an irradiation position of the energy beam and a measured position of the object by using first information relating to a position of the object placing apparatus when the light receiving apparatus optically receives the energy beam and second information relating to a position of the object placing apparatus when the measurement apparatus measures the at least one.

A fourth aspect provides a processing system that is provided with: an irradiation optical system that irradiates an object with an energy beam from a light source; an object placing apparatus on which the object is placed; a light receiving apparatus that is disposed at the object placing apparatus and that optically receives the energy beam from the irradiation optical system; a measurement apparatus that measures at least one of the light receiving apparatus and a part of a related object that is related to the light receiving apparatus; a movement apparatus that moves the irradiation optical system and the measurement apparatus; and a control apparatus that controls at least the movement apparatus, wherein the control apparatus: controls the movement apparatus to move the irradiation optical system to a position at which the light receiving apparatus is allowed to optically receive the energy beam from the irradiation optical system and moves the measurement apparatus to a position at which the measurement apparatus is allowed to measure the at least one; and calculates a positional relationship between an irradiation position of the energy beam and a measurement area of the measurement apparatus by using first information relating to a position of the irradiation optical system in a plane along which the irradiation optical system moves when the light receiving apparatus optically receives the energy beam and second information relating to a position of the measurement apparatus in the plane along which the irradiation optical system moves when the measurement apparatus measures the at least one.

A fifth aspect provides a processing system that is provided with: an irradiation optical system that emits an energy beam from a light source toward a beam irradiation surface; a light receiving apparatus that moves in a direction along the beam irradiation surface or a plane parallel to the beam irradiation surface and that optically receives the energy beam from the irradiation optical system through a light passing part; and a calculation apparatus that calculates an intensity distribution of the energy beam on the beam irradiation surface by using an output from the light receiving apparatus, wherein the light receiving apparatus optically receives the energy beam while changing a position thereof in the beam irradiation surface or the plane parallel to the beam irradiation surface.

A sixth aspect provides a processing system that is provided with: an irradiation optical system that emits an energy beam from a light source toward a first irradiation position and a second irradiation position that is different from the first irradiation position in a beam irradiation surface; an object placing apparatus on which the object is placed; a position measurement apparatus that measures a position of the object placing apparatus; a light receiving apparatus that is disposed at the object placing apparatus and that optically receives the energy beam from the irradiation optical system; and a movement apparatus that moves the object placing apparatus so that the light receiving apparatus optically receives the energy beam emitted toward the first irradiation position and the light receiving apparatus optically receives the energy beam emitted toward the second irradiation position, wherein the position measurement apparatus measures the position of the object placing apparatus when the light receiving apparatus optically receives the energy beams emitted toward the first and second irradiation positions.

A seventh aspect provides a processing system that is provided with: an irradiation optical system that emits an energy beam from a light source; an object placing apparatus on which an object, which is irradiated with the energy beam from the irradiation optical system, is placed; a light receiving apparatus that optically receives the energy beam from the irradiation optical system; and a measurement apparatus that measures at least one of the light receiving apparatus and a part that is related to the light receiving apparatus.

An eighth aspect provides a processing system that is provided with: an irradiation optical system that emits an energy beam from a light source; an object placing apparatus on which an object, which is irradiated with the energy beam from the irradiation optical system, is placed; a light receiving apparatus that is disposed at the object placing apparatus and that optically receives the energy beam from the irradiation optical system; a measurement apparatus that measures at least one of the light receiving apparatus and a part that is related to the light receiving apparatus; and a movement apparatus that moves the object placing apparatus so that at least one of the light receiving apparatus and a part of a related object that is related to the light receiving apparatus is located at a measurement position of the measurement apparatus and the light receiving apparatus is located at an irradiation position of the energy beam from the irradiation optical system.

A ninth aspect provides a processing method including: irradiating an object, which is placed on an object placing apparatus, with an energy beam from a light source; optically receiving the energy beam from the irradiation optical system by using a light receiving apparatus that is disposed at the object placing apparatus; a measuring the object that is placed on the object placing apparatus; moving the object placing apparatus to a position at which the light receiving apparatus is allowed to optically receive the energy beam from the irradiation optical system; moving the object placing apparatus to a position at which the measurement apparatus is allowed to measure the light receiving apparatus; and controlling at least one of a position of the object placing apparatus at a time of the processing by processing apparatus and a position of the object placing apparatus at a time of the measurement by the measurement apparatus by using first information relating to a position of the object placing apparatus when the light receiving apparatus optically receives the energy beam and second information relating to a position of the object placing apparatus when the measurement apparatus measures at least a part of the light receiving apparatus.

A tenth aspect provides a processing method including: irradiating an object, which is placed on an object placing apparatus, with an energy beam from a light source; optically receiving the energy beam from the irradiation optical system by using a light receiving apparatus that is disposed at the object placing apparatus; a measuring the object that is placed on the object placing apparatus; moving the object placing apparatus to a position at which the light receiving apparatus is allowed to optically receive the energy beam from the irradiation optical system; moving the object placing apparatus to a position at which the measurement apparatus is allowed to measure the light receiving apparatus; and controlling at least one of a position of the object placing apparatus at a time of the processing by processing apparatus and a position of the object placing apparatus at a time of the measurement by the measurement apparatus by using first information relating to a position of the irradiation optical system in a plane along which the irradiation optical system moves when the light receiving apparatus optically receives the energy beam and second information relating to a position of the measurement apparatus in the plane along which the irradiation optical system moves when the measurement apparatus measures at least a part of the light receiving apparatus.

An eleventh aspect provides a processing method including: irradiating an object, which is placed on an object placing apparatus, with an energy beam from a light source; optically receiving the energy beam from the irradiation optical system by using a light receiving apparatus that is disposed at the object placing apparatus; a measuring the object that is placed on the object placing apparatus; moving the object placing apparatus to a position at which the light receiving apparatus is allowed to optically receive the energy beam from the irradiation optical system; moving the object placing apparatus to a position at which the measurement apparatus is allowed to measure the light receiving apparatus; and calculating a positional relationship between an irradiation position of the energy beam and a measured position of the object by using first information relating to a position of the object placing apparatus when the light receiving apparatus optically receives the energy beam and second information relating to a position of the object placing apparatus when the measurement apparatus measures at least a part of the light receiving apparatus.

A twelfth aspect provides a processing method including: irradiating an object, which is placed on an object placing apparatus, with an energy beam from a light source; optically receiving the energy beam from the irradiation optical system by using a light receiving apparatus that is disposed at the object placing apparatus; a measuring the object that is placed on the object placing apparatus; moving the object placing apparatus to a position at which the light receiving apparatus is allowed to optically receive the energy beam from the irradiation optical system; moving the object placing apparatus to a position at which the measurement apparatus is allowed to measure the light receiving apparatus; and calculating a positional relationship between an irradiation position of the energy beam and a measurement area of the measurement apparatus by using first information relating to a position of the irradiation optical system in a plane along which the irradiation optical system moves when the light receiving apparatus optically receives the energy beam and second information relating to a position of the measurement apparatus in the plane along which the irradiation optical system moves when the measurement apparatus measures the at least one.

A thirteenth aspect provides a processing method including: emitting an energy beam from a light source toward a beam irradiation surface; optically receiving the energy beam from the irradiation optical system through a light passing part of a light receiving apparatus by using the light receiving apparatus that moves in a direction along the beam irradiation surface or a plane parallel to the beam irradiation surface; and calculating an intensity distribution of the energy beam on the beam irradiation surface by using an output from the light receiving apparatus, wherein the optically receiving includes optically receiving the energy beam while changing a position the light passing part in the beam irradiation surface or the plane parallel to the beam irradiation surface.

A fourteenth aspect provides a processing method including: emitting an energy beam from a light source toward a first irradiation position and a second irradiation position that is different from the first irradiation position in a beam irradiation surface; measuring a position of an object placing apparatus on which the object is placed; optically receiving the energy beam emitted toward the first irradiation position by using a light receiving apparatus that is disposed at the object placing apparatus; optically receiving the energy beam emitted toward the second irradiation position by using the light receiving apparatus that is disposed at the object placing apparatus; and measuring the position of the object placing apparatus when the light receiving apparatus optically receives the energy beams emitted toward the first and second irradiation positions by using the position measurement apparatus.

A fifteenth aspect provides a processing method including: emitting an energy beam from a light source; optically receiving the emitted energy beam by a light receiving apparatus; and measuring at least one of the light receiving apparatus and a part that is related to the light receiving apparatus.

A seventeenth aspect provides a processing method including: emitting an energy beam from a light source; placing an object, which is irradiated with the energy beam from the irradiation optical system, on an object placing apparatus; optically receiving the energy beam from the irradiation optical system by a light receiving apparatus; measuring at least one of the light receiving apparatus and a part that is related to the light receiving apparatus by a measurement apparatus; and moving the object placing apparatus so that at least one of the light receiving apparatus and a part that is related to the light receiving apparatus is located at a position which is measurable by the measurement apparatus and the light receiving apparatus is located at an irradiation position of the emitted energy beam.

An operation and another advantage of the present invention will be apparent from an embodiment described below.

Figure 2A:
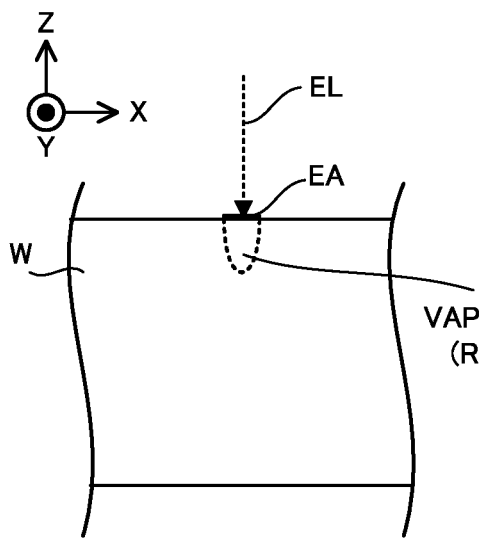
Figure 2B:
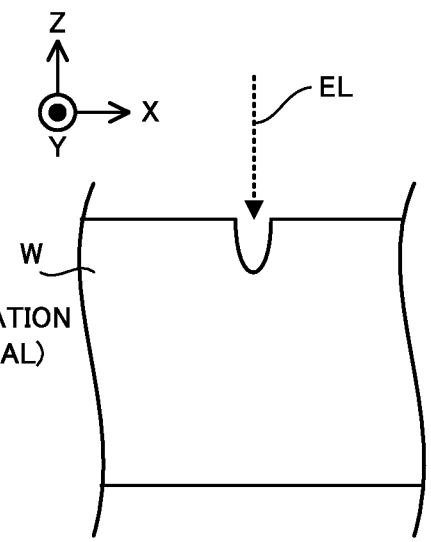
Figure 2C:
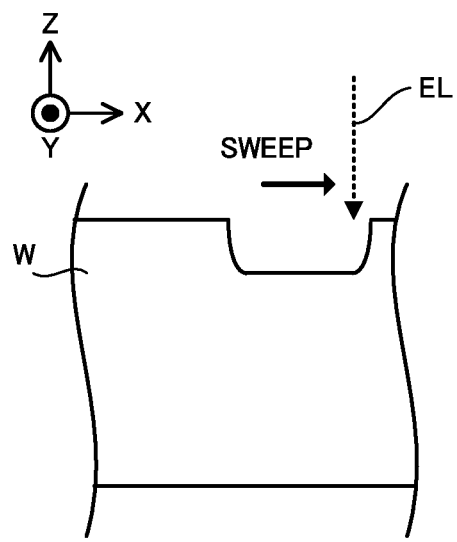

Each of FIG. 2A to FIG. 2C is a cross-sectional view that illustrates an aspect of a removal processing performed on a workpiece.

Figure 3A:
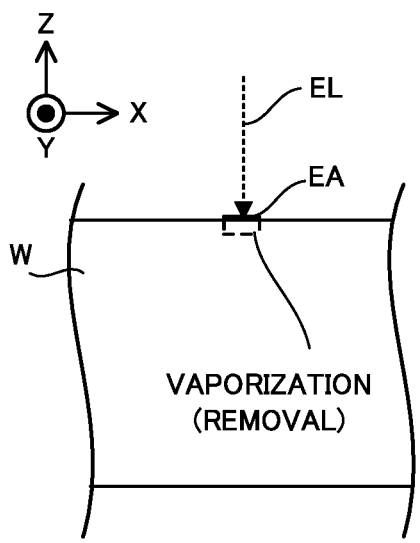
Figure 3B:
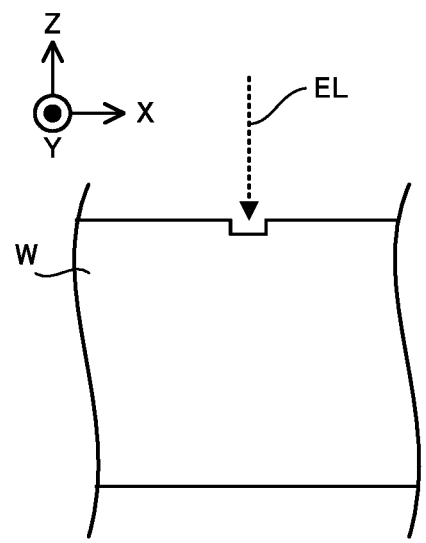
Figure 3C:
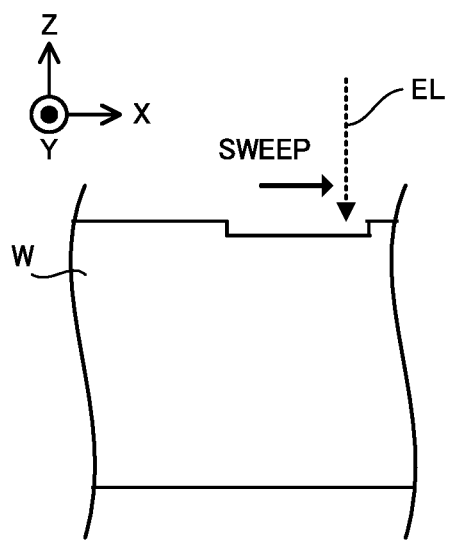

Each of FIG. 3A to FIG. 3C is a cross-sectional view that illustrates an aspect of the workpiece that is non-thermally processed.

Figure 4:
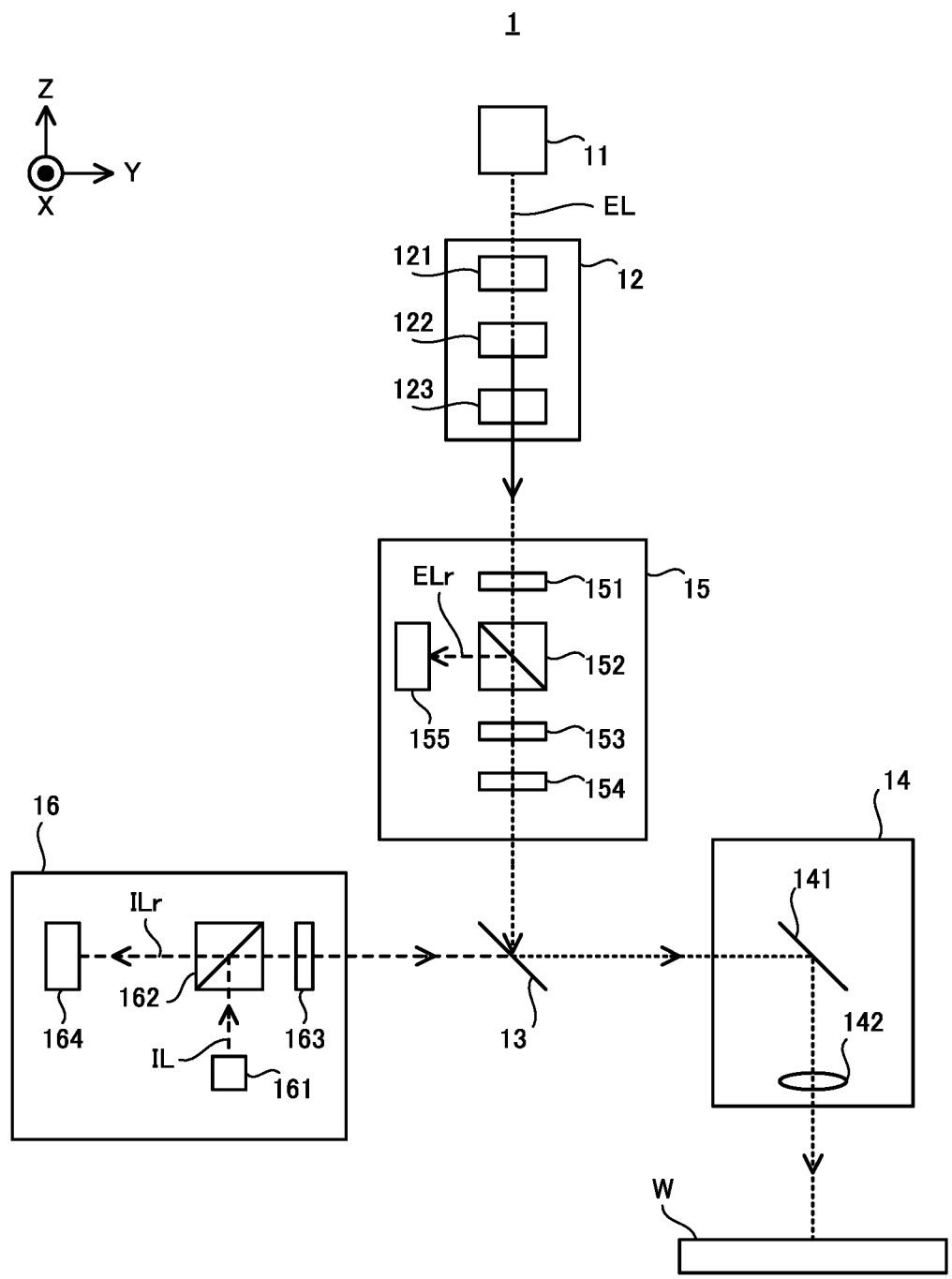

FIG. 4 is a cross-sectional view that illustrates a structure of a processing apparatus.

Figure 5:
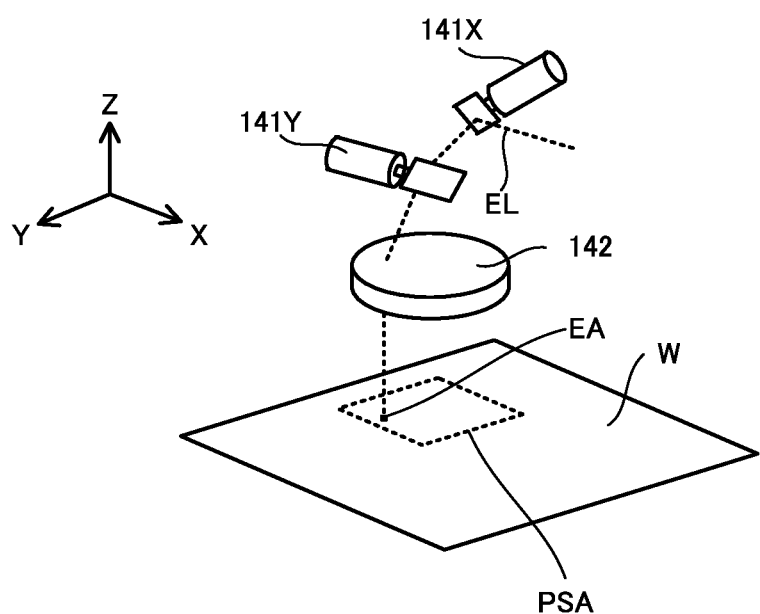

FIG. 5 is a perspective view that illustrates a structure of an optical system of the processing apparatus.

Figure 6:
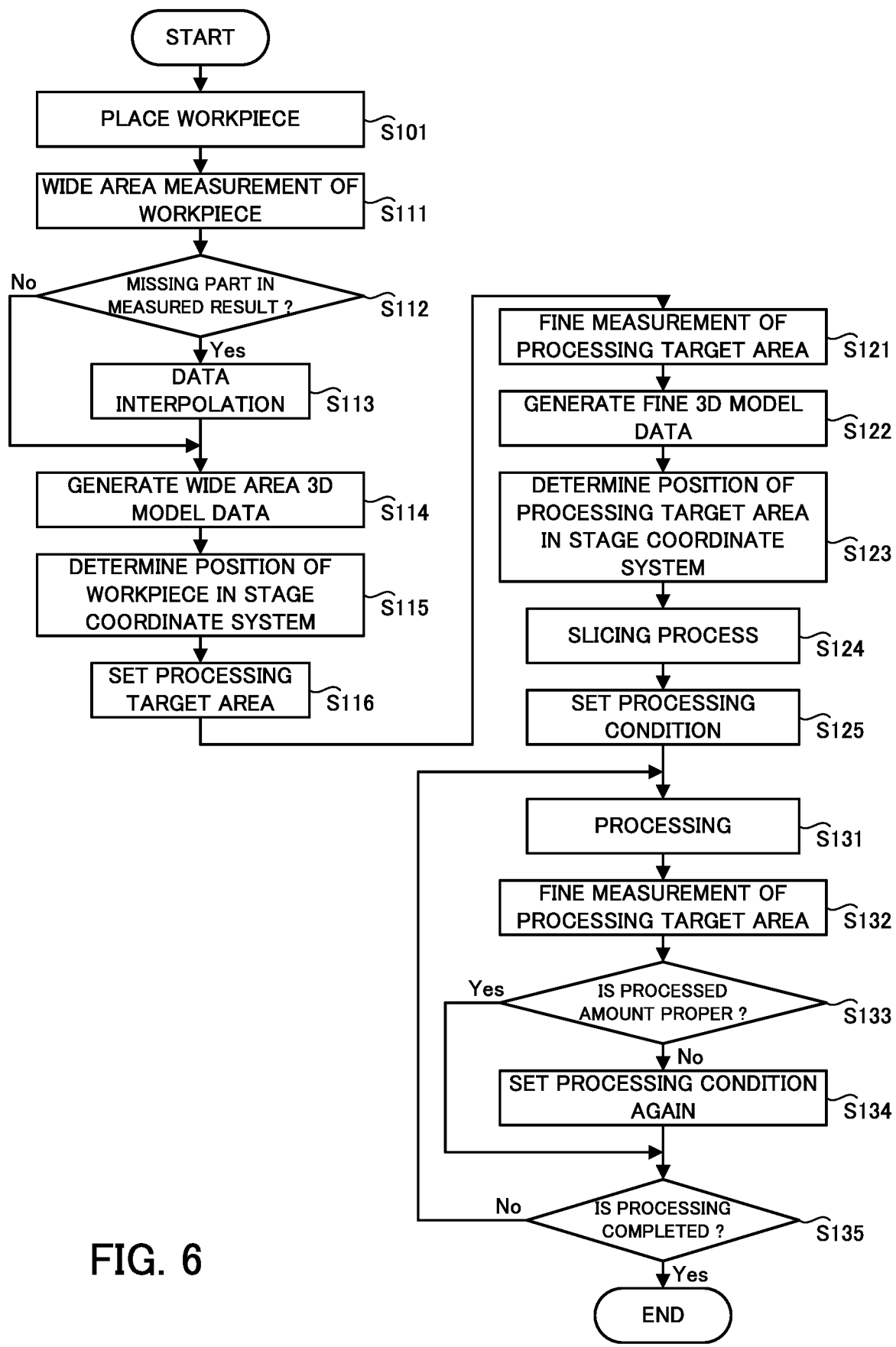

FIG. 6 is a flowchart that illustrates a flow of the processing operation performed by the processing system.

Figure 7A:
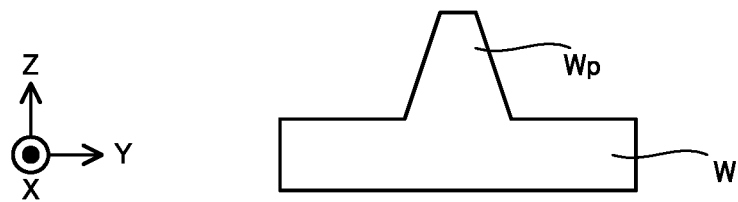
Figure 7B:
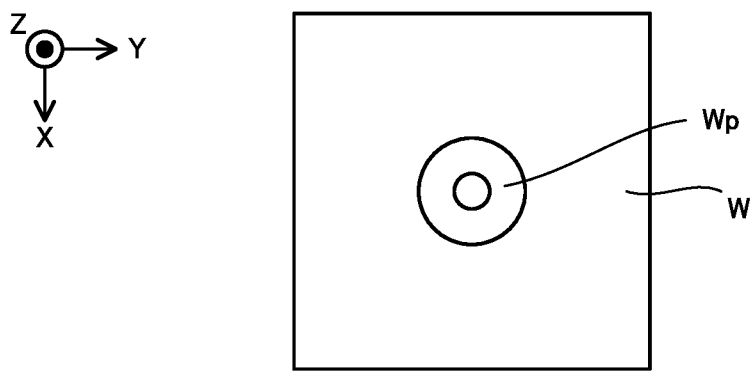

FIG. 7A is a cross-sectional view that illustrates a cross-sectional surface of the non-processed workpiece and FIG. 7B is a planar view that illustrates a top surface of the non-processed workpiece.

Figure 8:
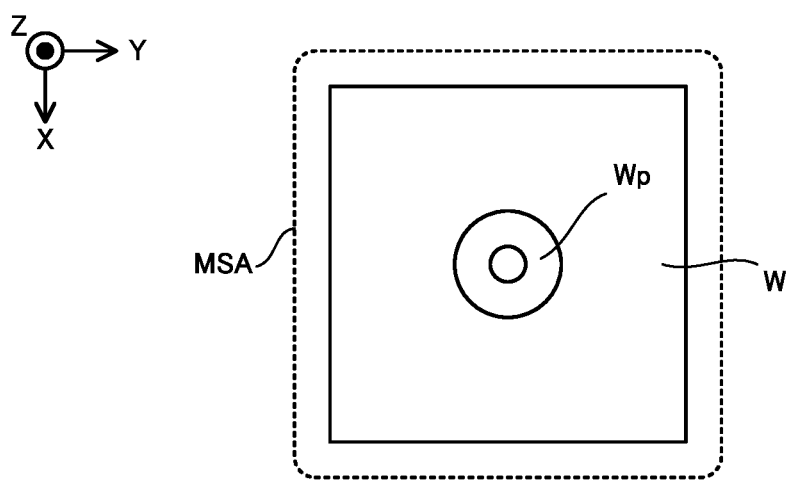

FIG. 8 is a planar view that illustrates one example of a positional relationship between a measurement shot area and the workpiece.

Figure 9:
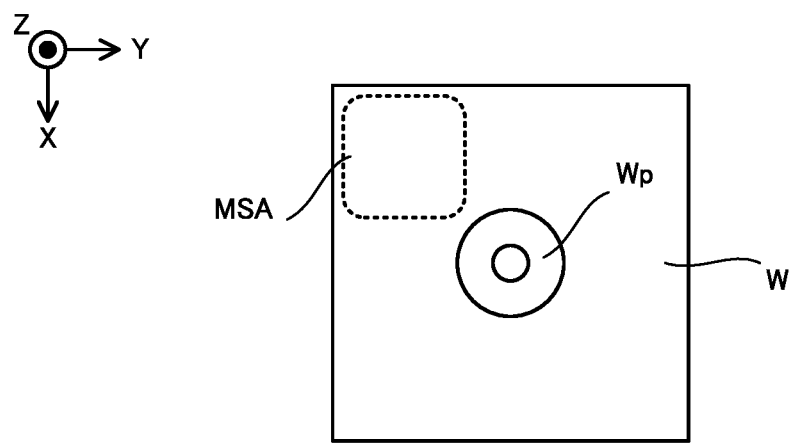

FIG. 9 is a planar view that illustrates another example of the positional relationship between the measurement shot area and the workpiece.

Figure 10A:
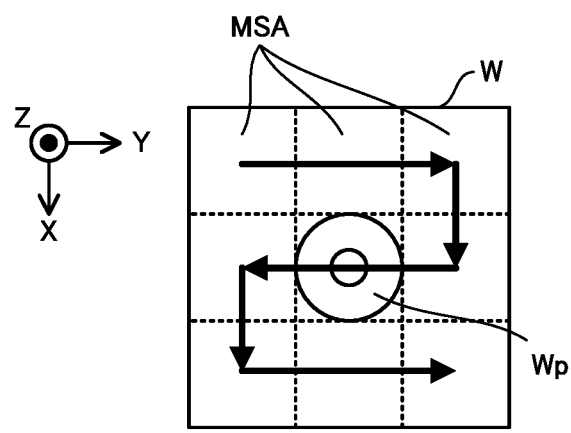
Figure 10B:
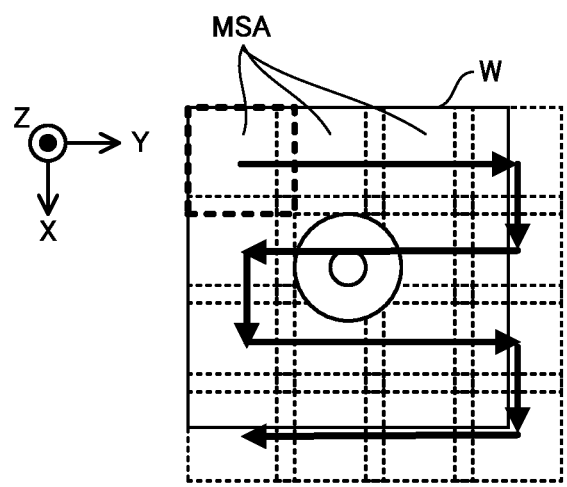

FIG. 10 Each of FIG. 10A and FIG. 10B is a planar view that illustrates one example of a moving trajectory of the measurement shot area that moves relative to a surface of the workpiece.

Figure 11A:
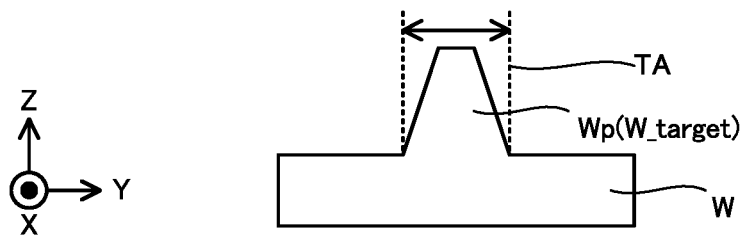
Figure 11B:
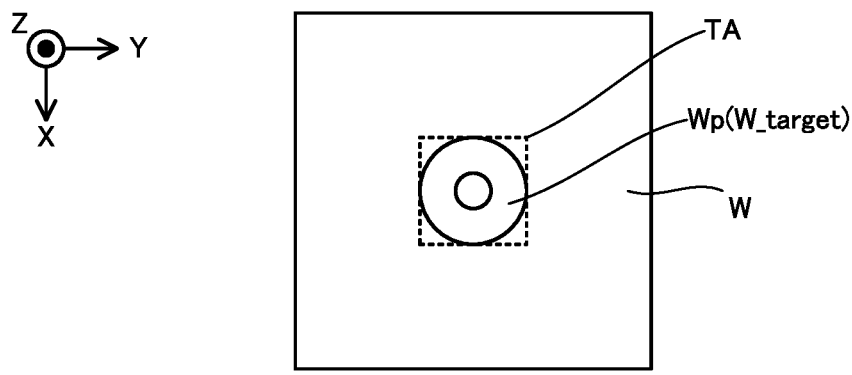

FIG. 11A is a cross-sectional view that illustrates one example of a positional relationship between a processing target area and the workpiece and FIG. 11B is a planar view that illustrates one example of the positional relationship between the processing target area and the workpiece.

Figure 12:
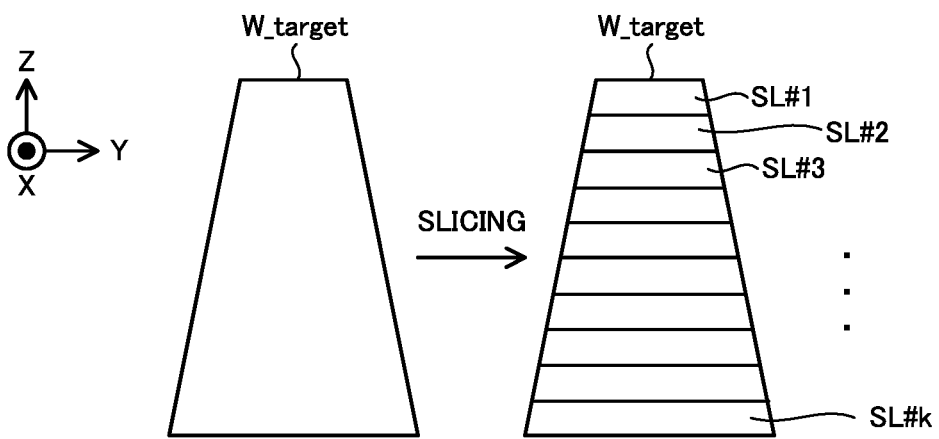

FIG. 12 is a cross-sectional view that illustrates cross-sectional surfaces of a processing target part and a plurality of layered structural parts.

Each of FIG. 13A to FIG. 13D is a planar view that schematically illustrates an example in which a slice data corresponding to a certain layered structural part indicates a position at which a removal processing is actually performed in a processing target area when a certain layered structural part is removed.

Figure 14:
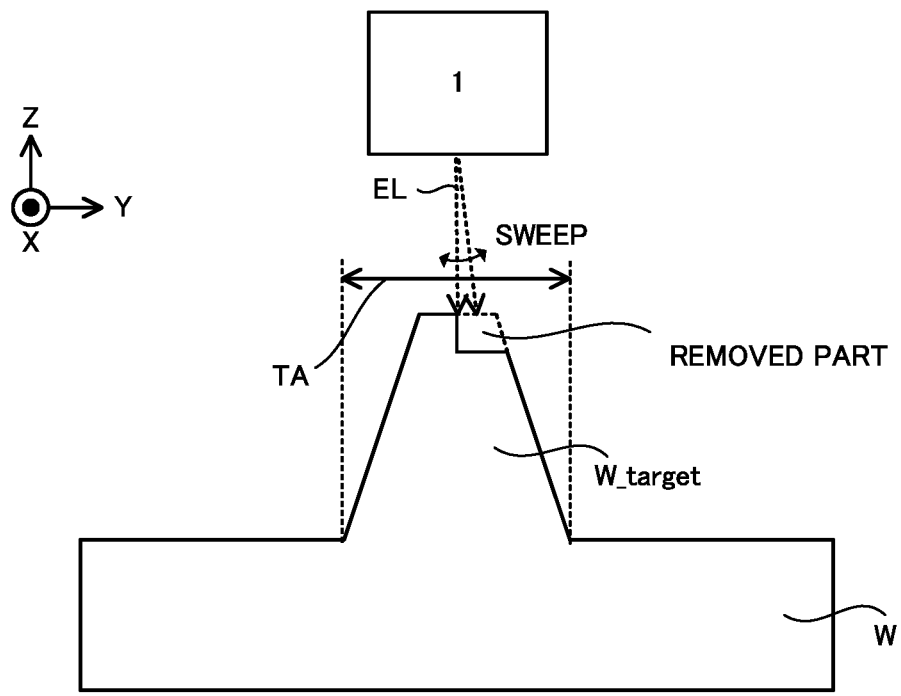

FIG. 14 is a cross-sectional view that illustrates an aspect of the removal of the processing target part.

Figure 15A:
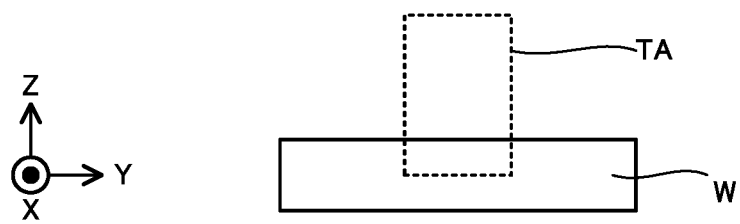
Figure 15B:
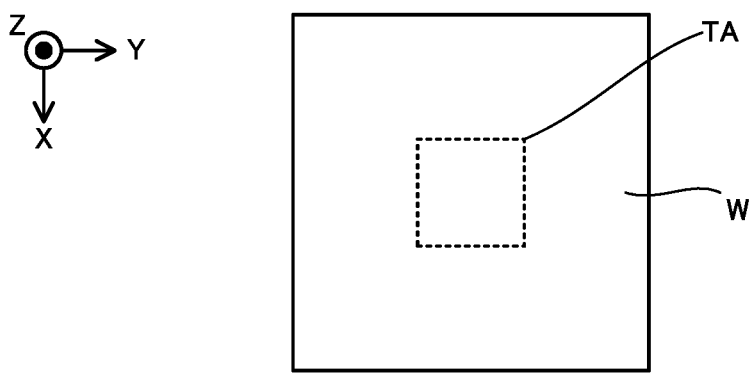

FIG. 15 is a cross-sectional view that illustrates the workpiece on which the removal processing is completed.

Figure 16:
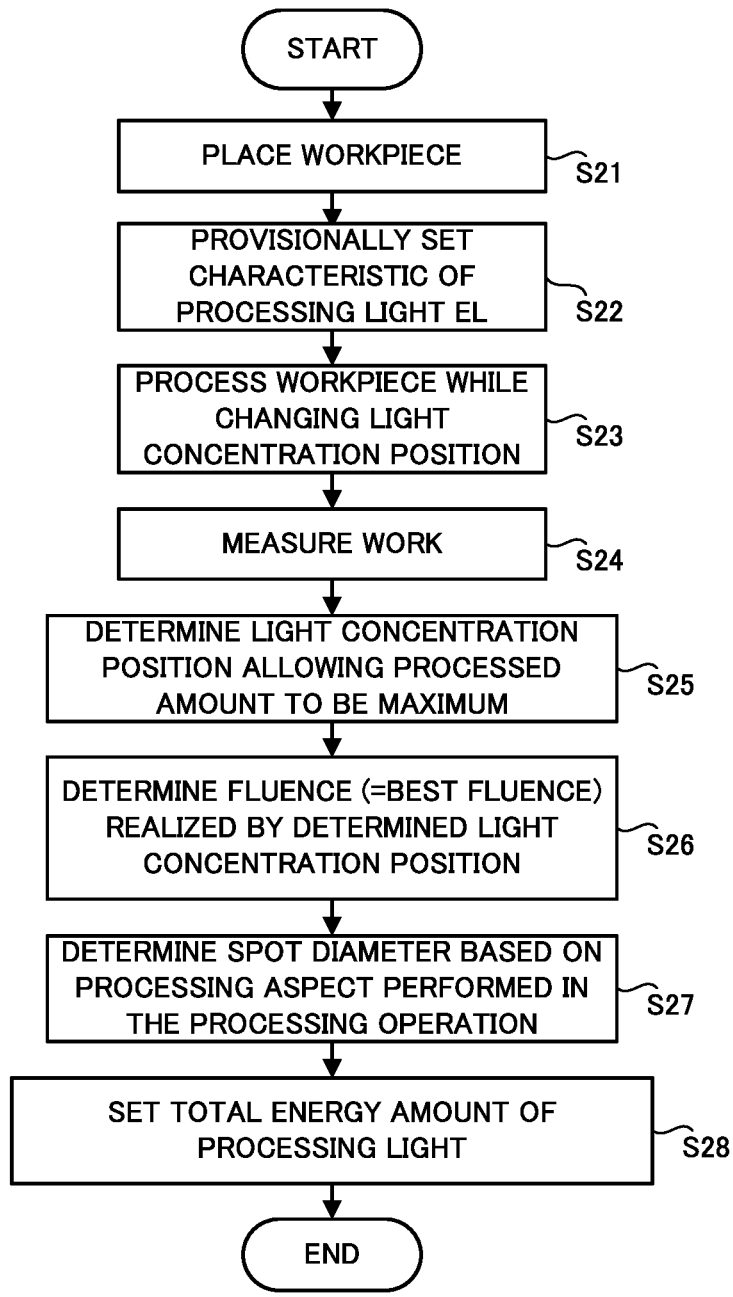

FIG. 16 is a flowchart that illustrates a flow of an initial setting operation for setting an initial value of a processing condition.

Figure 17:
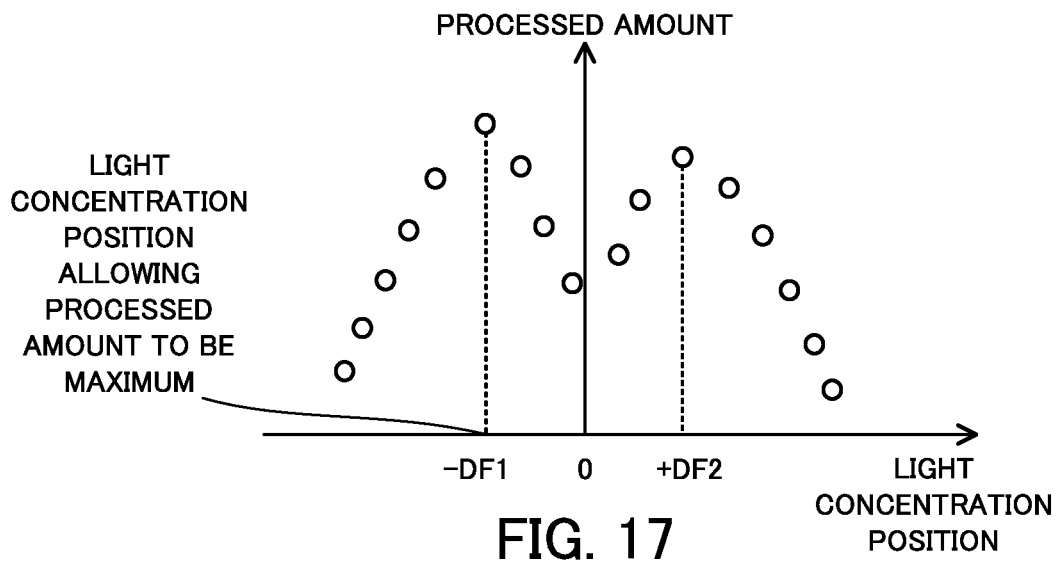

FIG. 17 is a plot diagram in which a processed amount is plotted with respect to a light concentration position of a processing light.

Figure 18:
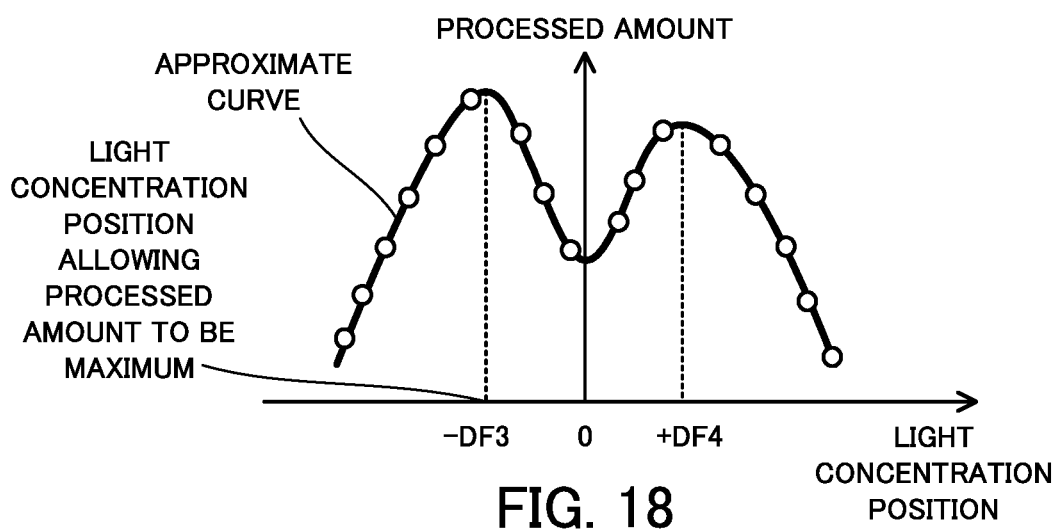

FIG. 18 is a graph that illustrates, as an approximate curve, a relationship between the light concentration position of the processing light and the processed amount.

Figure 19:
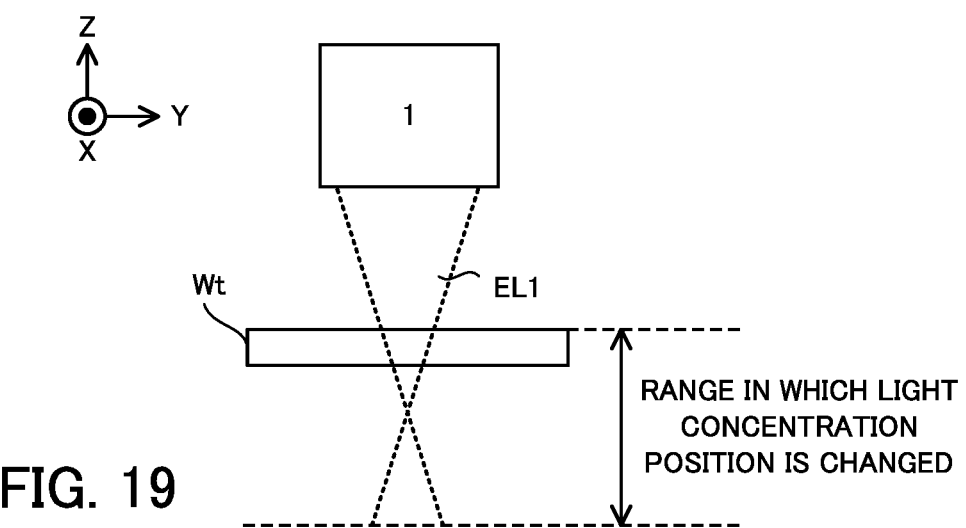

FIG. 19 is a cross-sectional view that illustrates a positional relationship between the light concentration position of the processing light and the surface of the workpiece.

Figure 20:
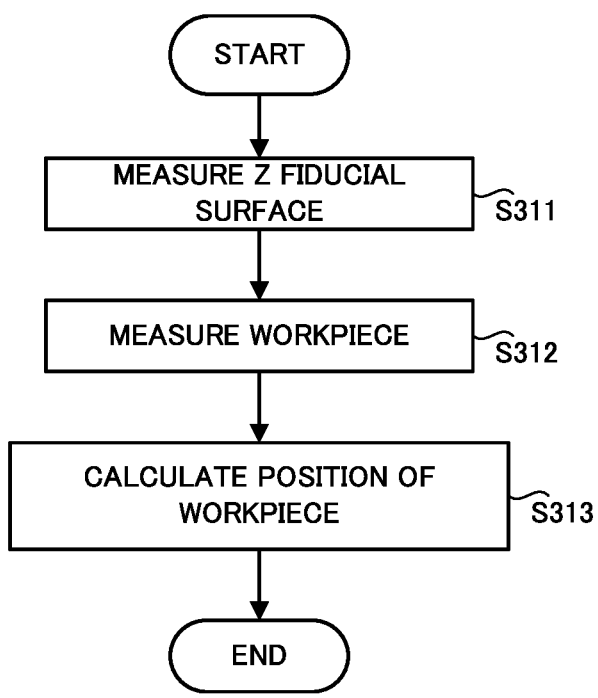

FIG. 20 is a flowchart that illustrates a flow of a first temperature drift reduction operation.

Figure 21A:
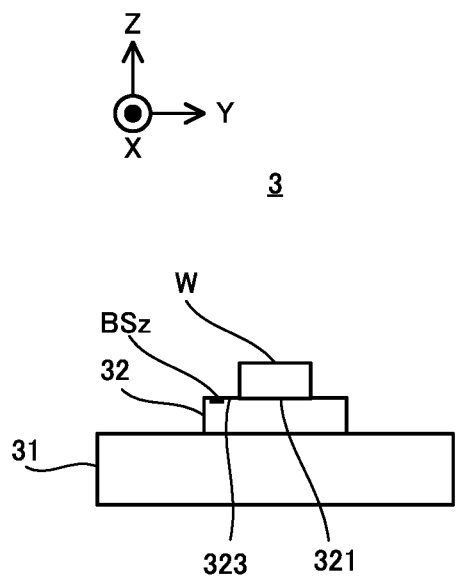
Figure 21B:
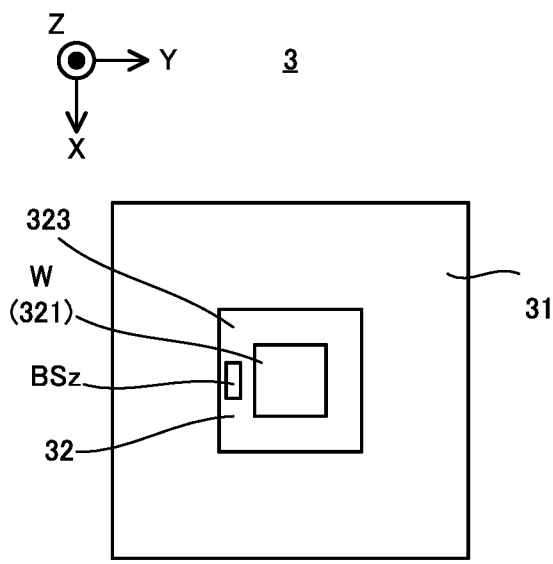

FIG. 21A is a cross-sectional view that illustrates a cross-sectional surface of a stage apparatus and FIG. 21B is a planar view that illustrates a top surface of the stage apparatus.

Figure 22A:
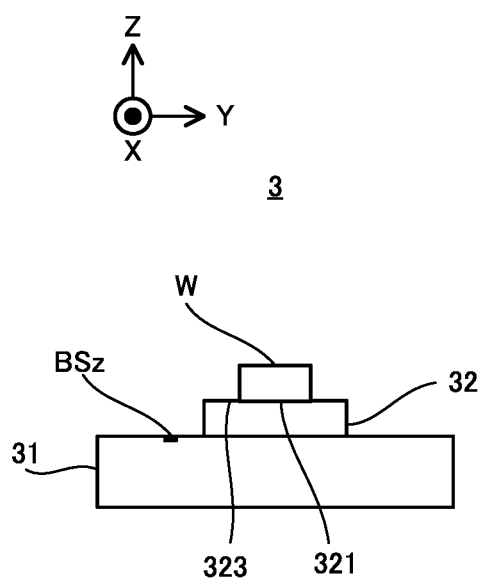
Figure 22B:
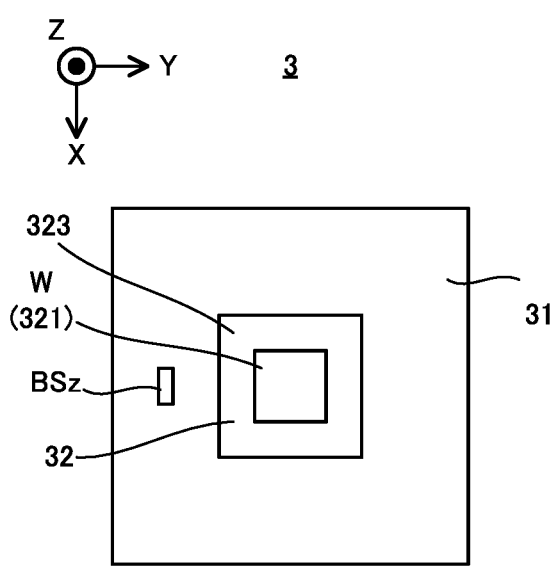

FIG. 22A is a cross-sectional view that illustrates a cross-sectional surface of the stage apparatus and FIG. 22B is a planar view that illustrates a top surface of the stage apparatus.

Figure 23:
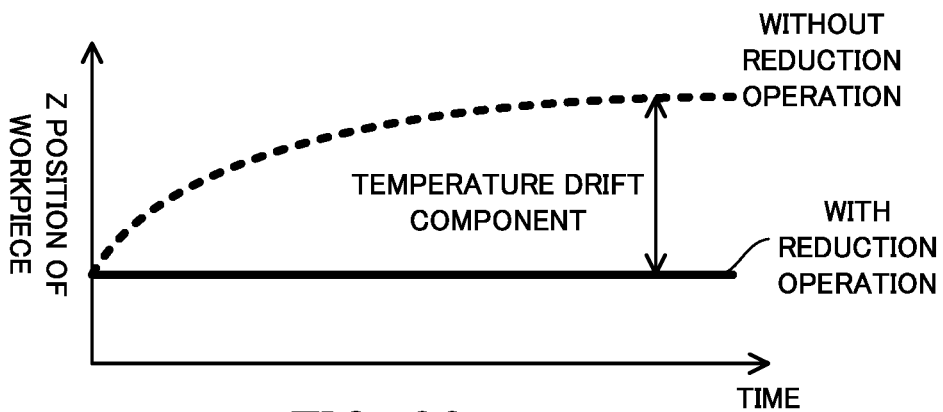

FIG. 23 is a graph that illustrates a temporal transition of a position in a Z axis direction of the workpiece calculated by a control apparatus.

Figure 24:
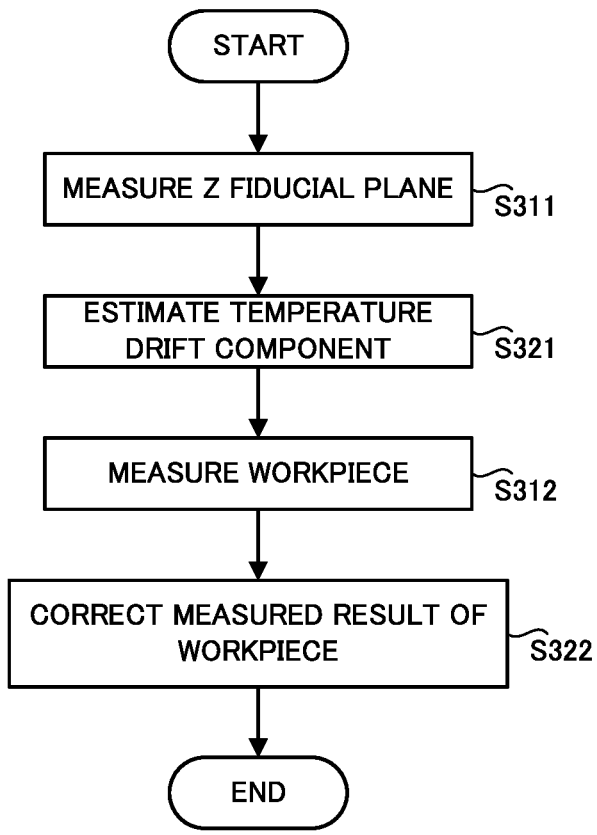

FIG. 24 is a flowchart that illustrates a flow of a second temperature drift reduction operation.

Figure 25:
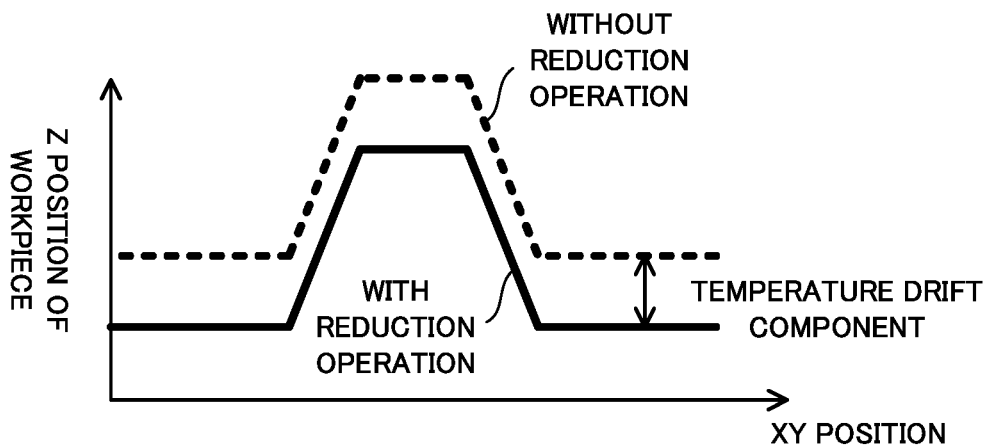

FIG. 25 is a graph that schematically illustrates a distribution in a XY plane of the position in the Z axis direction of the workpiece.

Figure 26:
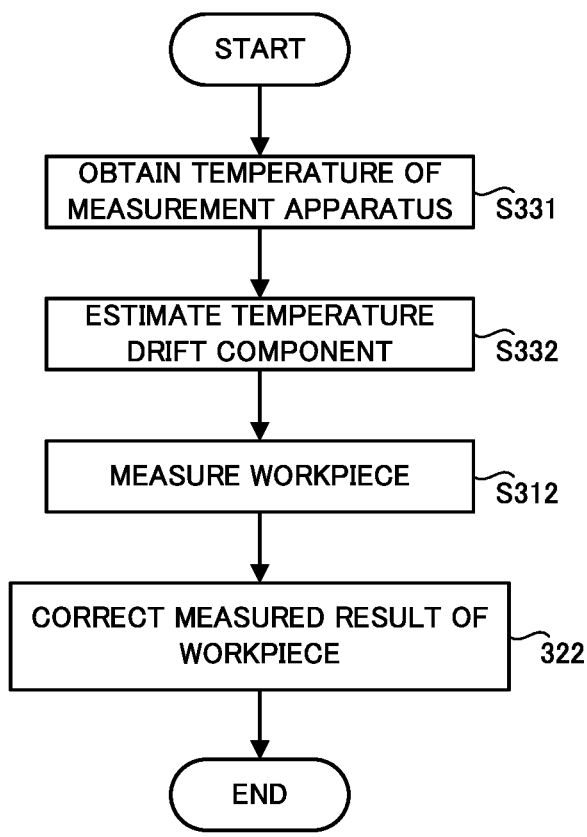

FIG. 26 is a flowchart that illustrates a flow of a third temperature drift reduction operation.

Figure 27A:
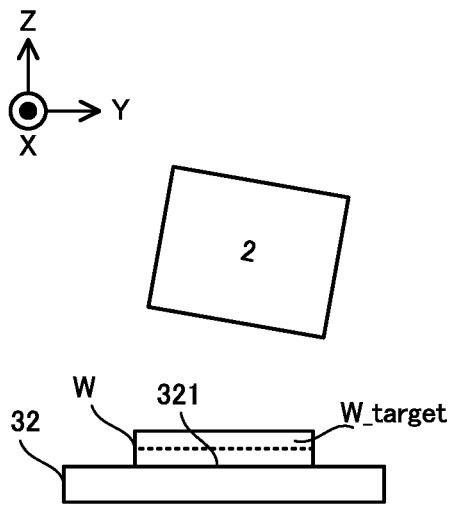
Figure 27B:
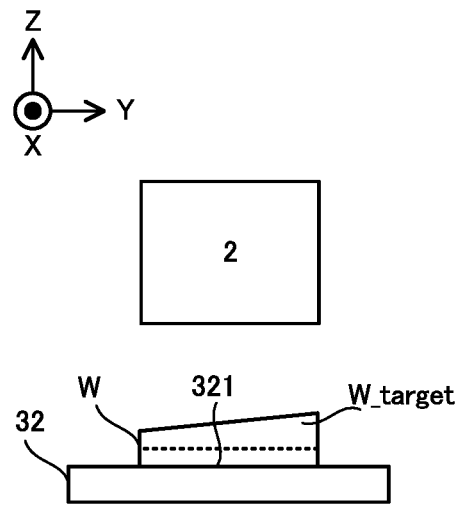
Figure 27C:
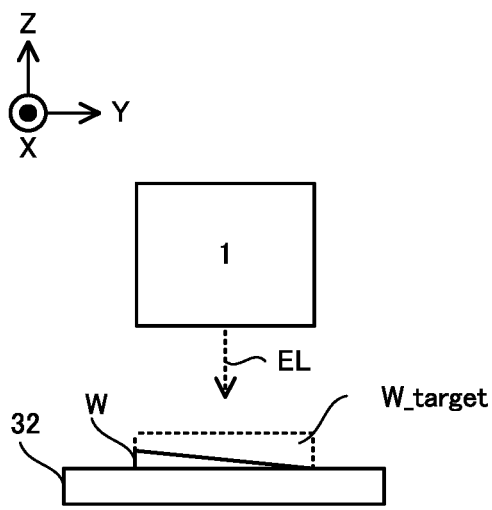
Figure 27D:
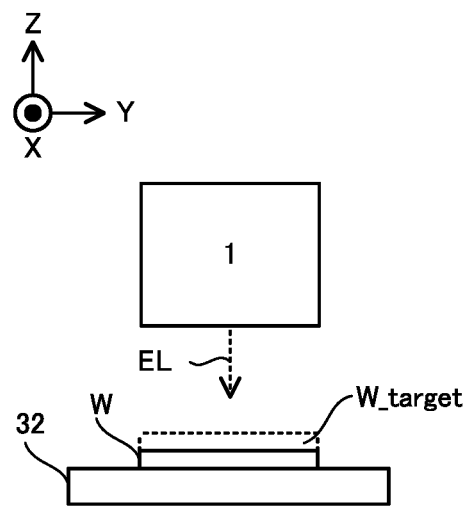

FIG. 27A is a cross-sectional view that illustrates a measurement apparatus that tilts relative to a stage, FIG. 27B is a cross-sectional view that illustrates a shape of the workpiece calculated from a measured result of the measurement apparatus under a situation illustrated in FIG. 27A, FIG. 27C is a cross-sectional view that illustrates the workpiece that is processed by the processing apparatus under a situation where the measurement apparatus tilts relative to the stage, and FIG. 27D is a cross-sectional view that illustrates the workpiece that is processed so that an influence of a tilt amount is reduced.

Figure 28:
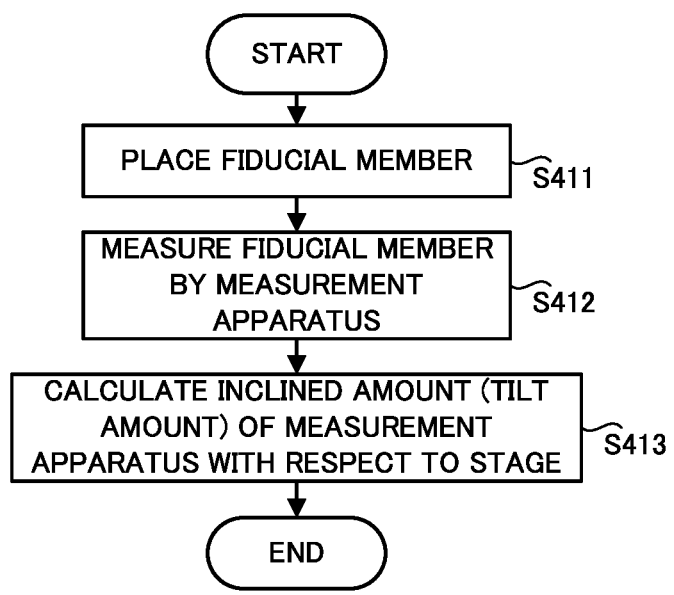

FIG. 28 is a flowchart that illustrates a flow of a first tilt measurement operation for measuring the tilt amount of the measurement apparatus relative to the stage.

Figure 29:
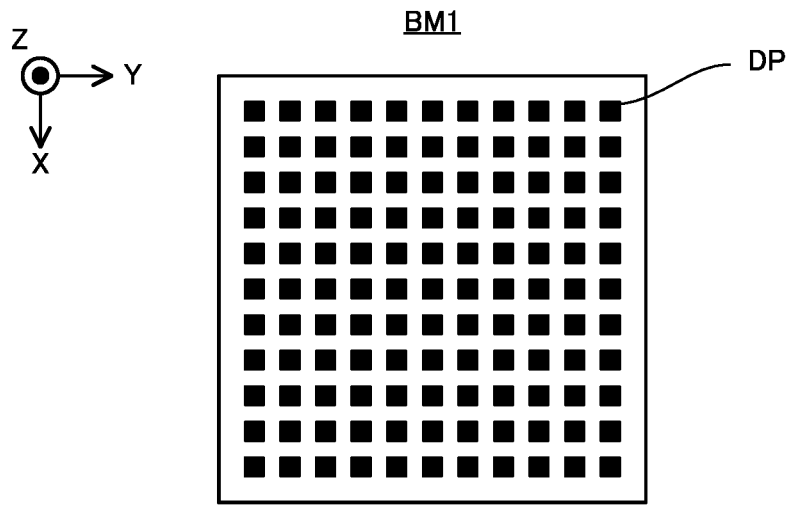

FIG. 29 is a planar view that illustrates a fiducial member.

Figure 30A:
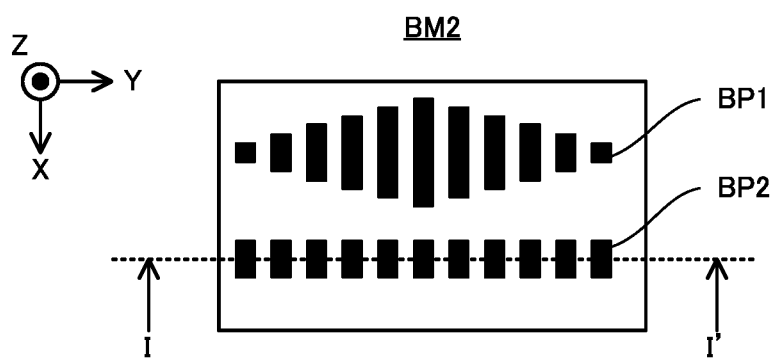
Figure 30B:
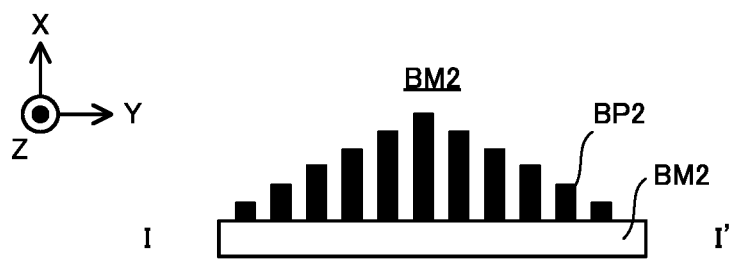

FIG. 30A is a planar view that illustrates the fiducial member and FIG. 30B is a cross-sectional view that illustrates the fiducial member.

Figure 31:
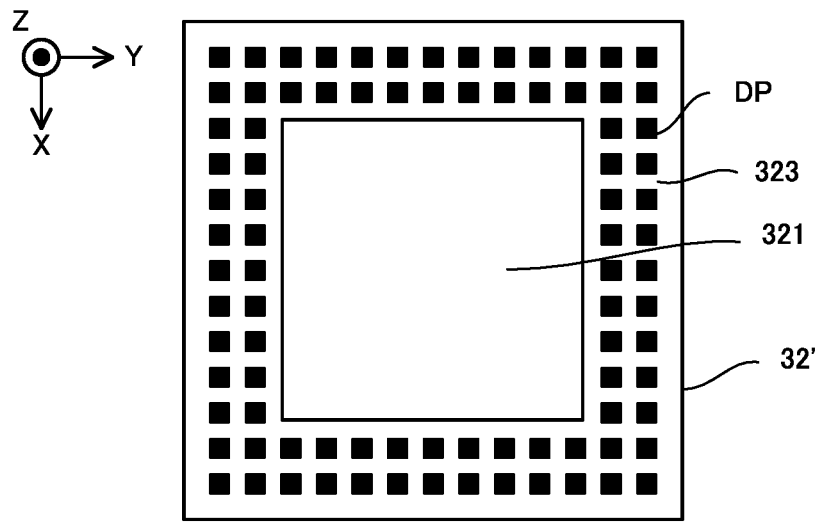

FIG. 31 is a planar view that illustrates the stage modified in order to perform the first tilt measurement operation.

Figure 32:
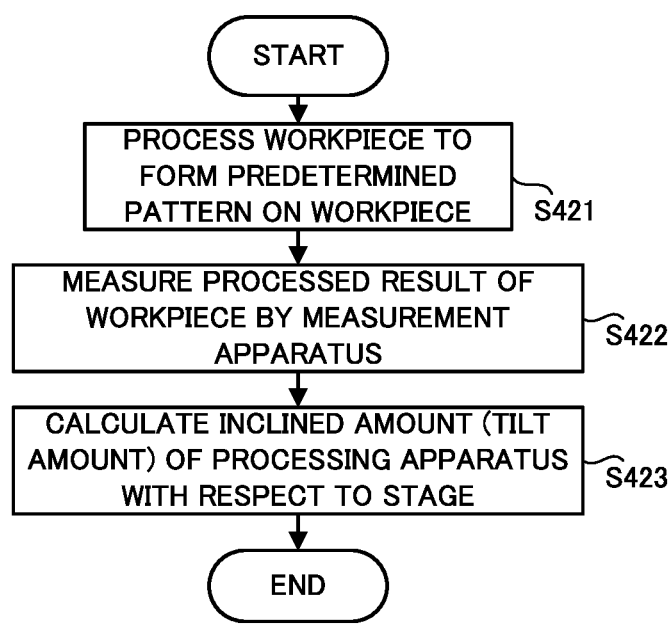

FIG. 32 is a flowchart that illustrates a flow of a first tilt measurement operation for measuring the tilt amount of the processing apparatus relative to the stage.

Figure 33:
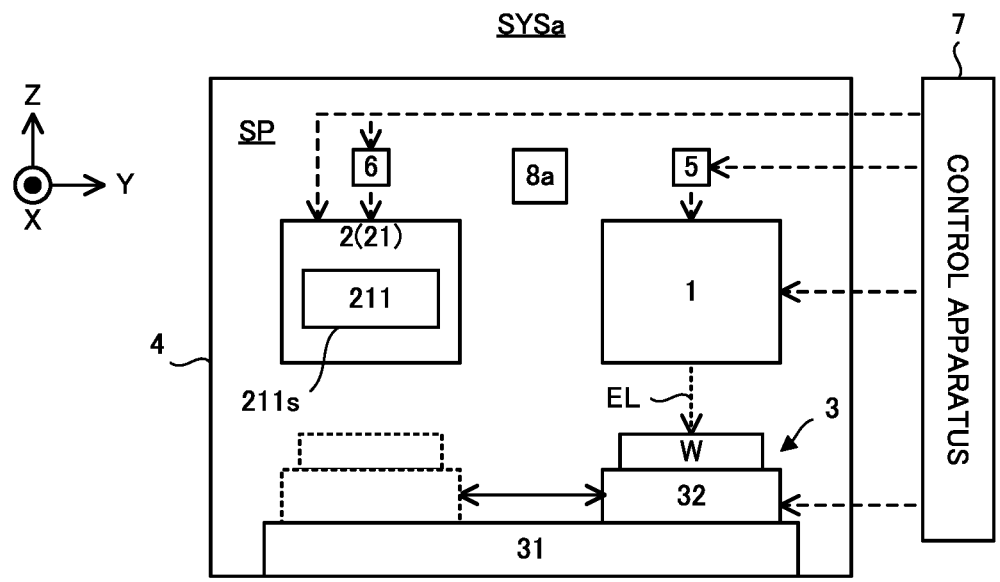

FIG. 33 is a schematic view that illustrates a structure of a processing system in a first modified example.

Figure 34:
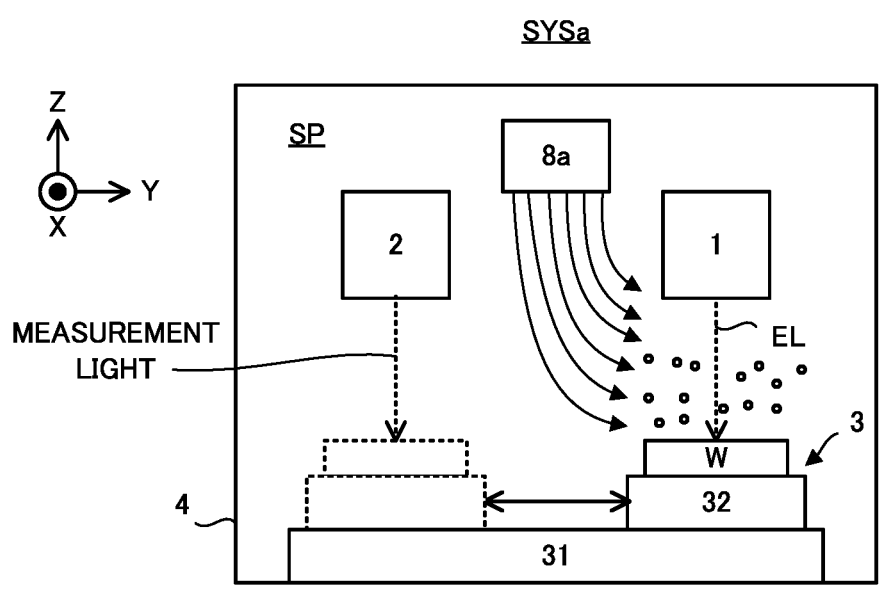

FIG. 34 is a schematic view that illustrates a first supply aspect of gas by a gas supply apparatus.

Figure 35:
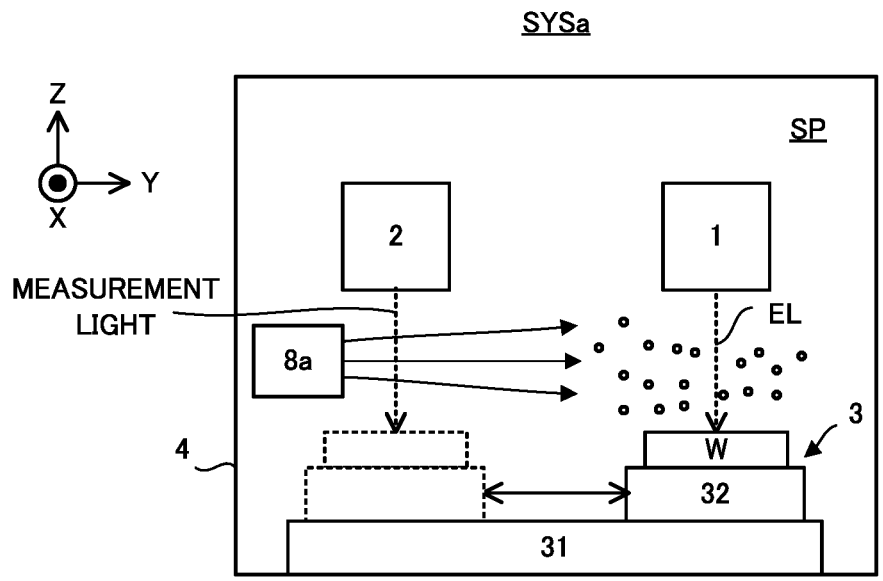

FIG. 35 is a schematic view that illustrates a second supply aspect of the gas by the gas supply apparatus.

Figure 36:
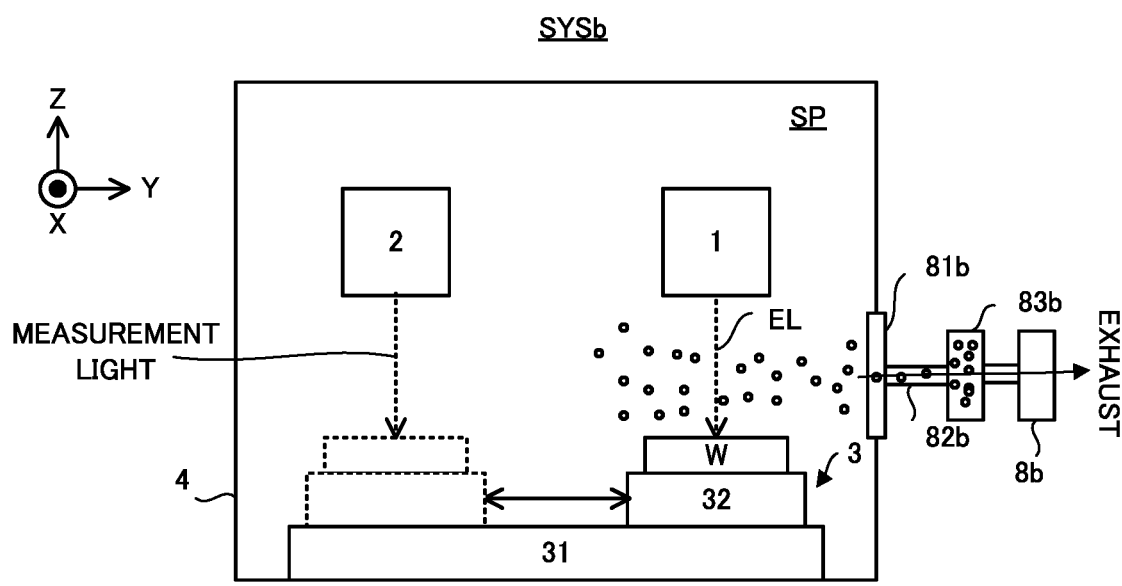

FIG. 36 is a schematic view that illustrates a structure of a processing system in a second modified example.

Figure 37:
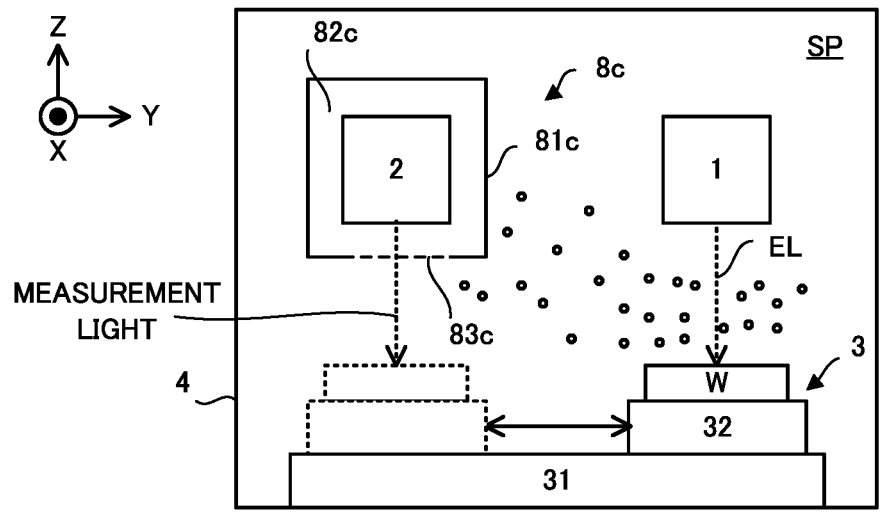

FIG. 37 is a schematic view that illustrates a structure of a processing system in a third modified example.

Figure 38:
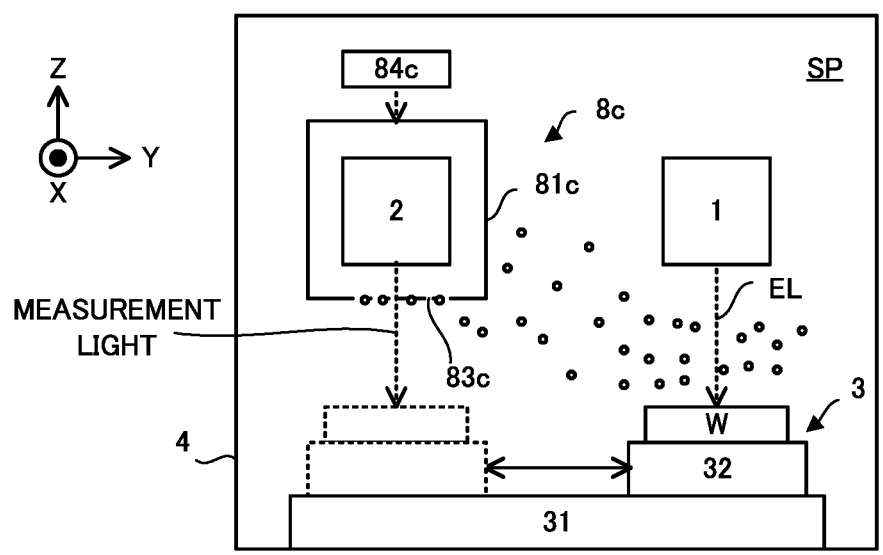

FIG. 38 is a schematic view that illustrates another structure of a processing system in a third modified example.

Figure 39A:
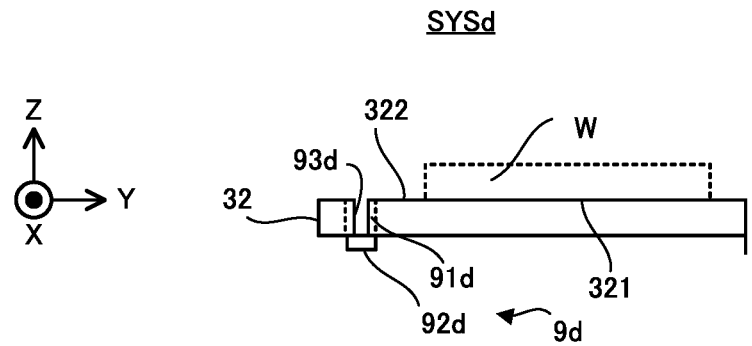
Figure 39B:
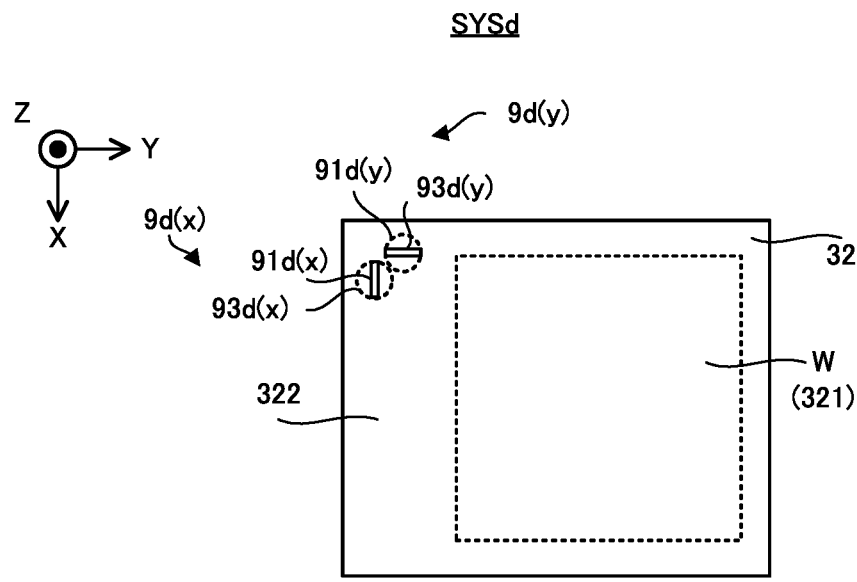

FIG. 39A is a cross-sectional view that illustrates a structure of a light receiving apparatus and FIG. 39B is a planar view that illustrates the structure of the light receiving apparatus.

Figure 40:
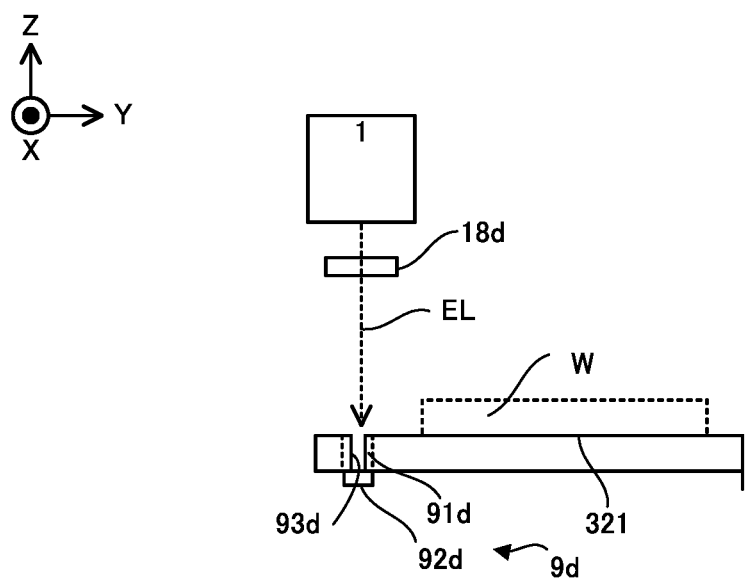

FIG. 40 is a cross-sectional view that illustrates the processing light with which the light receiving apparatus is irradiated.

Figure 41A:
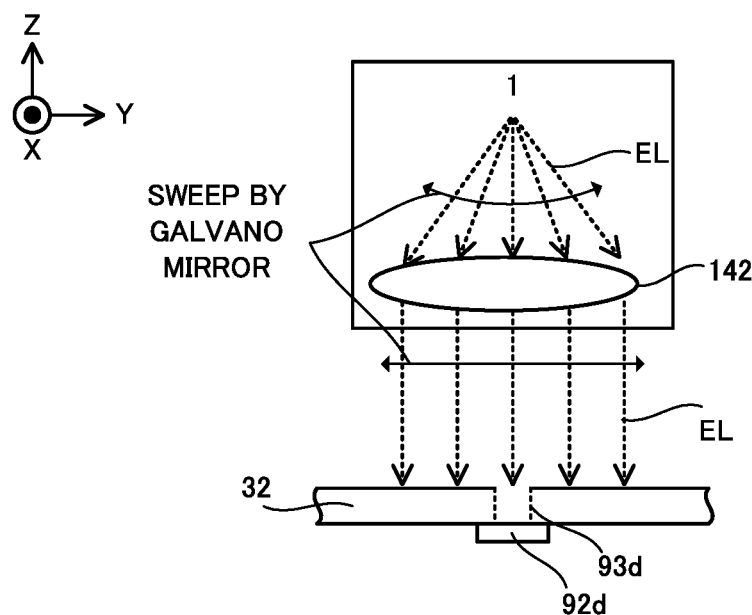
Figure 41B:
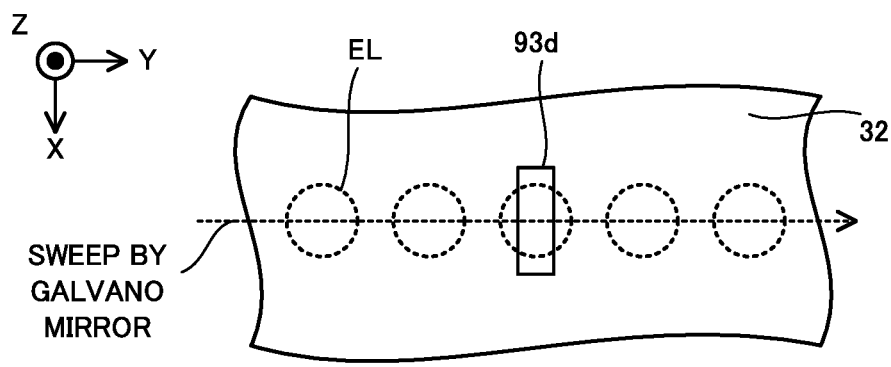
Figure 41C:
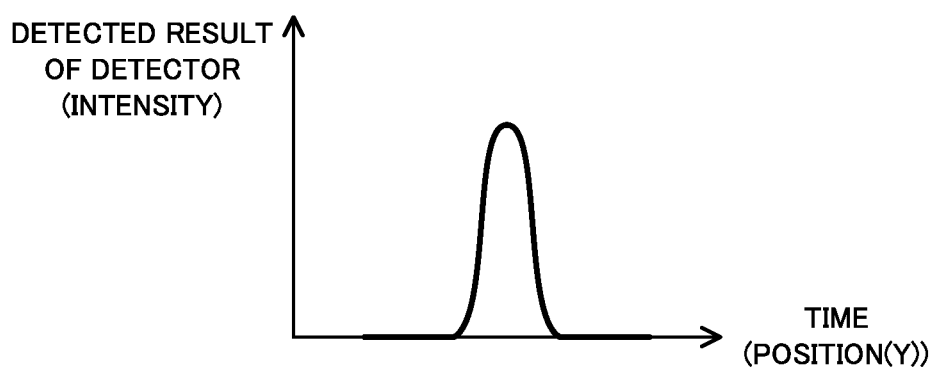

FIG. 41A is a cross-sectional view that illustrates an aspect of the processing apparatus that irradiates the light receiving apparatus with the processing light in order to perform a focus control operation, FIG. 41B is a planar view that illustrates an aspect of the processing apparatus that irradiates the light receiving apparatus with the processing light in order to perform the focus control operation, and FIG. 41C is a graph that illustrates a detected result of a detector of the light receiving apparatus.

FIG. 42 is a graph that illustrates the detected result of the detector.

Figure 43:
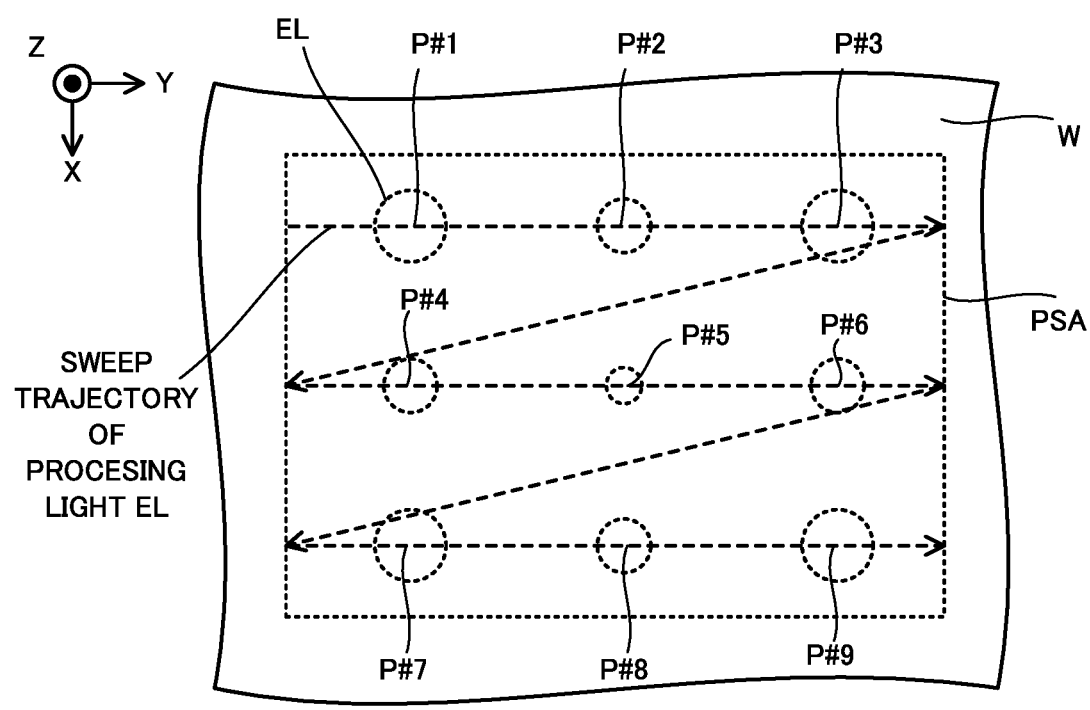

FIG. 43 is a planar view that schematically illustrates a spot diameter of the processing light at each position on the surface of the workpiece when the surface of the workpiece is swept by the processing light deflected by a Galvano mirror.

Figure 44A:
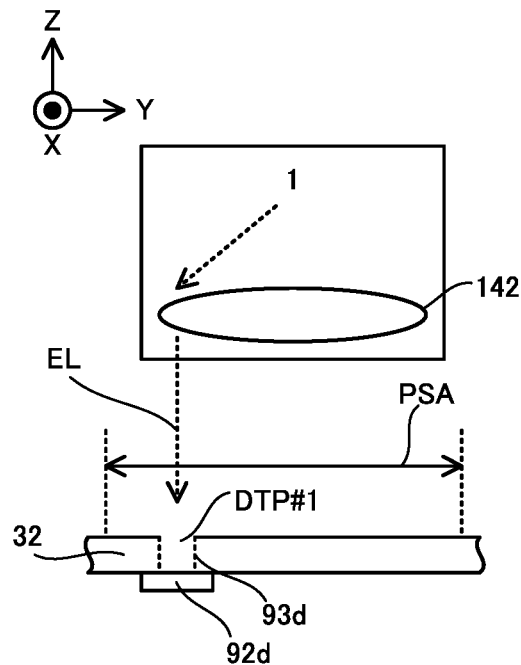
Figure 44C:
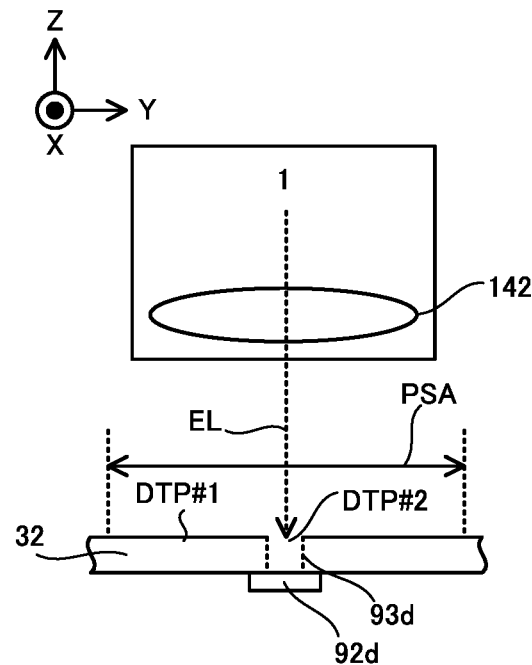
Figure 44B:
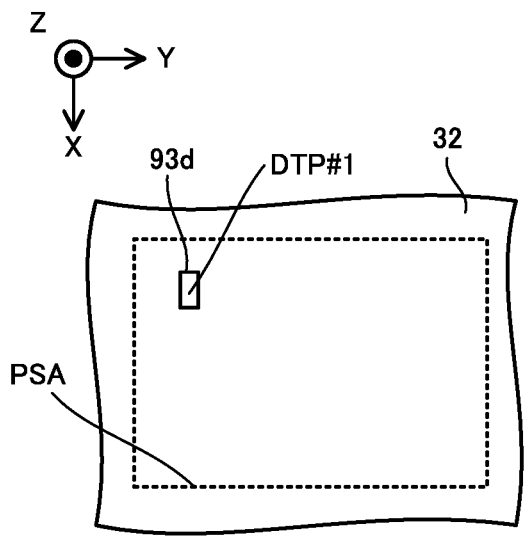
Figure 44D:
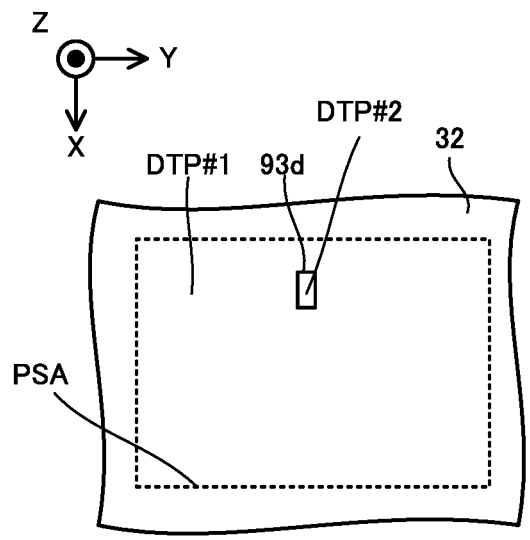

FIG. 44 Each of FIG. 44A and FIG. 44C is a cross-sectional view that illustrates a positional relationship between the processing apparatus and the light receiving apparatus 9d in a period when a state detection operation is performed, and each of FIG. 44B and FIG. 44D is a planar view that illustrates the positional relationship between the processing apparatus and the light receiving apparatus in the period when the state detection operation is performed.

Figure 45A:
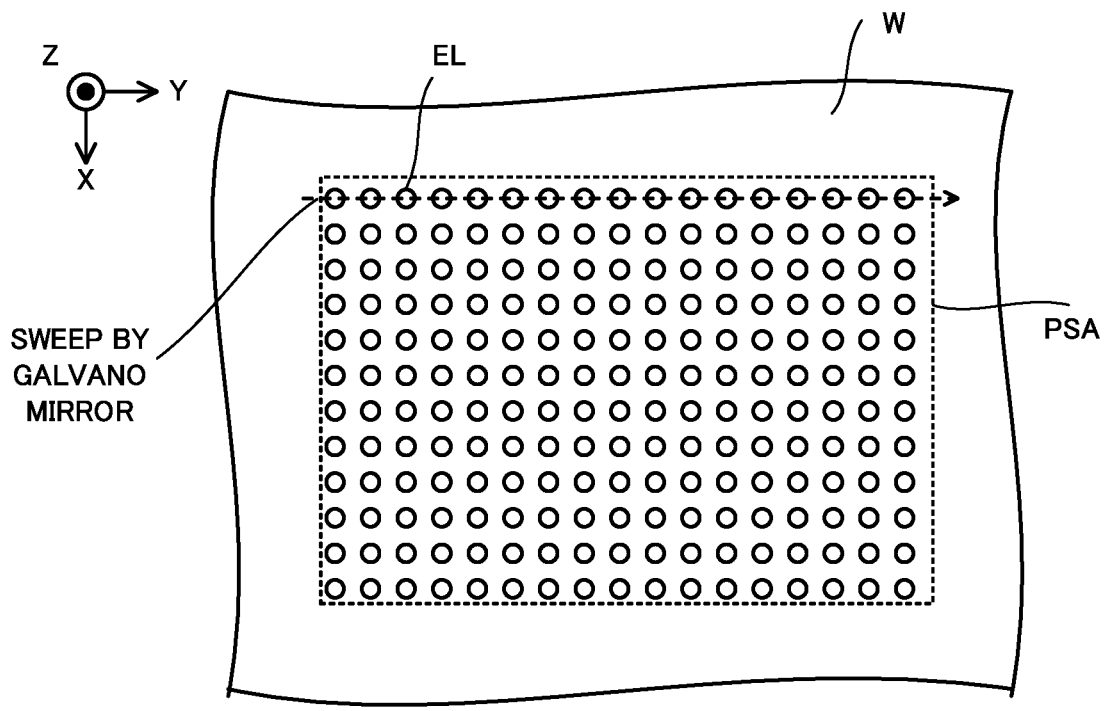
Figure 45B:
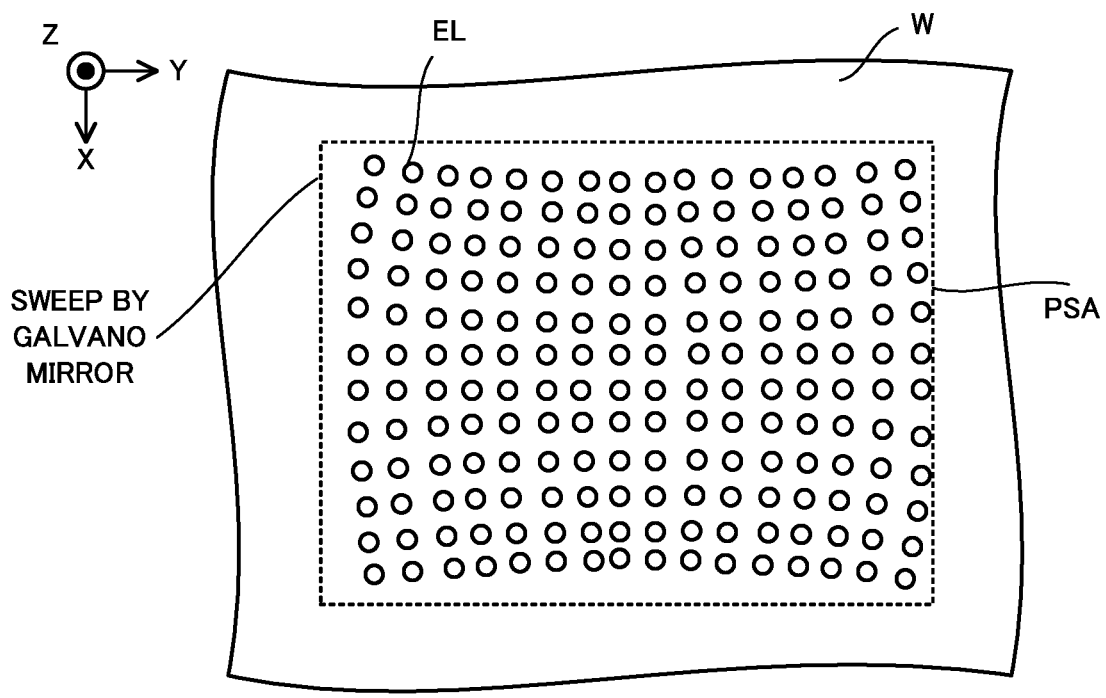

FIG. 45A is a planar view that illustrates an irradiation position of the processing light on the surface of the workpiece (namely, a surface along the XY plane) under a situation where a temperature drift does not occur and FIG. 45B is a planar view that illustrates the irradiation position of the processing light on the surface of the workpiece (namely, the surface along the XY plane) under a situation where the temperature drift occurs.

Figure 46A:
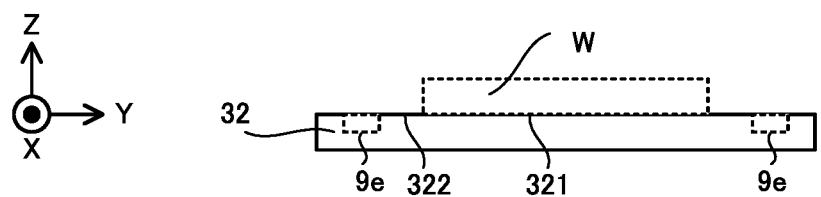
Figure 46B:
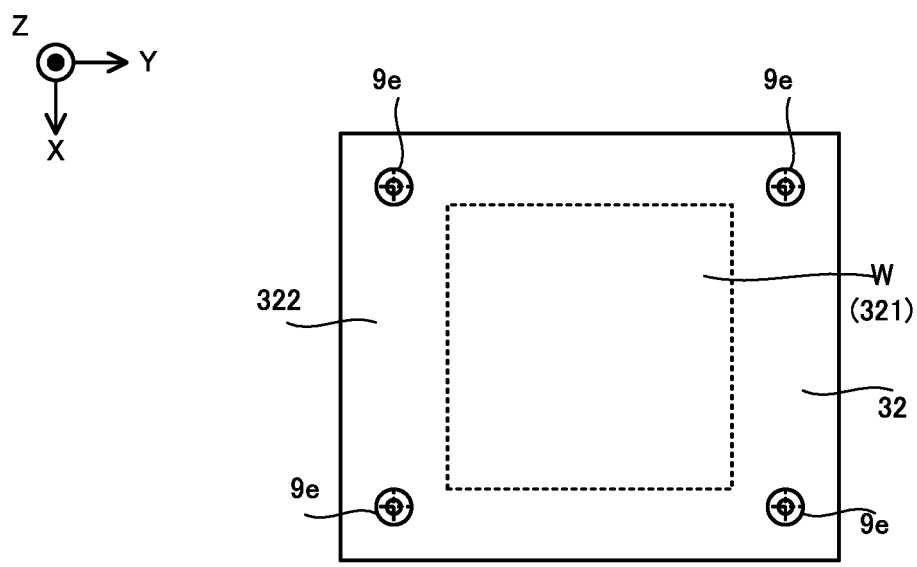

FIG. 46A is a cross-sectional view that illustrates the stage and FIG. 46B is a planar view that illustrates the stage.

Figure 47:
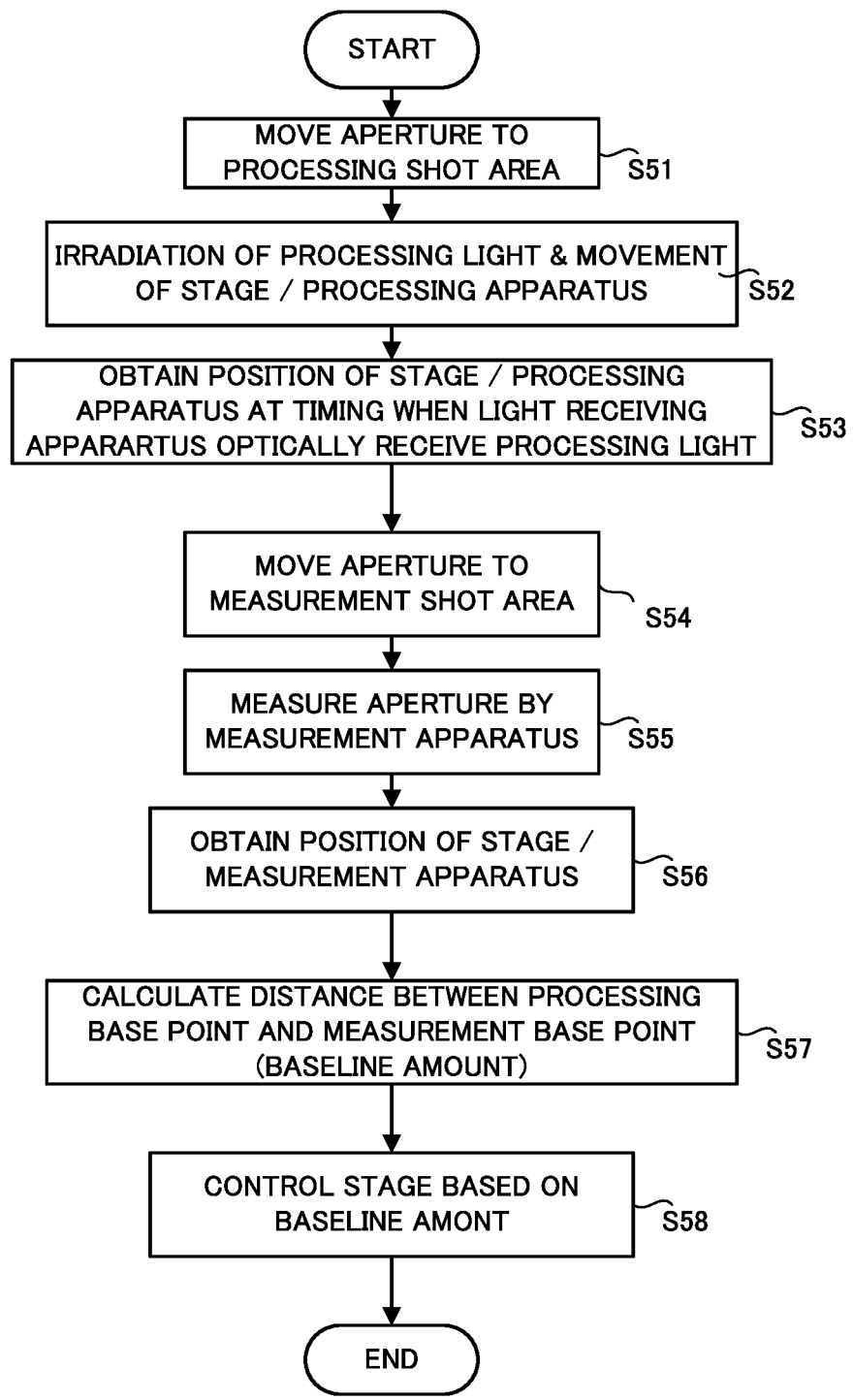

FIG. 47 is a flowchart that illustrates a flow of a stage control operation for controlling a position of the stage on the basis of a measured result of an aperture by the measurement apparatus.

Figure 48:
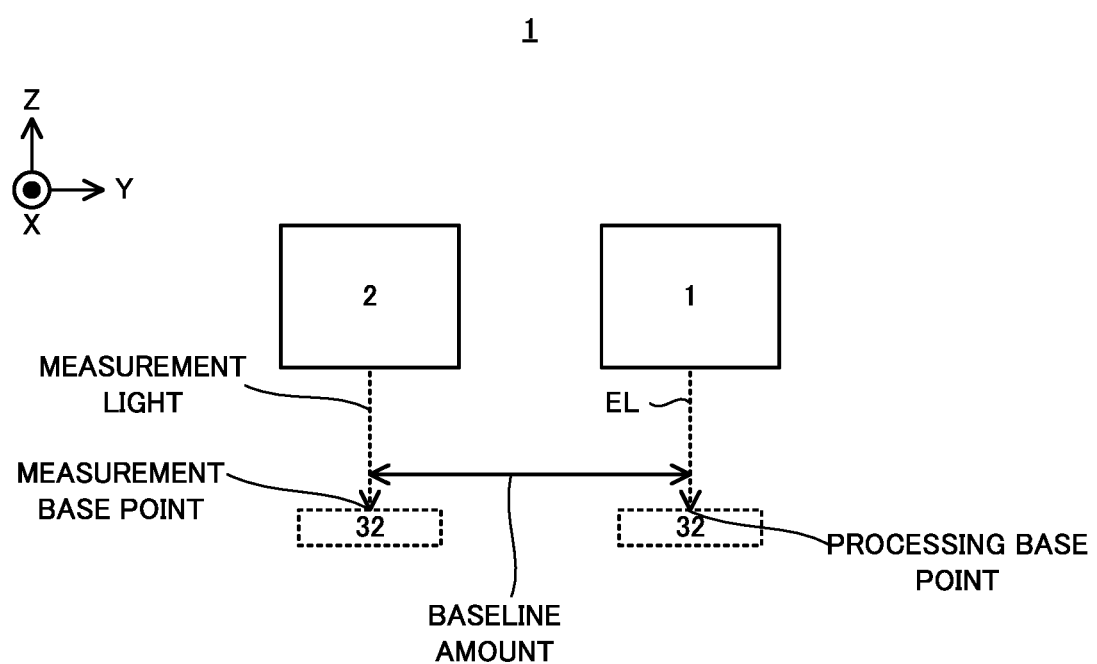

FIG. 48 is a cross-sectional view that schematically illustrates a baseline amount in a fourth modified example.

FIG. 49 Each of FIG. 49A to FIG. 49D is a planar view that illustrates a marker used by the stage control operation.

Figure 50:
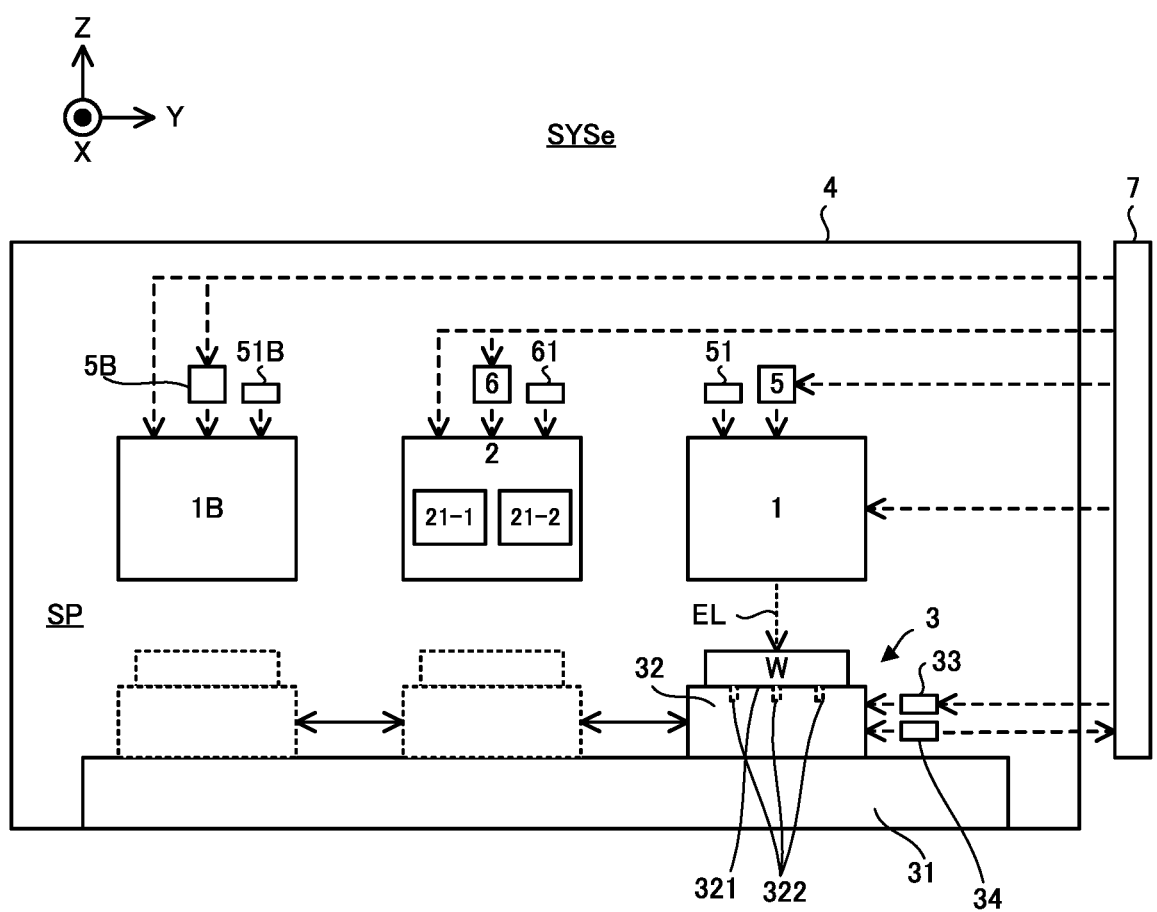

FIG. 50 is a cross-sectional view that illustrates a structure of a processing system in a fifth modified example.

Figure 51:
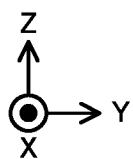
Figure 51:
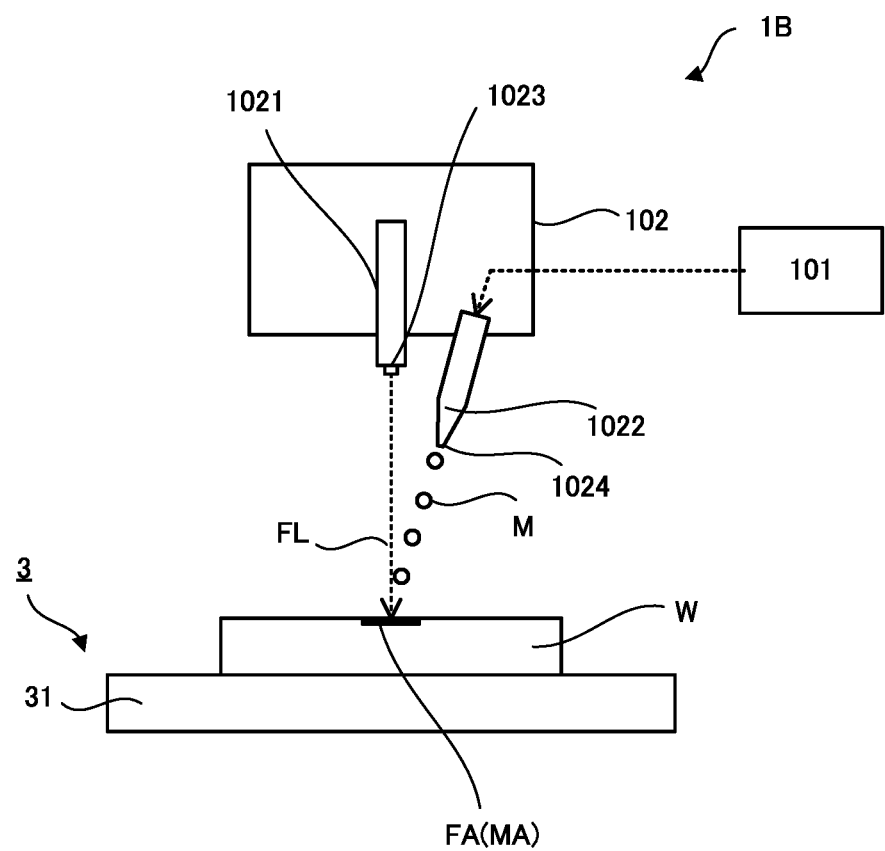

FIG. 51 is a diagram that illustrates a structure of a processing head in the fifth modified example.

Figure 52:
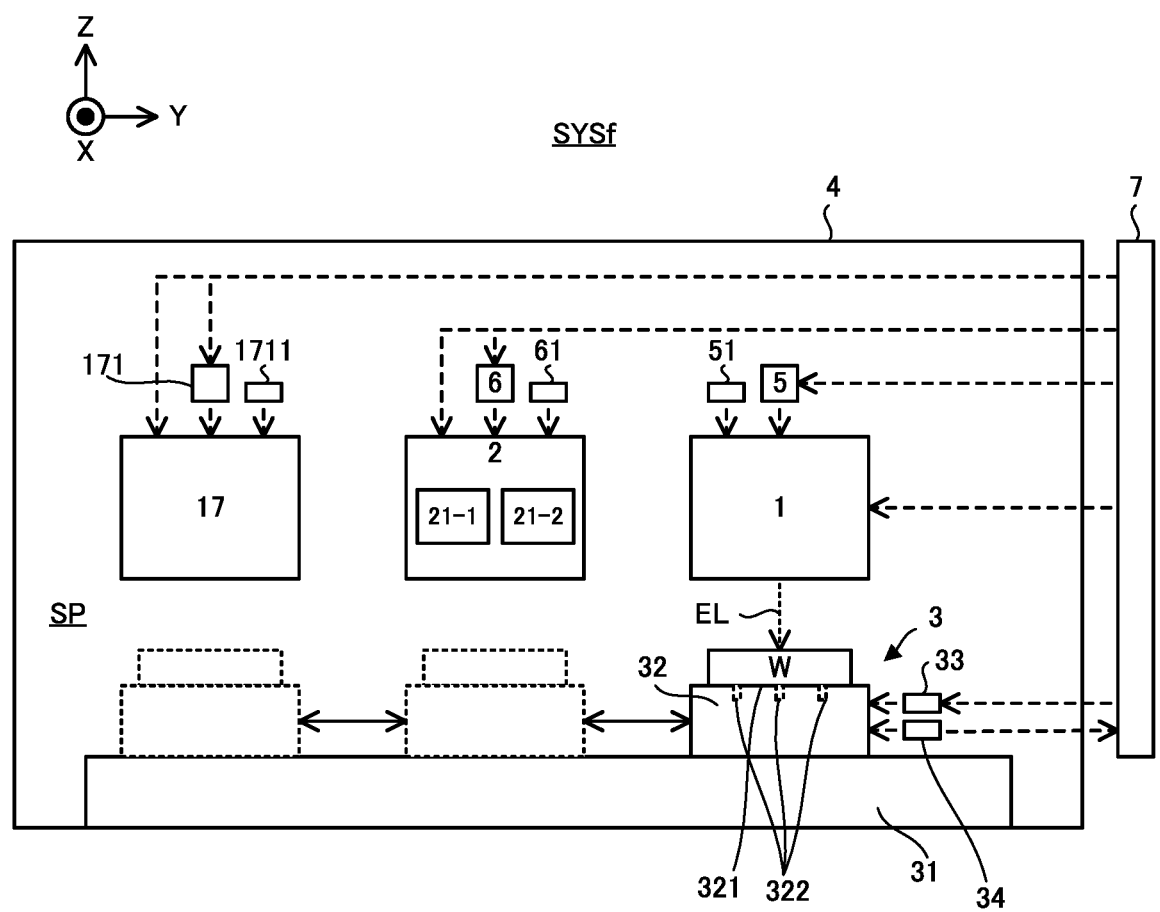

FIG. 52 is a cross-sectional view that illustrates a structure of a processing system in a sixth modified example.

Figure 53A:
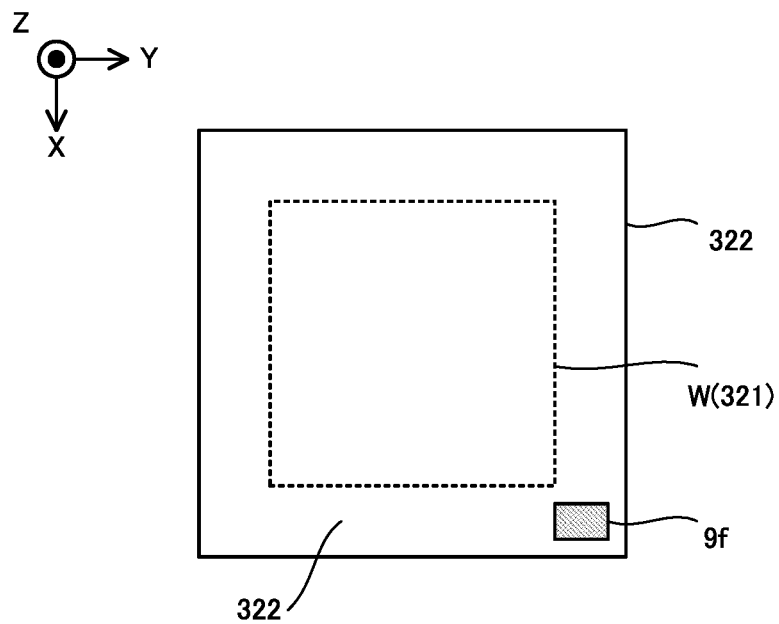
Figure 53B:
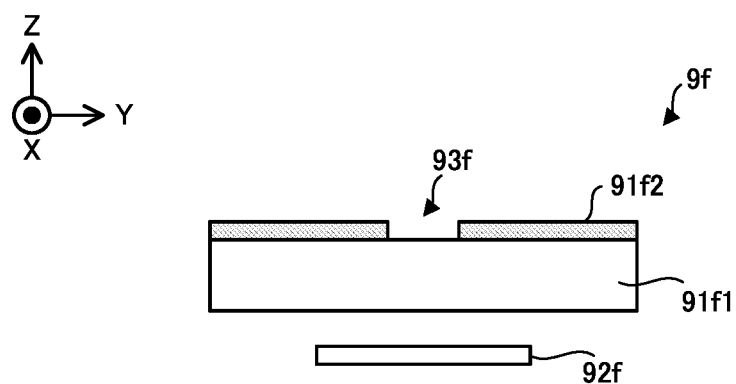

FIG. 53A is a planar view that illustrates a light receiving apparatus in a seventh modified example and FIG. 53B is a cross-sectional view thereof.

Figure 54:
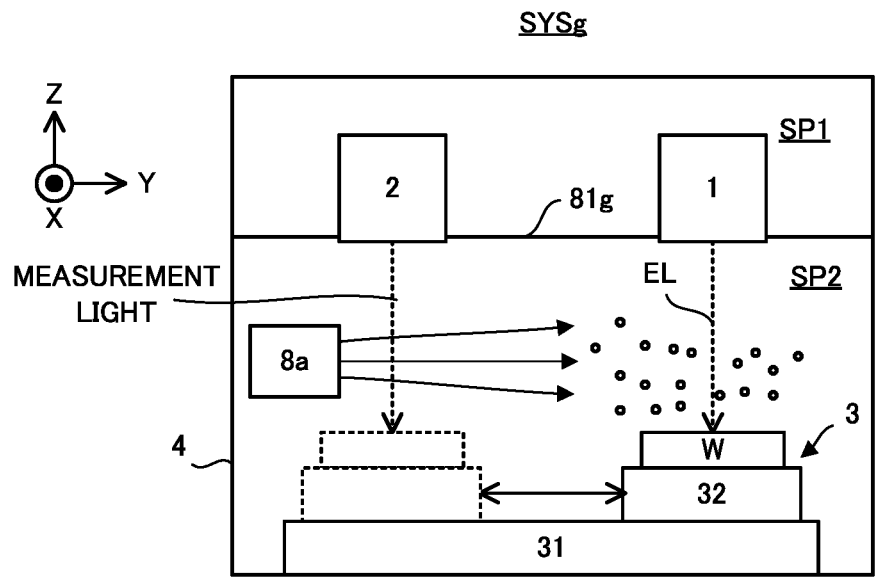

FIG. 54 is a cross-sectional view that illustrates a structure of an eighth modified example.

Figure 55:
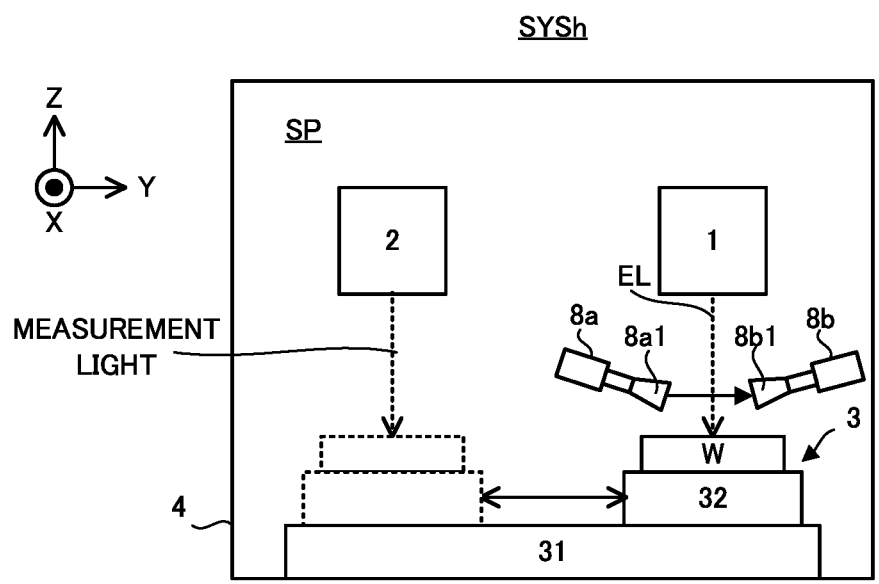

FIG. 55 is a cross-sectional view that illustrates a structure of a ninth modified example.

DESCRIPTION OF EMBODIMENTS

Next, with reference to drawings, an embodiment of a processing system and a processing method will be described. In the below described description, the embodiment of the processing system and the processing method will be described by using a processing system SYS that processes a workpiece W as one example.

Moreover, in the below described description, a positional relationship of various components that constitute the processing system SYS will be described by using an XYZ rectangular coordinate system that is defined by a X axis, a Y axis and a Z axis that are perpendicular to one another. Note that each of an X axis direction and a Y axis direction is assumed to be a horizontal direction (namely, a predetermined direction in a horizontal plane) and a Z axis direction is assumed to be a vertical direction (namely, a direction that is perpendicular to the horizontal plane, and substantially an up-down direction or a gravity direction), for the purpose of simple description, in the below described description. Moreover, rotational directions (in other words, inclination directions) around the X axis, the Y axis and the Z axis are referred to as a θX direction, a θY direction and a θZ direction, respectively. Here, the Z axis direction may be the gravity direction. An XY plane may be a horizontal direction.

(1) STRUCTURE OF PROCESSING SYSTEM SYS

Figure 1:
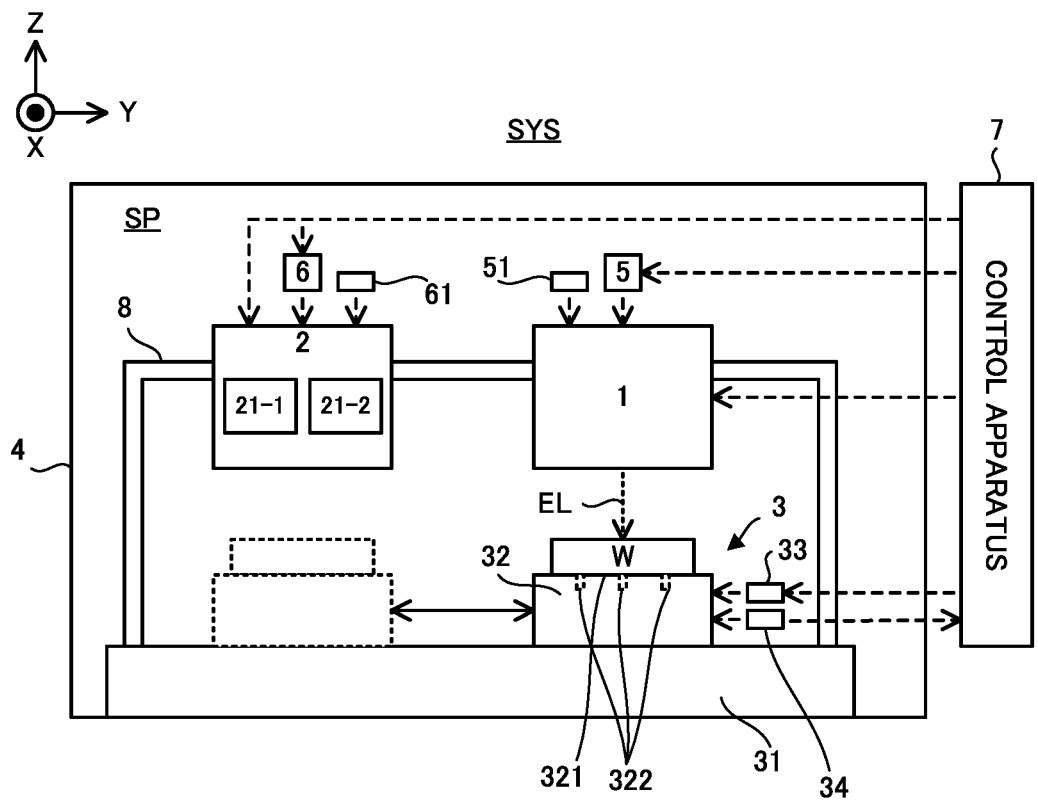
FIG. 1 is a cross-sectional view that illustrates a structure of a processing system in the present embodiment.

Firstly, with reference to FIG. 1, a structure of a processing system SYS will be described. FIG. 1 is a cross-sectional view that illustrates the structure of the processing system SYS. Note that FIG. 1 does not illustrate a cross-sectional surface of a part of the components of the processing system SYS for the purpose of simple illustration.

As illustrated in FIG. 1, the processing system SYS is provided with a processing apparatus 1, a measurement apparatus 2, a stage apparatus 3, a housing 4, a driving system 5, a driving system 6 and a control apparatus 7.

The processing apparatus 1 is configured to processes the workpiece W under the control of the control apparatus 7. The workpiece W may be a metal, may be an alloy (for example, a duralumin and the like), may be a semiconductor (for example, a silicon), may be a resin, may be a composite material such as a CFRP (Carbon Fiber Reinforced Plastic), may be a glass or may be an object that is made from any other material, for example.

The processing apparatus 1 irradiates the workpiece W with a processing light EL in order to process the workpiece W. The processing light EL may be any type of light, as long as the workpiece W is processed by irradiating the workpiece W with it. In the present embodiment, an example in which the processing light EL is a laser light will be described, however, the processing light EL may be a light a type of which is different from the laser light. Moreover, a wavelength of the processing light EL may be any wavelength, as long as the workpiece W is processed by irradiating the workpiece W with it. For example, the processing light EL may be a visible light, may be an invisible light (for example, at least one of an infrared light, an ultraviolet light and the like).

In the present embodiment, the processing apparatus 1 performs a removal processing (what we call a cutting processing or a grinding processing) for removing a part of the workpiece W by irradiating the workpiece W with the processing light EL. Note that the processing apparatus 1 may performs a processing (for example, an additive processing or a marking processing) that is different from the removal processing, as described later. The removal processing may include at least one of a surface cutting processing, a surface grinding processing, a cylindrical cutting processing, a cylindrical grinding processing, a drilling cutting processing, a drilling grinding processing, a surface polishing processing, a cutting-off processing and a carving processing for forming (in other words, carving) any character or any pattern.

Here, with reference to each of FIG. 2A to FIG. 2C, one example of the removal processing using the processing light EL will be described. Each of FIG. 2A to FIG. 2C is a cross-sectional view that illustrates an aspect of the removal processing performed on the workpiece W. As illustrated in FIG. 2A, the processing apparatus 1 irradiates an irradiation area EA set (in other words, formed) on a surface of the workpiece W with the processing light EL. When the irradiation area EA is irradiated with the processing light EL, an energy of the processing light EL is transmitted to a part of the workpiece W that is in vicinity of the irradiation area EA. When a heat caused by the energy of the processing light EL is transmitted, a material constituting the part of the workpiece W that is in vicinity of the irradiation area EA is melted due to the heat caused by the energy of the processing light EL. The melted material spatters as liquid drop. Alternatively, the melted material evaporates due to the heat caused by the energy of the processing light EL. As a result, the part of the workpiece W that is in vicinity of the irradiation area EA is removed. Namely, as illustrated in FIG. 2B, a concave part (in other words, a groove part) is formed at the surface of the workpiece W. In this case, it can be said that the processing apparatus 1 processes the workpiece W by using a principle of what we call a thermal processing. Furthermore, when the surface of the workpiece W is swept with the processing light EL, the irradiation area EA moves on the surface of the workpiece W. As a result, as illustrated in FIG. 2C, the surface of the workpiece W is partially removed along a sweeping trajectory of the processing light EL (namely, a moving trajectory of the irradiation area EA). Namely, the surface of the workpiece W is partially cut out along the sweeping trajectory of the processing light EL (namely, the moving trajectory of the irradiation area EA). Thus, the processing apparatus 1 appropriately removes a part of the workpiece W on which the removal processing should be performed by sweeping the surface of the workpiece W with the processing light EL along a desired sweeping trajectory corresponding to an area on which the removal processing should be performed.

On the other hand, the processing apparatus 1 may processing the workpiece W by using a principle of non-thermal processing (for example, an ablation processing) depending on a characteristic of the processing light EL. Namely, the processing apparatus 1 may perform the non-thermal processing (for example, the ablation processing) on the workpiece W. For example, when a pulsed light an emitting time of which is equal to or shorter than pico-second (alternatively, equal to or shorter than nano-second or femto-second in some cases) is used as the processing light EL, the material constituting the part of the workpiece W that is in vicinity of the irradiation area EA evaporates and spatters in a moment. Note that the material constituting the part of the workpiece W that is in vicinity of the irradiation area EA is sublimated without being in a melted state when the pulsed light an emitting time of which is equal to or shorter than pico-second (alternatively, equal to or shorter than nano-second or femto-second in some cases) is used as the processing light EL. Thus, as illustrated in FIG. 3A to FIG. 3C each of which is a cross-sectional view that illustrates an aspect of the workpiece W that is processed by the non-thermal processing, the concave part (in other words, the groove part) is formed at the surface of the workpiece W while reducing an influence of the heat caused by the energy of the processing light EL to the workpiece W as much as possible.

In order to performs the removal processing, as illustrated in FIG. 4 that is a cross-sectional view that illustrates a structure of the processing apparatus 1, the processing apparatus 1 is provided with a light source 11, an optical system 12, a dichroic mirror 13, an optical system 14, a returned light prevention apparatus 15 and an observation apparatus 16.

The light source 11 is configured to generate the processing light EL. When the processing light EL is a laser light, the light source 11 may be a laser diode, for example.

Moreover, the light source 11 may be a light source that is configured to pulse-oscillate. In this case, the light source 11 is configured to generate the pulsed light (for example, the pulsed light the emitting time of which is equal to or shorter than pico-second) as the processing light EL. The light source 11 emits the generated processing light EL toward the optical system 12. Note that the light source 11 may emit the processing light EL in a liner polarized state.

The optical system 12 is an optical system which the processing light EL emitted from the light source 11 enters. The optical system 12 is an optical system that emits the processing light EL entering the optical system 12 toward the returned light prevention apparatus 15.

The optical system 12 is may control a state of the processing light EL emitted from the light source 11 and emits the processing light EL a state of which is controlled toward the returned light prevention apparatus 15. For example, the optical system 12 may control a beam diameter of the processing light EL (namely, a size of the processing light EL in a plane that intersects with a propagating direction of the processing light EL). The optical system 12 may control the beam diameter (namely, a spot diameter) of the processing light EL on the surface of the workpiece W by controlling the beam diameter of the processing light EL. In this case, the optical system 12 may have a beam expander 121. For example, the optical system 12 may control a convergence degree or a divergence degree of the processing light EL emitted from the optical system 12. By this, a light concentration position (for example, what we call a best light concentration position) of the processing light EL is controlled. In this case, the optical system 12 may have a focus lens 122. The focus lens 122 is an optical element that is configured to have one or more lens and that changes the convergence degree or the divergence degree of the processing light EL to adjust the light concentration position of the processing light EL to by adjusting a position of at least one lens along an optical axis direction. Note that the focus lens 122 may be integrated with the beam expander 121, or may be separated from the beam expander 121. For example, the optical system 12 may control an intensity distribution of the processing light EL in the plane that intersects with the propagating direction of the processing light EL. In this case, the optical system 12 may have an intensity distribution control member 123 that is configured to control the intensity distribution of the processing light EL. Note that the state of the processing light EL controlled by the optical system 12 may be a number or a length of pulse of the processing light EL, an intensity of the processing light EL, the propagating direction of the processing light EL and a polarized state of the processing light EL.

The dichroic mirror 13 guides, to the optical system 14, the processing light EL entering the dichroic mirror 13 from the optical system 12 through the returned light prevention apparatus 15. The dichroic mirror 13 reflects either one of the processing light and an observation light (an illumination light IL and a reflected light ILr) a wavelength of which is different from that of the processing light and the other one passes therethrough. In an example illustrated in FIG. 4, the dichroic mirror 13 guides the processing light EL to the optical system 14 by reflecting the processing light EL toward the optical system 14. Note that the dichroic mirror 13 may guides the processing light EL to the optical system 14 by allowing the processing light EL to pass therethrough.

The optical system 14 is an optical system for irradiating (namely, guiding) the processing light EL from the dichroic mirror 13 toward the workpiece W. In order to irradiate the workpiece W with the processing light EL, the optical system 14 is provided with a Galvano mirror 141 and a fθ lens 142. The Galvano mirror 141 deflects the processing light EL so that the workpiece W is swept with the processing light EL (namely, the irradiation area EA that are irradiated with the processing light EL moves on the surface of the workpiece W). Note that a polygonal mirror may be used in addition to or instead of the Galvano mirror 141. As illustrated in FIG. 5 that is a perspective view that illustrates a structure of the optical system 14, the Galvano mirror 141 is provided with a X sweeping mirror 141X and a Y sweeping mirror 141Y. The X sweeping mirror 141X reflects the processing light EL to the Y sweeping mirror 141Y. The X sweeping mirror 141X is configured to swing or rotate in the θY direction (namely, in a rotational direction around the Y axis). Due to the swing or the rotation of the X sweeping mirror 141X, the surface of the workpiece W is swept with the processing light EL along the X axis direction. Due to the swing or the rotation of the X sweeping mirror 141X, the irradiation area EA moves on the surface of the workpiece W along the X axis direction. The Y sweeping mirror 141Y reflects the processing light EL to the fθ lens 142. The Y sweeping mirror 141Y is configured to swing or rotate in the θX direction (namely, in a rotational direction around the X axis). Due to the swing or the rotation of the Y sweeping mirror 141Y, the surface of the workpiece W is swept with the processing light EL along the Y axis direction. Due to the swing or the rotation of the Y sweeping mirror 141X, the irradiation area EA moves on the surface of the workpiece W along the Y axis direction. The fθ lens 142 is an optical element for concentrating the processing light EL from the Galvano mirror 141 on the workpiece W. Note that the X sweeping mirror 141X may be configured to swing or rotate around an axis that is slightly inclined with respect to the θY direction (namely, in the rotational direction around the Y axis), and the Y sweeping mirror 141Y may be configured to swing or rotate around an axis that is slightly inclined with respect to the θX direction (namely, in the rotational direction around the X axis). Note that the fθ lens 142 is an optical system that is telecentric at an emitting surface side (the workpiece W side), however, the fθ lens 142 may not be the telecentric optical system. When the fθ lens 142 is the optical system that is telecentric at the emitting surface side (the workpiece W side), an irradiation position of the processing light EL does not change in a XY plane even when a thickness (a size in the Z axis direction) changes, which is an advantage.

Again in FIG. 4, the returned light prevention apparatus 15 prevents a returned light ELr that is the processing light EL reflected by the workpiece W from returning the optical system 12 and the light source 11. On the other hand, the returned light prevention apparatus 15 guides the processing light EL emitted by the optical system 12 to the dichroic mirror 13 (namely, guides to the workpiece W). In order to prevent the returned light ELr from returning to the optical system 12 and the light source 11 and to guide the processing light EL to the dichroic mirror 13, the returned light prevention apparatus 15 may use a polarized light, for example. When the returned light prevention apparatus 15 using the polarized light is used, it is preferable that the light source 11 emits the processing light EL in a liner polarized state. Note that a ¼ wavelength plate may be disposed between the light source 11 and the returned light prevention apparatus 15 when the light source 11 emits the processing light EL in a circular polarized state. The returned light prevention apparatus 15 is provided with a ½ wavelength plate 151, a polarized beam splitter 152, a ¼ wavelength plate 153, a ½ wavelength plate 154 and a beam diffuser 155, for example. The ½ wavelength plate 151 changes a polarized direction of the processing light EL from the optical system 12. For example, the ½ wavelength plate 151 changes the polarized direction of the processing light EL from the optical system 12 to a direction that allows the processing light EL to pass through the polarized beam splitter 152. The processing light EL passing through the ½ wavelength plate 151 passes through the polarized beam splitter 152. Here, an example in which the polarized beam splitter 152 allows a p polarized light to pass through and a s polarized light to be reflected by a polarization split surface of the polarized beam splitter is described, for the purpose of simple description. Namely, an example in which the processing light EL passing thorough the polarized beam splitter 152 is the p polarized light will be described. The processing light EL passing thorough the polarized beam splitter 152 passes through the ¼ wavelength plate 153 to become the circular polarized light. The processing light EL passing thorough the ¼ wavelength plate 153 passes through the ½ wavelength plate 154. Here, each of the ½ wavelength plate 151, the ¼ wavelength plate 153 and the ½ wavelength plate 154 is configured to rotate around an axis along the propagating direction of the processing light EL.

The processing light EL from the ½ wavelength plate 154 enters the dichroic mirror 13 as the circular polarized light. The returned light prevention apparatus 15 guides the processing light EL to the dichroic mirror 13. On the other hand, the returned light ELr entering the returned light prevention apparatus 15 passes through the ½ wavelength plate 154 and then enters the ¼ wavelength plate 153. In this case, the returned light ELr is the processing light EL reflected by the surface of the workpiece W, a rotational direction of the returned light ELr is reversed with respect to a rotational direction of the processing light EL. Thus, the returned light ELr passing through the ¼ wavelength plate 153 is the s polarized light. As a result, the returned light ELr passing through the ¼ wavelength plate 153 is reflected by the polarized beam splitter 152. The returned light ELr reflected by the polarized beam splitter 152 is absorbed by the beam diffuser 155. Thus, the returned light prevention apparatus 15 prevents the returned light ELr from returning the optical system 12 and the light source 11. When this returned light prevention apparatus 15 is used, the processing light EL with which the workpiece W is irradiated is the circular polarized light, and thus, a variation of a processing characteristic caused by a direction of the liner polarized light is reduced. The variation of the processing characteristic may changes depending on a material of the workpiece W and an incident angle to the workpiece W. Therefore, when the processing is performed by using the processing light EL in the circular polarized state, a variation of a processed result caused by a difference in the material of the workpiece W and the incident angle to the workpiece W is reduced. Note that when the workpiece W is processed by the processing light in the liner polarized state, a ¼ wavelength plate may be disposed on an optical path between the ¼ wavelength plate 154 and the workpiece W.

The observation apparatus 16 is configured to optically observe a state of the surface of the workpiece W. For example, FIG. 4 illustrates an example in which the observation apparatus 16 is configured to optically image the state of the surface of the workpiece W. In this case, the observation apparatus 16 may be provided with a light source 161, a beam splitter 162, a notch filter 163 and an imaging element 164. The light source 161 generates the illumination light IL. The illumination light EL is the visible light, however, may be the invisible light. Note that a wavelength of the illumination light IL is different from the wavelength of the processing light EL. Especially, the wavelength of the illumination light IL is set to a wavelength that is allowed to pass through the dichroic mirror 13. The beam splitter 162 reflects, toward the notch filter 163, at least a part of the illumination light IL from the light source 161. The notch filter 163 is a filter that attenuates only a light in a partial wavelength bands of the entering illumination light IL. Note that a bandpass filter that allows only the light in the partial wavelength bands of the entering illumination light IL to pass therethrough. The notch filter 163 limits the wavelength bands of the illumination light IL that passes through the notch filter 163 to the wavelength that is allowed to pass through the dichroic mirror 13. The illumination light IL reflected by the beam splitter 162 enters the dichroic mirror 13 through the notch filter 163. The illumination light IL entering the dichroic mirror 13 passes through the dichroic mirror 13. As a result, the surface of the workpiece W is irradiated with the illumination light IL through the optical system 14. Namely, the surface of the workpiece W is irradiated with the illumination light IL through an optical path that is partially overlaps with the optical path of the processing light EL. The surface of the workpiece W is irradiated with the illumination light IL through a part of an optical system for guiding the processing light EL from the light source 11 to the workpiece W (the dichroic mirror 13 and the optical system 14 in the example illustrated in FIG. 4). Therefore, in the example illustrated in FIG. 4, a part of the optical system for guiding the processing light EL from the light source 11 to the workpiece W is shared as a part of an optical system for guiding the illumination light IL from the light source 161 to the workpiece W. Note that the optical system for guiding the processing light EL from the light source 11 to the workpiece W is optically separated from the optical system for guiding the illumination light IL from the light source 161 to the workpiece W. At least a part of the illumination light IL with which the surface of the workpiece W is irradiated is reflected by the surface of the workpiece W. As a result, the illumination light IL reflected by the workpiece W enters the optical system 14 as the reflected light ILr. The reflected light ILr enters the observation apparatus 16 through the optical system 14. The reflected light ILr entering the observation apparatus 16 enters the beam splitter 162 through the notch filter 163. Note that the illumination light IL and the reflected light ILr may be referred to as an observation light. Note that the notch filter 163 is used as a light shield member that prevents the processing light EL the wavelength of which is different from that of the observation light from entering the inside of the observation apparatus 16 (especially, the imaging element 164). At least a part of the reflected light ILr entering the beam splitter 162 passes through the beam splitter and enters the imaging element 164. As a result, the observation apparatus 16 optically images the state of the surface of the workpiece W.

An observed result of the observation apparatus 16 (specifically, an imaged result) includes information from which the state of the workpiece W is determined. Therefore, the observation apparatus 16 may be used as a measurement apparatus for measuring the workpiece W. Especially, the observed result of the observation apparatus 16 (specifically, the imaged result) includes information from which a shape of the workpiece W (especially, a shape of the surface of the workpiece W) is determined. Therefore, the observation apparatus 16 may be used as a measurement apparatus for measuring the shape of the workpiece W. In this case, it can be said that a part of the processing apparatus 1 is shared with at least a part of the measurement apparatus for measuring the workpiece W (the observation apparatus 16 in the example illustrated in FIG. 4).

Again in FIG. 1, the measurement apparatus 2 is configured to measure a measurement target object under the control of the control apparatus 7. The measurement target object includes the workpiece W, for example. For example, the measurement apparatus 2 may be an apparatus that is configured to measure the state of the workpiece W. The state of the workpiece W may include a position of the workpiece W. The position of the workpiece W may include a position of the surface of the workpiece W. The position of the surface of the workpiece W may include a position of each surface part, which is obtained by segmentalizing the surface of the workpiece W, in at least one of the X axis direction, the Y axis direction and the Z axis direction. The state of the workpiece W may include the shape of the workpiece W. The shape of the workpiece W may include the shape of the surface of the workpiece W. The shape of the surface of the workpiece W may include a direction of each surface part, which is obtained by segmentalizing the surface of the workpiece W (for example, a direction of a normal line of each surface part, and it is substantially equivalent to an inclined amount of each surface part with respect to at least one of the X axis, the Y axis and the Z axis), in addition to or instead of the above described position of the surface of the workpiece W. The state of the workpiece W may include a size (for example, a size in at least one of the X axis direction, the Y axis direction and the Z axis direction) of the workpiece W. A measurement information relating to a measured result of the measurement apparatus 2 is outputted from the measurement apparatus 2 to the control apparatus 7.

In order to measure the workpiece W, the measurement apparatus 2 may be provided with a plurality of measurement apparatuses 21 at least one of sizes (in other words, largeness) of measurement shot areas MSA and measurement resolutions are different from each other. Note that the "measurement shot area MSA" in the present embodiment is an area (in other words, a range) which the measurement apparatus 2 is allowed to measure in a state where a positional relationship between the measurement apparatus 21 and the measurement target object (for example, the workpiece W) is fixed (namely, is not changed) (see FIG. 8 and FIG. 9 described later). Note that the measurement shot area MSA may be referred to as a measurement allowable area or a measurement allowable field of the measurement apparatus 2. FIG. 1 illustrates an example in which the measurement apparatus 2 is provided with two measurement apparatuses 21 (specifically, the measurement apparatuses 21-1 and 21-2). However, the measurement apparatus 2 may be provided single measurement apparatus 21. The measurement shot area MSA of a first measurement apparatus 21 of the plurality of measurement apparatuses 21 may be wider (namely, larger) than the measurement shot area MSA of a second measurement apparatus 21, which is different from the first measurement apparatus 21, of the plurality of measurement apparatuses 21. On the other hand, the measurement resolution of the first measurement apparatus 21 the measurement shot area MSA of which is relatively wide may be lower than the measurement resolution of the second measurement apparatus 21 the measurement shot area MSA of which is relatively narrow. Namely, the measurement resolution of the second measurement apparatus 21 the measurement shot area MSA of which is relatively narrow may be higher than the measurement resolution of the first measurement apparatus 21 the measurement shot area MSA of which is relatively wide. In the example illustrated in FIG. 1, the measurement shot area MSA of the measurement apparatus 21-1 may be wider than the measurement shot area MSA of the measurement apparatus 21-2 and the measurement resolution of the measurement apparatus 21-1 may be lower than the measurement resolution of the measurement apparatus 21-2. The measurement apparatus 21-1 that measures the workpiece W by using a light section method that projects a slit light on the surface of the workpiece W and measures a shape of the projected slit light and the measurement apparatus 21-2 that measures the workpiece W by using a white light interference method that measures an interference pattern of a white light through the workpiece W and a white light not through the workpiece W are examples of the measurement apparatuses 21-1 and 21-2. The measurement apparatus 21-2 may be a Michelson interferometer, a Mirau interferometer or a Linnik interferometer. Note that the white light used here may mean a light that has a wavelength width (a spectrum width) relative to a monochromatic light. However, each measurement apparatus 21 may measure the workpiece W by using another method that is different from the light section method and the white light interference method. At least one of a pattern projection method that projects a light pattern on the surface of the workpiece W and measures a shape of the projected pattern, a time of flight method that performs an operation, which emits a light to the surface of the workpiece W and measures a distance to the workpiece W on the basis of an elapsed time until the emitted light returns, at plurality of positions on the workpiece W, a moiré topography method (specifically, a grid irradiation method or a grid projection method), a holography interference method, an auto collimation method, a stereo method, an astigmatism method, a critical angle method, a knife edge method, an interference measurement method and a confocal method is one example of another method. In any case, the measurement apparatus 21 may be provided with a light source that emits a measurement light (for example, the slit light or the white light) and a light receiver that optically receives a light (for example, a reflected light of the measurement light) from the workpiece W that is irradiated with the measurement light. The light receiver may be provided with a single photodetector, may be provided with a plurality of photodetectors that are arranged in a single dimensional direction or may be provided with a plurality of photodetectors that are arranged in a two dimensional direction.

The stage apparatus 3 is placed (namely, provided) below (namely, at the −Z side of) the processing apparatus 1 and the measurement apparatus 2. The stage apparatus 3 is provided with a surface plate 31 and a stage 32. The surface plate 31 is placed on a bottom surface of the housing 4 (or on a support surface such as a floor surface on which the housing 4 is placed). The stage 32 is placed on the surface plate 31. A non-illustrated vibration isolator that reduces a transmission of vibration from the surface plate 31 to the stage 32 may be disposed between the surface plate 31 and the bottom surface of the housing 4 or the support surface such as the floor surface on which the housing 4 is placed. Moreover, a support frame 8 that supports the processing apparatus 1 and the measurement apparatus 2 may be placed on the plate surface 8. Namely, the processing apparatus 1 and the measurement apparatus 2 (moreover, the stage 32) may be supported by the same surface plate 31. However, at least a part of the processing apparatus 1 may not be placed on the surface plate 31. At least a part of the measurement apparatus 2 may not be placed on the surface plate 31. At least a part of the processing apparatus 1 and at least a part of the measurement apparatus 2 may be placed on different plate surfaces (alternatively, other support surfaces), respectively. Note that a measurement system SYS may be configured not to have the surface plate 31. In this case, the stage 32 may be disposed on a predetermined structure of the housing 4.

The stage 32 may be made of a silica glass, or may be made of other material (for example, a stone such as a granite, a metal or a ceramic). The workpiece W is placed on the stage 32. Specifically, the surface of the stage 32 includes a placement surface 321 on which the workpiece W is allowed to be placed. The placement surface 321 is a surface that is parallel to the XY plane. The workpiece W is placed on the placement surface 321. In this case, the stage 32 may not hold the placed workpiece W. Alternatively, the stage 32 may hold the placed workpiece W. For example, the stage 32 may hold the workpiece W by vacuum-sucking and/or electrostatically sucking the workpiece W. Note that FIG. 1 illustrates an example in which at least one aperture 322 for vacuum-sucking the workpiece W is formed at the placement surface 321 of the stage 32. The stage 32 vacuum-sucks the workpiece W by sucking a rear surface of the workpiece W through the aperture 322.

The stage 32 is movable on the surface plate 31 while the workpiece W being placed thereon under the control of the control apparatus 7. The stage 32 is movable relative to at least one of the surface plate 31, the processing apparatus 1 and the measurement apparatus 2. The stage 32 is movable along each of the X axis direction and the Y axis direction. In this case, the stage 32 is movable along a stage movement plane that is parallel to the XY plane. The stage 32 may be further movable along at least one of the Z axis direction, θX direction, the θY direction and the θZ direction. In order to move the stage 32, the stage apparatus 3 is provided with a stage driving system 33. The stage driving system 33 moves the stage 32 by using any motor (for example, a linear motor and the like). Moreover, the stage apparatus 3 is provided with a position measurement device 34 for measure a position of the stage 32. The position measurement device 34 may include at least one of an encoder and a laser interferometer, for example.

When the stage 32 moves, a positional relationship between the stage 32 (moreover, the workpiece W placed on the stage 32) and each of the processing apparatus 1 and the measurement apparatus 2 changes. Namely, when the stage 32 moves, a position of the stage 32 (moreover, the workpiece W placed on the stage 32) relative to the processing apparatus 1 and the measurement apparatus 2 changes. Therefore, moving the stage 32 is equivalent to changing the positional relationship between the stage 32 (moreover, the workpiece W placed on the stage 32) and each of the processing apparatus 1 and the measurement apparatus 2.

The stage 32 may move so that at least a part of the workpiece W is located in a processing shot area PSA in at least a part of a processing period when the processing apparatus 1 processes the workpiece W. The stage 32 may move so that at least the processing shot area PSA is located on the workpiece W in at least a part of the processing period. Note that the "processing shot area PSA" in the present embodiment is an area (in other words, a range) which the measurement apparatus 2 is allowed to process in a state where a positional relationship between the processing apparatus 1 and a processing target object (for example, the workpiece W) is fixed (namely, is not changed). Typically, the processing shot area PSA is set to be an area that is same as or narrower than a swept range of the processing light EL that is deflected by the Galvano mirror 141 in a state where the positional relationship between the processing apparatus 1 and the processing target object is fixed. In other words, the processing shot area PSA is set to be an area that is same as or narrower than a range in which the irradiation area EA, which is irradiated with the processing light EL, is movable in the state where the positional relationship between the processing apparatus 1 and the processing target object is fixed. Thus, the processing shot area PSA is an area that is defined on the basis of the processing apparatus 1 (namely, an area that has a predetermined positional relationship with the processing apparatus 1). When at least a part of the workpiece W is located in the processing shot area PSA (namely, the processing shot area PSA is located on the workpiece W), the processing apparatus 1 is allowed to irradiate at least a part of the workpiece W located in the processing shot area PSA with the processing light EL. As a result, at least a part of the workpiece W is processed by the processing light EL emitted from the processing apparatus 1 in a state where the workpiece W is placed on the stage 32 (or in a state where the workpiece W is held by the stage 32). Incidentally, when the workpiece W is so large that whole of the workpiece W is not allowed to be located in the processing shot area PSA, a first part of the workpiece W is processed in a state where the first part is included in the processing shot area PSA, then, the stage 32 moves so that a second part, which is different from the first part, of the workpiece W is included in the processing shot area PSA (moreover, the processing apparatus 1 moves by a below described driving system 5, if needed), and then, the second part of the workpiece W is processed. Then, same operation is repeated until the processing of the workpiece W is completed.

The stage 32 may move so that at least a part of the workpiece W is located in the measurement shot area MSA in at least a part of a measurement period when the measurement apparatus 2 measures the workpiece W. The stage 32 may move so that at least the measurement shot area MSA is located on the workpiece W in at least a part of the measurement period. For example, when the measurement apparatus 2 is provided with the measurement apparatus 21-1 using the light section method and the measurement apparatus 21-2 using the white light interference method, the measurement shot area MSA may be typically set to be same as or narrower than a range which is allowed to be irradiated with the slit light used by the light section method and/or the white light used by the white light interference method (for example, a swept range of the slit light and/or the white light) in the state where the positional relationship between the measurement apparatus 2 and the measurement target object is fixed. The measurement shot area MSA may be set to be a range that corresponds to a light receiving surface (for example, a light receiving surface of the single photo detector or the plurality of photodetectors that are arranged in the single dimensional direction or the two dimensional direction) of the light receiver that optically receives the light from the workpiece W that is irradiated with the slit light and/or the white light. Thus, the measurement shot area MSA is an area that is defined on the basis of the measurement apparatus 2 (namely, an area that has a predetermined positional relationship with the measurement apparatus 2). When at least a part of the workpiece W is located in the measurement shot area MSA (namely, the measurement shot area MSA is located on the workpiece W), the measurement apparatus 2 is allowed to measure at least a part of the workpiece W located in the measurement shot area MSA. As a result, at least a part of the workpiece W is measured by the measurement apparatus 2 in the state where the workpiece W is placed on the stage 32 (or in the state where the workpiece W is held by the stage 32). Incidentally, when the workpiece W is so large that whole of the workpiece W is not allowed to be located in the measurement shot area MSA, a first part of the workpiece W is measured in a state where the first part is included in the measurement shot area MSA, then, the stage 32 moves so that a second part, which is different from the first part, of the workpiece W is included in the measurement shot area MSA (moreover, the measurement apparatus 2 moves by a below described driving system 6, if needed), and then, the second part of the workpiece W is measured. Then, same operation is repeated until the measurement of the workpiece W is completed. The measurement shot area MSA has a slit shape that is typically extends in a predetermined direction in the measurement apparatus 21-1 using the light section method, and thus, the workpiece W may be measured while the workpiece W is moved along a direction that intersects with a longitudinal direction of the slit by the stage 32.

The stage 32 may move between the processing shot area PSA and the measurement shot area MSA in a state where the workpiece W is placed on the stage 32. The stage 32 may move so that the workpiece W moves between the processing shot area PSA and the measurement shot area MSA in a state where the workpiece W is placed on the stage 32. Namely, the workpiece W may remain to be placed on the stage 32 in not only the processing period when the processing apparatus 1 processes the workpiece W and the measurement period when the measurement apparatus 2 measures the workpiece W but also a movement period when the workpiece W moves between the processing shot area PSA and the measurement shot area MSA. The workpiece W may remain to be placed on the stage 32 between the processing of the workpiece W by the processing apparatus 1 and the measurement of the workpiece W by the measurement apparatus 2. The workpiece W may remain to be placed on the stage 32 in a period from the processing of the workpiece W by the processing apparatus 1 to the measurement of the workpiece W by the measurement apparatus 2. The workpiece W may remain to be placed on the stage 32 in a period from the measurement of the workpiece W by the measurement apparatus 2 to the processing of the workpiece W by the processing apparatus 1. In other words, the workpiece W may not be unloaded from the stage in a period after the processing of the workpiece W by the processing apparatus 1 is completed and before the measurement of the workpiece W by the measurement apparatus 2 is started or in a period after the measurement of the workpiece W by the measurement apparatus 2 is completed and before the processing of the workpiece W by the processing apparatus 1 is started.

When the stage 32 holds the workpiece W, a holding aspect of the stage 32 that holds the workpiece W in at least a part of the processing period may be same as a holding aspect of the stage 32 that holds the workpiece W in at least a part of the measurement period. A force for holding the workpiece W is one example of the holding aspect. When the stage 32 holds the workpiece W by vacuum-sucking the workpiece W, the force for holding the workpiece W depends on an exhaust speed through the aperture 322. In this case, the exhaust speed in the processing period may be same as the exhaust speed in the measurement period in order to maintain the force for holding the workpiece W. When the stage 32 holds the workpiece W by electrostatically sucking the workpiece W, the force for holding the workpiece W depends on a voltage applied to an electrode. In this case, the voltage applied to the electrode for the electrostatic sucking in the processing period may be same as the voltage applied to the electrode for the electrostatic sucking in the measurement period in order to maintain the force for holding the workpiece W. However, the holding aspect of the stage 32 that holds the workpiece W in at least a part of the processing period may be different from the holding aspect of the stage 32 that holds the workpiece W in at least a part of the measurement period. Moreover, a weight may be placed on the workpiece W. Especially, this is effective when the workpiece W is lightweight or small.

Note that the stage 32 may be provided with a plurality of stages 32.

Note that the processing apparatus 1 and the measurement apparatus are arranged along a movement direction of the stage 32 in this example. For example, when the movement direction of the stage 32 is the Y direction, the processing apparatus 1 and the measurement apparatus are arranged along the Y direction. Here, the processing apparatus 1 and the measurement apparatus may be arranged along a direction that intersects with the movement direction of the stage 32.

Moreover, in this example, the processing apparatus 1 and the measurement apparatus are arranged along a direction that intersects with a sweeping direction of the processing light EL by the processing apparatus 1. For example, when the sweeping direction of the processing light EL by the processing apparatus 1 is the X direction, the processing apparatus 1 and the measurement apparatus are arranged along the Y direction that intersects with the X direction. Here, the processing apparatus 1 and the measurement apparatus may be arranged along the sweeping direction of the processing light EL.

The housing 4 houses the processing apparatus 1, the measurement apparatus 2 and the stage apparatus 3 in an inner housing space SP that is separated from a space outside the housing 4. Namely, in the present embodiment, the processing apparatus 1, the measurement apparatus 2 and the stage apparatus 3 are placed in the same housing 4. The processing apparatus 1, the measurement apparatus 2 and the stage apparatus 3 area located in the same housing space SP. When the workpiece W is placed on the stage 32 of the stage apparatus 3, the housing 4 houses the workpiece W in the inner housing space SP. Namely, the processing apparatus 1, the measurement apparatus 2 and the workpiece W area located in the same housing space SP. However, at least a part of the processing apparatus 1 may not be located in the housing space SP. At least a part of the processing apparatus 1 may be located outside the housing space SP. At least a part of the measurement apparatus 2 may not be located in the housing space SP. At least a part of the measurement apparatus 2 may be located outside the housing space SP. At least a part of the stage apparatus 3 may not be located in the housing space SP. At least a part of the stage apparatus 3 may be located outside the housing space SP.

Since the processing apparatus 1, the measurement apparatus 2 and the stage apparatus 3 (moreover, the workpiece W) area located in the same housing space SP as described above, the stage 32 is movable between the processing shot area PSA and the measurement shot area MSA in the state where the workpiece W is placed on the stage 32. Moreover, the same housing 4 keeps housing the workpiece W in both of at least a part of the processing period and at least a part of the measurement period. In other words, the workpiece keeps being located in the same housing 4 in both of at least a part of the processing period and at least a part of the measurement period.

The driving system 5 moves the processing apparatus 1 under the control of the control apparatus 7. The driving system 5 moves the processing apparatus 1 relative to at least one of the surface plate 31, the stage 32 and the workpiece W placed on the stage 32. The driving system 5 may move the processing apparatus 1 relative to the measurement apparatus 2. The driving system 5 moves the processing apparatus 1 along at least one of the X axis direction, the Y axis direction, the Z axis direction, the θX direction, the θY direction and the θZ direction. The driving system 5 includes a motor or the like, for example. Moreover, the processing system SYS is provided with a position measurement device 51 that is configured to measure a position of the processing apparatus 1 that is moved by the driving system 5. The position measurement device 51 may include at least one of an encoder and an interferometer, for example.

When the driving system 5 moves the processing apparatus 1, the irradiation area EA and the processing shot area PSA move on the workpiece W. Therefore, the driving system 5 is configured to change a positional relationship between the workpiece W and each of the irradiation area EA and the processing shot area PSA by moving the processing apparatus 1. However, since the stage 32 is movable, the positional relationship between the workpiece W and each of the irradiation area EA and the processing shot area PSA is changeable even when the processing apparatus 1 is not movable. Thus, the processing apparatus 1 may not be movable. In this case, the processing system SYS may not be provided with the driving system 5.

Moreover, in the present embodiment, the processing apparatus 1 may be movable along the Z axis direction, because the stage 32 is movable in the XY direction. In this case, the light concentration position of the processing light and a point of focus of the observation apparatus 16 may be controlled by moving the processing apparatus 1 in the Z axis direction.

The driving system 6 moves the measurement apparatus 2 under the control of the control apparatus 7. The driving system 6 moves the measurement apparatus 2 relative to at least one of the surface plate 31, the stage 32 and the workpiece W placed on the stage 32. The driving system 6 may move the measurement apparatus 2 relative to the processing apparatus 1. The driving system 6 moves the measurement apparatus 2 along at least one of the X axis direction, the Y axis direction, the Z axis direction, the θX direction, the θY direction and the θZ direction. The driving system 6 includes a motor or the like, for example. Moreover, the processing system SYS is provided with a position measurement device 61 that is configured to measure a position of the measurement apparatus 2 that is moved by the driving system 6. The position measurement device 61 may include at least one of an encoder and an interferometer, for example.

When the driving system 6 moves the measurement apparatus 2, the measurement shot area MSA moves on the workpiece W. Therefore, the driving system 6 is configured to change a positional relationship between the workpiece W and the measurement shot area MSA by moving the measurement apparatus 2. However, since the stage 32 is movable, the positional relationship between the workpiece W and the measurement shot area MSA is changeable even when the measurement apparatus 2 is not movable. Thus, the measurement apparatus 2 may not be movable. In this case, the processing system SYS may not be provided with the driving system 6.

Moreover, in the present embodiment, the measurement apparatus 2 may be movable along the Z axis direction, because the stage 32 is movable in the XY direction. In this case, a focus point of the measurement apparatus 2 may be controlled by moving the measurement apparatus 2 in the Z axis direction.

Incidentally, when the measurement apparatus 2 is provided with the plurality of measurement apparatuses 21, the driving system may move the plurality of measurement apparatuses 21 at one time or may move each measurement apparatus 21 separately.

The control apparatus 7 controls an operation of the processing system SYS. The control apparatus 7 may include at least one of a CPU (Central Processing Unit) and a GPU (Graphical Processing Unit) and a memory. Especially in the present embodiment, the control apparatus 7 sets a processing condition and controls the processing apparatus 1, the measurement apparatus 2, the stage apparatus 3, the driving system 5 and the driving system 6 so that the workpiece W is processed in accordance with the set processing condition. Note that the control apparatus 7 may not be located in the processing system SYS, and may be located as a server outside the processing system SYS, for example. In this case, the control apparatus 7 and the processing system SYS may be connected via a wired/wireless communication line.

(2) OPERATION OF PROCESSING SYSTEM SYS

Next, an operation performed by the processing system SYS will be described.

(2-1) Processing Operation

Firstly, with reference to FIG. 6, a processing operation (namely, an operation for processing the workpiece W) that is one of the operations performed by the processing system SYS will be described. FIG. 6 is a flowchart that illustrates a flow of the processing operation performed by the processing system SYS.

As illustrated in FIG. 6, the workpiece W, which will be processed by the processing apparatus 1, is newly placed on the stage 32 (a step S101). Namely, a non-processed workpiece W is newly placed on the stage 32. For example, the non-processed workpiece W is transported from the outside of the housing to the housing space SP in the housing 4, and then, the workpiece W transported to the housing space Ps is newly placed on the stage 32. Note that the workpiece W may be held by the stage 32.

In the present embodiment, the processing operation will be described by using, as one example, the workpiece W at the surface of which a protrusion Wp protruding toward the +Z side is formed, as illustrated in FIG. 7A that is a cross-sectional view that illustrates a cross-sectional surface of the non-processed workpiece W and FIG. 7B that is a planar view that illustrates a top surface of the non-processed workpiece W, for the purpose of a clear description. Especially in the present embodiment, the processing operation that is performed on the workpiece W to remove the protrusion Wp will be described as one example. However, the processing system SYS may process any workpiece W having a shape that is different from that of the workpiece W illustrated in FIG. 7A and FIG. 7B by performing the processing operation based on the flowchart illustrated in FIG. 6.

After the workpiece W is placed on the stage 32, the measurement apparatus 21-1 of the measurement apparatus 2 measures the workpiece W (a step S111). Specifically, firstly, the stage 32 and/or the measurement apparatus 21-1 moves so that whole (alternatively, a part in some cases) of the workpiece W is included in the measurement shot area MSA of the measurement apparatus 21-1. Then, the measurement apparatus 21-1 measures the workpiece W. Since the measurement shot area MSA of the measurement apparatus 21-1 is wider than the measurement shot area MSA of the measurement apparatus 21-2, the measurement by the measurement apparatus 21-1 is referred to as a "wide area measurement" in the present embodiment, for the purpose of a clear description.

A size of an outer edge of the measurement shot area MSA of the measurement apparatus 21-1 performing the wide area measurement may be so large that it includes whole of the surface of the workpiece W, as illustrated in FIG. 8 that is a planar view that illustrates one example of a positional relationship between the measurement shot area MSA and the workpiece W. The size of the outer edge of the measurement shot area MSA of the measurement apparatus 21-1 in the XY plane (alternatively, a surface along the surface of the workpiece W, same applies to the following description) may be larger than or same as an outer edge of the surface of the workpiece W in the XY plane. In this case, after the stage 32 moves so that the workpiece W is located in the measurement shot area MSA, the measurement apparatus 21-1 is allowed to complete the wide area measurement of the workpiece W even when the stage 32 and the measurement apparatus 21-1 do not move.

Alternatively, the size of the outer edge of the measurement shot area MSA of the measurement apparatus 21-1 may be so large that it includes a part of the surface of the workpiece W and does not include another part of the surface of the workpiece W, as illustrated in FIG. 9 that is a planar view that illustrates another example of the positional relationship between the measurement shot area MSA and the workpiece W. The size of the outer edge of the measurement shot area MSA of the measurement apparatus 21-1 in the XY plane may be smaller than the outer edge of the surface of the workpiece W in the XY plane. In this case, after the stage 32 moves so that a part of the workpiece W is located in the measurement shot area MSA, an operation for moving the stage 32 and/or the measurement apparatus 21-1 so that another part of the workpiece W, which is not yet measured by the measurement apparatus 21-1, is located in the measurement shot area MSA is repeated every time the measurement apparatus 21-1 completes measuring the part of the workpiece W located in the measurement shot area MSA, as described above. Namely, an operation for moving the measurement shot area MSA relative to the surface of the work W in at least one of the X axis direction and the Y axis direction is repeated every time the measurement apparatus 21-1 completes measuring the part of the workpiece W located in the measurement shot area MSA.

In this case, as illustrated in FIG. 10A that is a planar view that illustrates one example of a moving trajectory of the measurement shot area MSA moving relative to the surface of the workpiece W, the measurement shot area MSA may move so that the measurement shot area MSA before the movement does not overlap with the measurement shot area MSA after the movement. Namely, the measurement shot area MSA may move so that the measurement shot area MSA including a first part of the surface of the workpiece W does not overlap with the measurement shot area MSA including a second part, which is adjacent to the first part, of the surface of the workpiece W. The measurement shot area MSA may move so that the first part of the surface of the workpiece W included in the measurement shot area MSA before the movement does not overlap with the measurement shot area MSA may move so that the second part of the surface of the workpiece W included in the measurement shot area MSA after the movement. Alternatively, as illustrated in FIG. 10B that is a planar view that illustrates one example of a moving trajectory of the measurement shot area MSA moving relative to the surface of the workpiece W, the measurement shot area MSA may move so that the measurement shot area MSA before the movement partially overlaps with the measurement shot area MSA after the movement. Namely, the measurement shot area MSA may move so that the measurement shot area MSA including a first part of the surface of the workpiece W partially overlaps with the measurement shot area MSA including a second part, which is adjacent to the first part, of the surface of the workpiece W. The measurement shot area MSA may move so that the first part of the surface of the workpiece W included in the measurement shot area MSA before the movement partially overlaps with the measurement shot area MSA may move so that the second part of the surface of the workpiece W included in the measurement shot area MSA after the movement. Note that the measurement shot area MSA may move relative to the workpiece W by moving the measurement apparatus 21-1, for example, although the workpiece W is moved relative to the measurement shot area MSA in the above described description.

Again in FIG. 6, after the wide area measurement of the workpiece W is performed, the control apparatus 7 determines whether or not there is a missing part in wide area measurement information indicating the measured result of the measurement apparatus 21-1 (a step S112). The missing part herein means that information relating to the measured result of a certain part of the surface of the workpiece W is not included in the wide area measurement information. As a result of the determination at the step S112, when it is determined that there is the missing part in the wide area measurement information (the step S112: Yes), the control apparatus 7 interpolates the missing information by using an existing data interpolating method and the like (a step S113). Alternatively, the control apparatus 7 may control the measurement apparatus 21-1 and the like to measure a part of the workpiece W that corresponds to the missing information by controlling the measurement apparatus 21-1. In this case, the measurement may be performed again by changing a measurement condition (for example, a wavelength, a direction of the measurement apparatus 21-1 and the like) of the measurement apparatus 21-1.

Then, the control apparatus 7 generates a three-dimensional model data of the workpiece W on the basis of the wide area measurement information (a step S114). In the below described description, the three-dimensional model data based on the wide area measurement information is referred to as a "wide area 3D model data", for the purpose of a clear description. Note that the measurement apparatus 21-1 may not perform the wide area measurement at the step S111 when the workpiece W the wide area 3D model data of which is already generated is newly placed on the stage 32 at the step S101. Specifically, the operation from the step S111 to the step S114 for generating the wide area 3D model data may not be performed. In this case, an operation after a step S115 may be performed by using the wide area 3D model data that is already generated.

Then, the control apparatus 7 determines the position of the workpiece W in a coordinate system (a "stage coordinate system" in the below described description) that is used when the stage 32 moves (the step S115). Specifically, the measurement apparatus 21-1 measures a fiducial mark (for example, a below described aperture 93d (see FIG. 39), a marker AM (see FIG. 49) or other mark) that is formed on the surface of the workpiece W (alternatively, another member such as the surface plate 31) in advance in performing the wide area measurement at the step S111. Information relating to the measured result of the fiducial mark includes information relating to a position of the fiducial mark. Thus, the control apparatus 7 may determine a positional relationship between the fiducial mark and the workpiece W on the basis of the wide area measurement information including the measured result of the fiducial mark. Furthermore, since the fiducial mark is formed at the stage 32 (namely, a positional relationship between the fiducial mark and the stage 32 is fixed), the control apparatus 7 may determine a position of the fiducial mark in the stage coordinate system on the basis of information relating to the position (namely, the position in the stage coordinate system) of the stage 32 that is measured by the position measurement device and information relating to a positional relationship between the fiducial mark and the stage 32. As a result, the control apparatus 7 may determine the position of the workpiece W in the stage coordinate system on the basis of the information relating to the position of the fiducial mark in the stage coordinate system and the information relating to the positional relationship between the fiducial mark and the workpiece W that is measured by the wide area measurement. Note that a feature point of the stage 32 may be measured instead of measuring the fiducial mark at the stage 32.

Then, the control apparatus 7 set a processing target area TA of the workpiece W that should be actually processed by the processing apparatus 1 (a step S116). For example, the control apparatus 7 may set the processing target area TA on the basis of an instruction (for example, an instruction for setting the processing target area TA) of the user of the processing system SYS who looks the three-dimensional model of the workpiece W based on the wide area 3D model data generated at the step S114. Alternatively, for example, the control apparatus 7 may determine a part of the workpiece W that satisfies predetermined specific condition and may set the processing target area TA including the determined part. Specifically, when such a specific condition that "a surface that protrudes along the Z axis direction than a surrounding surface by a predetermined amount or more is set to be the processing target area TA" is set, the control apparatus 7 may determine the surface of the workpiece W that protrudes along the Z axis direction than the surrounding surface by the predetermined amount or more and may set the processing target area TA including the determined part. Note that, in the below described description, an example in which the processing target area TA including the protrusion Wp is set will be described as illustrated in FIG. 11A that is a cross-sectional view that illustrates one example of the positional relationship between the processing target area TA and the workpiece W and FIG. 11B that is a planar view that illustrates one example of the positional relationship between the processing target area TA and the workpiece W.

Then, the measurement apparatus 21-2 of the measurement apparatus 2 measures a processing target part W_target of the workpiece W that is included in the processing target area TA (a step S121). Note that the processing target part W_target is same as the protrusion Wp (alternatively, includes at least a part of the protrusion Wp) in the example illustrated in FIG. 11A and FIG. 11B. Specifically, firstly, the stage 32 and/or the measurement apparatus 21-2 moves so that whole (alternatively, a part in some cases) of the processing target area TA is included in the measurement shot area MSA of the measurement apparatus 21-2. Namely, the stage 32 moves so that whole (alternatively, a part in some cases) of the processing target part W_target is included in the measurement shot area MSA of the measurement apparatus 21-2. Then, the measurement apparatus 21-2 measures the processing target part W_target. Since the measurement resolution of the measurement apparatus 21-2 is higher than the measurement resolution of the measurement apparatus 21-1, the measurement by the measurement apparatus 21-2 is referred to as a "fine measurement" in the present embodiment, for the purpose of a clear description.

A size of an outer edge of the measurement shot area MSA of the measurement apparatus 21-2 performing the fine measurement may be so large that it includes whole of the processing target area TA. The size of the outer edge of the measurement shot area MSA of the measurement apparatus 21-2 in the XY plane may be larger than or same as an outer edge of the processing target area TA in the XY plane. In this case, after the stage 32 moves so that the processing target area TA is located in the measurement shot area MSA, the measurement apparatus 21-2 is allowed to complete the fine measurement of the processing target part W_target even when the stage 32 and the measurement apparatus 21-2 do not move.

Alternatively, the size of the outer edge of the measurement shot area MSA of the measurement apparatus 21-2 may be so large that it cannot include whole of the processing target area TA. The size of the outer edge of the measurement shot area MSA of the measurement apparatus 21-2 in the XY plane may be smaller than the outer edge of the processing target area TA in the XY plane. In this case, after the stage 32 moves so that the processing target area TA is located in the measurement shot area MSA, an operation for moving the stage 32 and/or the measurement apparatus 21-2 so that another part of the processing target part W_target, which is not yet measured by the measurement apparatus 21-2, is located in the measurement shot area MSA is repeated every time the measurement apparatus 21-2 completes measuring the part of the processing target part W_target located in the measurement shot area MSA, as described above. In this case, the measurement shot area MSA of the measurement apparatus 21-2 may move so that the measurement shot area MSA before the movement does not overlap with the measurement shot area MSA after the movement, as with the measurement shot area MSA of the measurement apparatus 21-1. Alternatively, the measurement shot area MSA of the measurement apparatus 21-2 may move so that the measurement shot area MSA before the movement partially overlaps with the measurement shot area MSA after the movement.

After the fine measurement of the workpiece W is performed, the control apparatus 7 generates a three-dimensional model data of the processing target part W_target on the basis of fine measurement information indicating the measured result of the measurement apparatus 21-2 (a step S122). In the below described description, the three-dimensional model data based on the fine measurement information is referred to as a "fine 3D model data", for the purpose of a clear description. Note that the measurement apparatus 21-2 may not perform the fine measurement at the step S121 when the workpiece W the fine 3D model data of which is already generated is newly placed on the stage 32 at the step S101. Specifically, the operation from the step S121 to the step S122 for generating the fine 3D model data may not be performed. In this case, an operation after a step S123 may be performed by using the fine 3D model data that is already generated. In this case, the fine 3D data may be generated by using a 3D CAD.

Moreover, the control apparatus 7 determines the position of the processing target part W_target in the stage coordinate system (a step S123). Note that an operation for determining the position of the processing target part W_target in the stage coordinate system may be performed as with the operation for determining the position of the workpiece W in the stage coordinate system (the step S116 in FIG. 6) and a detailed description thereof is omitted.

Then, the control apparatus 7 generates a slice data that corresponds to the layered-sliced three-dimensional model data of the processing target part W_target by performing a slicing process on the fine 3D model data by a predetermined slice pitch (a step S124). Specifically, firstly, the control apparatus 7 designates an amount of a standard removed thickness that is a parameter representing a thickness (namely, a length in the Z axis direction) of a removed part that is removed by one-time sweeping of the processing light EL. The amount of the standard removed thickness depends on a characteristic of the processing light EL. The characteristic of the processing light EL may include at least one of a total energy amount of the processing light EL (for example, a total amount of the energy transmitted to the workpiece W from the processing light EL), an energy amount of the processing light EL per unit area (for example, an energy amount that is transmitted to the workpiece W from the processing light EL per unit area, and it is what we call a fluence), an energy amount of the processing light EL per unit time (for example, an energy amount that is transmitted to the workpiece W from the processing light EL per unit time), a size of the irradiation area EA which is irradiated with the processing light EL and an irradiation time of the processing light EL. The characteristic of the processing light EL may include at least one of the light concentration position, the beam diameter (alternatively, the spot diameter) and the polarized state of the processing light EL. When the processing light EL is the pulsed light, the characteristic of the processing light EL may include a number of a pulse per unit time. Therefore, the control apparatus 7 designates the amount of the standard removed thickness on the basis of the characteristic of the processing light EL emitted by the processing apparatus 1. Then, the control apparatus 7 performs the slicing process on the fine 3D model data by the slice pitch corresponding to the amount of the standard removed thickness. As a result, the slice data that corresponds to a three-dimensional model data of a plurality of layered structural parts SL, which is obtained by slicing the processing target part W_target in the Z axis direction, is generated. Namely, as illustrated in FIG. 12 that is a cross-sectional view that illustrates cross-sectional surfaces of the processing target part W_target and the plurality of layered structural parts SL, the control apparatus 7 generates the slice data including a plurality of three-dimensional model data that correspond to the plurality of layered structural parts SL, respectively, constituting the processing target part W_target when they are laminated. Note that the plurality of layered structural parts SL are virtual one on the data.

Each layered structural part SL corresponds to the removed part that is removed by the sweeping of the processing light EL that is performed in the state where the positional relationship between the workpiece W and the processing apparatus 1 (especially, a positional relationship between the workpiece W and the light concentration position of the processing light EL) in the Z axis direction is fixed. Therefore, it may be considered that the processing apparatus 1 removes the plurality of layered structural parts SL in order. Specifically, firstly, a part corresponding to an uppermost layered structural part SL#1 is removed by the processing apparatus 1. Then, the stage 32 and/or the processing apparatus 1 is moved so that the processing apparatus 1 comes close to the workpiece W by the amount of the standard removed thickness. Alternatively, the optical system 12 is controlled so that the light concentration position of the processing light EL comes close to the workpiece W by the amount of the standard removed thickness. Then, a part corresponding to a layered structural part SL#2 that is under the layered structural part SL#1 by one is removed by the processing apparatus 1. Then, same operation is repeated until the parts corresponding to all layered structural parts SL are removed.

Figure 13A:
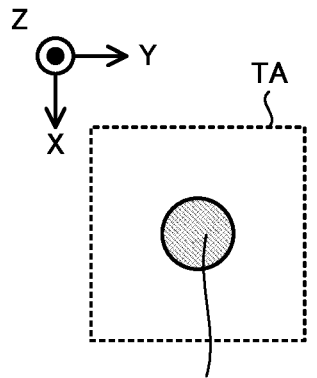
Figure 13B:
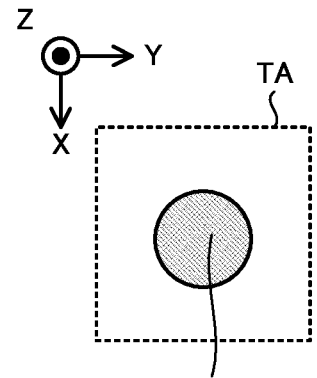
Figure 13C:
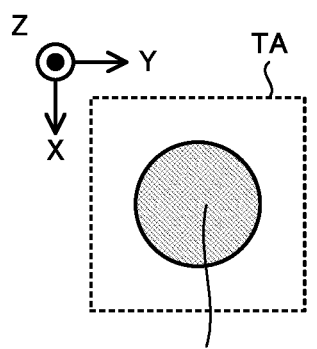
Figure 13D:
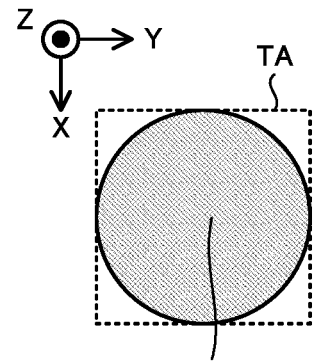

In this case, the slice data may indicate an area in which the removal processing is actually performed in the processing target area TA during a process of removing each layered structural part SL. Namely, the slice data may indicate an expected area in which the removal processing is performed in the processing target area TA during the process of removing each layered structural part SL. Actual part corresponding to the layered structural part SL exists in the area in which the removal processing is actually performed in the processing target area TA. Thus the slice data may indicate an expected area in which that the part corresponding to the layered structural part SL that should be actually removed exists at a timing when the part corresponding to the layered structural part SL is removed. The area in which the removal processing is actually performed in the processing target area TA is actually irradiated with the processing light EL. On the other hand, an area in which the removal processing is not actually performed (namely, an area in which the removal processing will not be performed) in the processing target area TA is not irradiated with the processing light EL. Thus, the slice data may indicate an area is actually irradiated with the processing light EL in the processing target area TA during the process of removing each layered structural part SL. Namely, the slice data may indicate an irradiation expected area of the irradiation light EL in the processing target area TA during the process of removing each layered structural part SL. For example, FIG. 13A schematically illustrates an example in which the slice data indicates an area in which the removal processing is actually performed in the processing target area TA during a process of removing the part corresponding to the layered structural part SL#1. FIG. 13B schematically illustrates an example in which the slice data indicates an area in which the removal processing is actually performed in the processing target area TA during a process of removing the part corresponding to the layered structural part SL#2. FIG. 13C schematically illustrates an example in which the slice data indicates an area in which the removal processing is actually performed in the processing target area TA during a process of removing a part corresponding to a layered structural part SL#3. FIG. 13D schematically illustrates an example in which the slice data indicates an area in which the removal processing is actually performed in the processing target area TA during a process of removing the part corresponding to the layered structural part SL#n (note that n is the number of the layered structural parts SL).

Again in FIG. 6, then, the control apparatus 7 sets a processing condition when the removal processing is performed on the workpiece W on the basis of the slice data generated at the step S124 (a step S125). Specifically, the control apparatus 7 sets the processing condition that defines the operation of the processing apparatus 1, the stage apparatus 3 and/or the driving system 5 that is calculated to appropriately remove the processing target part W_target of the workpiece W. Therefore, when the processing apparatus 1, the stage apparatus 3 and/or the driving system 5 operate in accordance with the set processing condition, the processing target part W_target of the workpiece W is appropriately removed.

The processing condition may include a first condition relating to the processing apparatus 1. The first condition may include a condition relating to the above described characteristic of the processing light EL. The first condition may include a condition relating to the irradiation position of the processing light EL. The first condition may include a condition relating to an irradiation timing of the processing light EL (for example, a timing when the processing light EL is emitted and/or a timing when the processing light EL is not emitted). The first condition may include a condition relating to the size and/or a shape of the irradiation area EA on the workpiece W. When the processing light EL is the pulsed light, the first condition may include a condition relating to a frequency of the pulse. When the workpiece W is swept with the processing light EL, the first condition may include a condition relating to a sweeping speed. When the processing light EL is the pulsed light and the workpiece W is swept with the processing light EL, the first condition may include a condition relating to an interval between a plurality of irradiation positions of the processing light EL (a shot interval). When the processing light EL is the pulsed light, the first condition may include a condition relating to a number of the pulse. When the processing light EL is the pulsed light, the first condition may include a condition relating to a pulse width (a temporal width). When the workpiece W is swept with the processing light EL along a plurality of sweeping lines, the first condition may include a condition relating to a pitch of the sweeping line. The first condition may include a condition relating to the movement of the processing apparatus 1 (in other words, a condition relating to the driving system 5 that moves the processing apparatus 1). The condition relating to the movement of the processing apparatus 1 may include a condition relating to at least one of a moving direction, a moving distance, a moving speed and a moving timing of the processing apparatus 1.

The processing condition may include a second condition relating to the stage apparatus 3 on which the workpiece W is placed. The second condition may include a condition relating to the movement of the stage 32 (in other words, a condition relating to the stage driving system 33 that moves the stage 32). The condition relating to the movement of the stage 32 may include a condition relating to at least one of a moving direction, a moving distance, a moving speed and a moving timing of the stage 32. When the processing apparatus 1 and/or the stage 32 moves, the positional relationship between the processing apparatus 1 and the workpiece W placed on the stage 32 changes. Thus, the processing condition may include a condition relating to the positional relationship between the processing apparatus 1 and the workpiece W. When the positional relationship between the processing apparatus 1 and the workpiece W changes, the positional relationship between the workpiece W and each of the processing shot area PSA and the irradiation area EA. Thus, the processing condition may include a condition relating to the positional relationship between the workpiece W and each of the processing shot area PSA and the irradiation area EA. Note that the processing condition may set by using a below described initial setting operation.

Then, the processing apparatus 1 starts the removal processing of the workpiece W (a step S131). Specifically, the stage 32 and/or the processing apparatus 1 moves so that the processing target area TA is located in the processing shot area PSA. Namely, the stage 32 and/or the processing apparatus 1 moves so that the workpiece W moves from the measurement shot area MSA to the processing shot area PSA. The stage 32 and/or the processing apparatus 1 moves so that the workpiece W moves from a position under the measurement apparatus 2 to a position under the processing apparatus 1. In this case, as described above, the workpiece W may remain to be placed on the stage 32. Then, the control apparatus 7 controls the processing apparatus 1, the stage apparatus 3 and the driving system 5 on the basis of the processing condition set at the step S125 to remove the parts corresponding to the plurality of layered structural parts SL in order. As a result, the plurality of layered structural parts SL are removed in order. For example, as illustrated in FIG. 14 that is a cross-sectional view that illustrates an aspect of the removal of the processing target part W_target, the processing apparatus 1 irradiates, with the processing light EL, a position at which the removal processing is actually performed (namely, a position at which the layered structural part SL exists) in the processing target area TA. As a result, the layered structural part SL that is irradiated with the processing light EL is removed.

A size of an outer edge of the processing shot area PSA may be so large that it includes whole of the processing target area TA. The size of the outer edge of the processing shot area PSA in the XY plane may be larger than or same as an outer edge of the processing target area TA in the XY plane. In this case, after the stage 32 moves so that the processing target area TA is located in the processing shot area PSA, the processing apparatus 1 is allowed to complete processing of the workpiece W even when the stage 32 and the processing apparatus 1 do not move.

Alternatively, the size of the outer edge of the processing shot area PSA may be so large that it includes a part of the processing target area TA and does not include another part of the processing target area TA. The size of the outer edge of the processing hot area PSA in the XY plane may be smaller than the outer edge of the processing target area TA in the XY plane. In this case, after the stage 32 moves so that the processing target area TA is located in the processing shot area PSA, an operation for moving the stage 32 and/or the processing apparatus 1 so that another part of the same layered structural part SL, on which the removal processing is not performed by the processing apparatus 1, is located in the processing shot area PSA is repeated every time the processing apparatus 1 completes the removal processing of the part of the layered structural part located in the processing shot area PSA. Namely, an operation for moving the processing shot area PSA relative to the workpiece W in at least one of the X axis direction and the Y axis direction is repeated every time the processing apparatus 1 completes the removal processing of the part of the layered structural part located in the processing shot area PSA.

In the present embodiment, it may be evaluated whether or not the removal processing of the processing target part W_target is appropriately performed every time the processing target part W_target is processed by a desired amount. For example, it may be evaluated whether or not the removal processing of the layered structural part SL is appropriately performed every time one layered structural part SL is removed. Alternatively, the evaluation whether or not the removal processing of the processing target part W_target is appropriately performed may be performed at not only the timing when one layered structural part SL is removed but also a desired timing in a period before the removal processing of the workpiece W is completed. In the below described description, an example in which the evaluation whether or not the removal processing of the processing target part W_target is appropriately performed is performed at the timing when one layered structural part SL is removed will be described for the purpose of a clear description.

Specifically, as illustrated in FIG. 6, the measurement apparatus 21-2 measures the processing target part W_target every time the part corresponding to the layered structural part SL is removed (a step S132). Thus, firstly, the stage 32 and/or the measurement apparatus 21-2 moves so that the processing target area TA (namely, the processing target part W_target) is included in the measurement shot area MSA of the measurement apparatus 21-2. Namely, the stage 32 moves so that the workpiece W (especially, the processing target part W_target) moves from the processing shot area PSA to the measurement shot area MSA. In this case, as described above, the workpiece W may remain to be placed on the stage 32. Then, the measurement apparatus 21-2 measures the processing target part W_target. Especially, the measurement apparatus 21-2 measures at least one of the part at which the removal processing is actually performed (namely, the part that is actually irradiated with the processing light EL) of the processing target part W_target and the part at which the removal processing is expected to be performed (namely, the part that is expected to be irradiated with the processing light EL) of the processing target part W_target.

Then, the control apparatus 7 determines whether or not a processed amount by the processing apparatus 1 is an appropriate amount that is set in advance or that is expected (a step S133). In the present embodiment, it is assumed that the processed amount is a parameter that represents a difference between a shape of the processing target part W_target before the removal processing for removing the part corresponding to a certain layered structural part SL is performed and a shape of the processing target part W_target after the removal processing for removing the part corresponding to a certain layered structural part SL is performed. For example, the processed amount by the removal processing of the part corresponding to the layered structural part SL#1 is a parameter that represents a difference between a shape of the processing target part W_target before the removal processing for removing the part corresponding to the layered structural part SL#1 is performed and a shape of the processing target part W_target after the removal processing for removing the part corresponding to the layered structural part SL#1. For example, the processed amount by the removal processing of the part corresponding to the layered structural part SL#2 is a parameter that represents a difference between a shape of the processing target part W_target before the removal processing for removing the part corresponding to the layered structural part SL#2 is performed (namely, a shape of the processing target part W_target from which the layered structural part SL#1 is removed) and a shape of the processing target part W_target after the removal processing for removing the part corresponding to the layered structural part SL#2. For example, the processed amount by the removal processing of the part corresponding to the layered structural part SL#3 is a parameter that represents a difference between a shape of the processing target part W_target before the removal processing for removing the part corresponding to the layered structural part SL#3 is performed (namely, a shape of the processing target part W_target from which the layered structural parts SL#1 and SL#2 are removed) and a shape of the processing target part W_target after the removal processing for removing the part corresponding to the layered structural part SL#3. The fine measurement information indicating the measured result of the measurement apparatus 21-2 before the removal processing is performed indicates the shape of the processing target part W_target before the removal processing is performed. The fine measurement information indicating the measured result of the measurement apparatus 21-2 after the removal processing is performed indicates the shape of the processing target part W_target after the removal processing is performed. Therefore, the control apparatus 7 is allowed to calculate the processed amount on the basis of the fine measurement information indicating the measured result of the measurement apparatus 21-2 before the removal processing is performed and the fine measurement information indicating the measured result of the measurement apparatus 21-2 after the removal processing is performed. Note that the processed amount may be referred to as a removed amount when the processing apparatus 1 performs the removal processing.

The control apparatus 7 may determine whether or not the processed amount of a comparison target part that is a part of the processing target part W_target is the appropriate amount that is set in advance or is expected for the comparison target part. In this case, the control apparatus 7 may obtain information relating to the shape of the comparison target part from each of the fine measurement information before the removal processing is performed and the fine measurement information after the removal processing is performed on the basis of information indicating to a position of the comparison target part (for example, information indicating to a position of the comparison target part in the stage coordinate system), and may calculate the processed amount of the comparison target part on the basis of the obtained information. In this case, it can be said that the control apparatus 7 substantially determines whether or not the removal processing is appropriately performed on a part at which the removal processing is expected to be performed.

In the present embodiment, since the processing apparatus 1 performs the removal processing, the processed amount may be the removed amount that is a parameter relating to a part actually removed by the removal processing. As one example, the processed amount (the removed amount) may be an amount of actual removed thickness that representing a thickness of the part actually removed by the removal processing. In this case, the control apparatus 7 may determine whether or not the processed amount is the appropriate amount by comparing the amount of the actual removed thickness with the amount of the above described standard removed thickness. For example, when a difference between the amount of the actual removed thickness and the amount of the standard removed thickness is smaller than a predetermined threshold value, the control apparatus 7 may determine that the processed amount is the appropriate amount. For example, when the difference between the amount of the actual removed thickness and the amount of the standard removed thickness is larger than the predetermined threshold value, the control apparatus 7 may determine that the processed amount is not the appropriate amount.

As a result of the determination at the step S133, when it is determined that the processed amount is not the appropriate amount (the step S133: No), it is estimated that there is a relatively high possibility that the processing condition affecting the processed amount is not appropriate. Thus, the control apparatus 7 sets the processing condition again. Specifically, the control apparatus 7 sets the processing condition again on the basis of the currently set processing condition and the fine measurement information that indicates the measured result of the processing target part W_target after the removal processing is performed (namely, the fine measurement information obtained at the step S132) (a step S134). For example, the control apparatus 7 may correct the currently set processing condition on the basis of the fine measurement information obtained at the step S132 and set the corrected processing condition to new processing condition. In this case, the control apparatus 7 may correct the currently set processing condition on the basis of the fine measurement information obtained at the step S132.

On the other hand, as a result of the determination at the step S133, when it is determined that the processed amount is the appropriate amount (the step S133: Yes), it is estimated that there is a relatively high possibility that the processing condition affecting the processed amount is appropriate. Thus, the control apparatus 7 may not set the processing condition again.

Then, the operation from the step S131 to the step S134 is repeated until the removal processing on the workpiece W is completed (namely, all layered structural parts SL are removed) (a step S135). Namely, the processing apparatus 1 performs the removal processing on the processing target part W_target that is already measured by the measurement apparatus 21-2 by irradiating the processing target part W_target that is already measured by the measurement apparatus 21-2 with the processing light EL. Then, the measurement apparatus 21-2 measures the processing target part W_target processed by the processing apparatus 1. Then, the control apparatus 7 sets the processing condition on the basis of the measured result of the measurement apparatus 21-2, if needed. The above described operation is repeated until the removal processing on the workpiece W is completed. As a result, as illustrated in FIG. 15 that is a cross-sectional view that illustrates the workpiece W on which the removal processing is completed, the processing target part W_target (the protrusion Wp in the example illustrated in FIG. 15) is removed from the workpiece W.

Note that the measurement apparatus 21-2 may not measure the processing target part W_target every time the part corresponding to the layered structural part SL is removed. As one example, the processing target part W_target is measured before and after the removal processing of the part corresponding to the uppermost layered structural part SL#1 is performed, it may be determined whether or not the processing condition is appropriate, and then, the processing condition may be set again if needed. Then, the processing target part W_target may not be measured every time the part corresponding to the layered structural part SL is removed.

(2-2) Initial Setting Operation for Setting Initial Value of Processing Condition Next, with reference to FIG. 16, the initial setting operation that is one of the operations performed by the processing apparatus SYS will be described. The initial setting operation is an operation for setting an initial value (in other words, a standard value or a default value) of the processing condition used by the above described processing operation. Especially, the initial setting operation for setting the initial value of the processing condition relating to the characteristic of the processing light EL will be described. FIG. 16 is a flowchart that illustrates a flow of the initial setting operation. Note that the processing system SYS typically performs the initial setting operation before performing the processing operation, however, may perform the initial setting operation while performing the processing operation or after completing the processing operation. The processing system SYS may perform the initial setting operation after performing a certain processing operation and before performing another processing operation next. The processing system SYS may perform the initial setting operation between one period when the workpiece W is processed and another period when the same workpiece W is processed. Moreover, when a characteristic of the workpiece W (for example, a characteristic of a material of which the workpiece W is made) that is the processing target changes, there is a possibility that the processing condition changes. Thus, when the processing system SYS performs the processing operation on another workpiece W the characteristic of which is different from that of one workpiece W after setting the initial value of the processing condition used by the processing operation on one workpiece W, the processing system SYS may set the initial value of the processing condition used by the processing operation on another workpiece W by performing the initial setting operation again. However, the processing system SYS may not necessarily perform the initial setting operation.

As illustrated in FIG. 16, firstly, the workpiece W is newly placed on the stage 32 (a step S21). The workpiece W placed on the stage 32 at the step S21 is different from the workpiece W that is expected to be processed by the above described processing operation. For example, the workpiece W placed on the stage 32 at the step S21 is a workpiece W for a test that is used to perform the initial setting operation. In the below described description, the workpiece W for a test that is used to perform the initial setting operation is referred to as a "workpiece Wt" for the purpose of a clear description, to distinguish it from the workpiece W that is expected to be processed by the above described processing operation. However, the workpiece W placed on the stage 32 at the step S21 may be the workpiece W that is expected to be processed by the above described processing operation. Namely, the workpiece W that is expected to be processed by the above described processing operation may be placed in the initial setting operation.

Then, the control apparatus 7 set the processing condition relating to the characteristic of the processing light EL to a predetermined provisional condition (a step S22). Note that the provisional condition may be a processing condition that is set in advance for the initial setting operation. Alternatively, the provisional condition may be a processing condition that is actually used as the processing condition relating to the characteristic of the processing light EL when the initial setting operation is performed.

Then, the processing apparatus 1 starts to process the workpiece Wt under the control of the control apparatus 7 (a step S23). Specifically, in the initial setting operation, the processing apparatus 1 processes a plurality of parts of the surface of the workpiece Wt. In the below description, the part, which is processed in the initial setting operation, of the surface of the workpiece Wt is referred to as a test processing surface. Therefore, the processing apparatus 1 processes each of a plurality of test processing surfaces that are set on the surface of the workpiece Wt. Thus, firstly, the stage 32 and/or the processing apparatus 1 moves so that at least a part of the plurality of test processing surfaces is located in the processing shot area PSA. Then, the processing apparatus 1 irradiates each of the plurality of test processing surfaces with the processing light EL to perform the removal processing on the test processing surfaces.

In this case, the light concentration position of the processing light EL is controlled so that the light concentration position of the processing light EL is changed for every test processing surface. Namely, the light concentration position of the processing light EL is controlled so that a positional relationship between the light concentration position of the processing light EL and the surface of the workpiece Wt in the Z axis direction is changed for every test processing surface. For example, the processing apparatus 1 irradiate a first test processing surface with the processing light EL the light concentration position of which is set at a first position, irradiate a second test processing surface with the processing light EL the light concentration position of which is set at a second position (note that the second position is different from the first position along the Z axis direction), irradiate a third test processing surface with the processing light EL the light concentration position of which is set at a third position (note that the third position is different from the first and second positions along the Z axis direction), . . . , and irradiate a k-th (note that k is an integer that represents a total number of the test processing surfaces and that is equal to or more than 2) test processing surface with the processing light EL the light concentration position of which is set at a k-th position (note that the k-th position is different from the first to k−1-th positions along the Z axis direction). In other words, the processing apparatus 1 irradiate the first test processing surface with the processing light EL in a state where the positional relationship between the light concentration position and the surface of the workpiece Wt is a first positional relationship, irradiate the second test processing surface with the processing light EL in a state where the positional relationship between the light concentration position and the surface of the workpiece Wt is a second positional relationship (note that the second positional relationship is different from the first positional relationship), irradiate the third test processing surface with the processing light EL in a state where the positional relationship between the light concentration position and the surface of the workpiece Wt is a third positional relationship (note that the third positional relationship is different from the first and second positional relationships), . . . , and irradiate the k-th test processing surface with the processing light EL in a state where the positional relationship between the light concentration position and the surface of the workpiece Wt is a k-th positional relationship (note that the k-th positional relationship is different from the first to k−1-th positional relationships).

In order to control the light concentration position, the processing apparatus 1 may control the focus lens 122. Specifically, the processing apparatus 1 may control the light concentration position by adjusting a position of at least one lens, which constitutes the focus lens 122, along the optical axis direction. The processing apparatus 1 may control the light concentration position by moving along the Z axis direction under the control of the driving system 5. The light concentration position may be controlled by moving the stage 32 along the Z axis direction.

When the light concentration position changes, the spot diameter of the processing light EL on the surface of the workpiece W and furthermore an area size of the irradiation area EA that is irradiated with the processing light EL changes. As a result, the fluence of the processing light EL on the surface of the workpiece W changes. Note that the fluence means an energy density of the processing light EL per unit area. In this case, the processing apparatus 1 irradiates the first test processing surface with the processing light EL the fluence of which is set to a first fluence value by setting the light concentration position is set at the first position, irradiates the second test processing surface with the processing light EL the fluence of which is set to a second fluence value that is different from the first fluence value by setting the light concentration position is set at the second position, irradiates the third test processing surface with the processing light EL the fluence of which is set to a third fluence value that is different from the first to second fluence values by setting the light concentration position is set at the third position, . . . , and irradiates the k-th test processing surface with the processing light EL the fluence of which is set to a k-th fluence value that is different from the first to k−1-th fluence values by setting the light concentration position is set at the k-th position. Therefore, it can be said that the processing apparatus 1 changes the fluence of the processing light EL for every test processing surface by changing the light concentration position of the processing light EL for every test processing surface. Namely, an operation for changing the light concentration position of the processing light EL for every test processing surface is substantially equivalent to an operation for changing the fluence of the processing light EL for every test processing surface.

On the other hand, the processing apparatus 1 may not change (namely, may fix) the characteristic of the processing light EL other than the light concentration position for every test processing surface. For example, the processing apparatus 1 may irradiate each of the first to k-th test processing surfaces with the processing light EL having the same characteristic other than the light concentration position. When the characteristic other than the light concentration position does not change, the total energy amount of the processing light EL (namely, the total amount of the energy transmitted to the workpiece Wt from the processing light EL) does not change even when the light concentration position changes. Thus, it can be said that the processing apparatus 1 changes the fluence of the processing light EL for every test processing surface while fixing the total energy amount of the processing light EL by changing the light concentration position of the processing light EL for every test processing surface while fixing the characteristic of the processing light EL other than the light concentration position. Namely, an operation for changing the light concentration position of the processing light EL for every test processing surface while fixing the characteristic of the processing light EL other than the light concentration position is substantially equivalent to an operation for changing the fluence of the processing light EL for every test processing surface while fixing the total energy amount of the processing light EL. Moreover, when the processing light EL is the pulsed light, the processing apparatus may consider an irradiation interval (alternatively, an irradiation pitch) that is an interval (alternatively, a pitch) on the workpiece W of the plurality of irradiation areas EA that are formed by different pulsed lights, respectively. A change of the light concentration position results in a change of the size (the spot diameter) of the irradiation area EA, and thus, an overlap ratio of the plurality of irradiation areas EA that are formed by different pulsed lights, respectively, changes. When the light concentration position is changed, another condition (as one example, a sweeping speed of the irradiation area EA and the frequency of the pulsed light) may be adjusted so that the overlap ratio is constant, because there is a possibility that a change of the overlap ratio results in a change of a processing efficiency.

After the processing of the plurality of test processing surfaces is completed, the measurement apparatus 21-2 measures the workpiece Wt (a step S24). Especially, the measurement apparatus 21-2 measures the shape of the plurality of test processing surfaces of the workpiece Wt that are processed at the step S23. Thus, firstly, the stage 32 and/or the measurement apparatus 21-2 moves so that at least a part of the plurality of processed test processing surfaces is located in the measurement shot area MSA of the measurement apparatus 21-2. Namely, the stage 32 moves so that a part of the workpiece Wt at which at least a part of the plurality of processed test processing surfaces exists moves from the processing shot area PSA to the measurement shot area MSA. In this case, the workpiece Wt may remain to be placed on the stage 32 as described above. Then, the measurement apparatus 21-2 measures the shape of the test processing surface.

Then, the control apparatus 7 determines the light concentration position that allows the processed amount to be maximum on the basis of the measured result of the measurement apparatus 21-2 at the step S24 (a step S25). Specifically, the control apparatus 7 determines the processed amount (for example, the amount of the actual removed thickness that corresponds to the thickness of the actually removed part) of each of the plurality of test processing surfaces on the basis of the measured result of the measurement apparatus 21-2 at the step S24. As a result, as illustrated in FIG. 17 that is a plot diagram in which the processed amount is plotted with respect to the light concentration position of the processing light EL, control apparatus 7 determines a relationship between the processed amount and the light concentration position of the processing light EL with which each test processing surface is irradiated. Note that a circle in FIG. 17 corresponds to a plot point at which the processed amount is plotted with respect to the light concentration position. Therefore, the control apparatus 7 determines the light concentration position that allows the processed amount to be maximum. Here, the light concentration position may be a position of a light condensed point of the processing light EL in the Z axis direction (a position in the Z axis direction at which area size of the cross-section of the processing light EL in a plane intersecting with the Z axis is maximum). Note that a horizontal axis may be replaced by the fluence in FIG. 17. Moreover, when the processing light EL is the pulsed light and the number of the pulse (an irradiation number) changes for every condition, it may be standardized by the irradiation number or the total energy amount. Note that it may be standardized by a pulse energy of one pulsed light.

In FIG. 17, the light concentration position is represented by using a distance from the surface of the workpiece Wt in the Z axis direction. The light concentration position that is away from the surface of the workpiece Wt toward the +Z side is represented by using a positive distance and the light concentration position that is away from the surface of the workpiece Wt toward the −Z side is represented by using a negative distance. As illustrated in FIG. 17, the processed amount is not necessarily maximum in a state where the light concentration position is on the surface of the workpiece Wt (namely, the spot diameter of the processing light EL on the surface of the workpiece Wt is minimum). For example, the processed amount is locally minimum in the state where the light concentration position is on the surface of the workpiece Wt. For example, the processed amount is locally maximum in the state where the light concentration position is away from the surface of the workpiece Wt toward the −Z side by a first distance DF1. For example, the processed amount is locally maximum in the state where the light concentration position is away from the surface of the workpiece Wt toward the +Z side by a second distance DF2. In this case, the light concentration position that allows the processed amount to be maximum is at least one of the light concentration position that is away from the surface of the workpiece Wt toward the +Z side by the first distance DF1 and the light concentration position that is away from the surface of the workpiece Wt toward the −Z side by the second distance DF2. Note that there is a possibility that the processed amount is not locally maximum in the state where the light concentration position is away from the surface of the workpiece Wt toward the −Z side by the first distance DF1. There is a possibility that the processed amount is not locally maximum in the state where the light concentration position is away from the surface of the workpiece Wt toward the +Z side by the second distance DF2. Moreover, there is a possibility that the processed amount is maximum in the state where the light concentration position is on the surface of the workpiece Wt.

When the light concentration position that allows the processed amount to be maximum is determined, as illustrated in FIG. 18 that is a graph that illustrates, as an approximate curve, the relationship between the light concentration position and the processed amount, the control apparatus 7 may calculate an approximate curve that indicates the relationship between the light concentration position and the processed amount and determine the light concentration position that allows the processed amount to be maximum on the basis of the approximate curve. In this case, the control apparatus 7 may determine, as the light concentration position that allows the processed amount to be maximum, the light concentration position that is different from the light concentration position actually used when the test processing surface is irradiated with the processing light EL (for example, the light concentration position between the adjacent plots). In an example illustrated in FIG. 18, the processed amount indicated by the approximate curve is locally maximum in the state where the light concentration position is away from the surface of the workpiece Wt toward the −Z side by a third distance DF3. The third distance DF3 may be same as or different from the first distance DF1. Moreover, in the example illustrated in FIG. 18, the processed amount indicated by the approximate curve is locally maximum in the state where the light concentration position is away from the surface of the workpiece Wt toward the +Z side by a fourth distance DF4. The fourth distance DF4 may be same as or different from the second distance DF2. In this case, the light concentration position that allows the processed amount to be maximum is at least one of the light concentration position that is away from the surface of the workpiece Wt toward the +Z side by the third distance DF3 and the light concentration position that is away from the surface of the workpiece Wt toward the −Z side by the fourth distance DF4. Note that the control apparatus 7 may determine the light concentration position that allows a light amount to be maximum without calculating the approximate curve that indicates the relationship between the light concentration position and the processed amount. In this case, the light concentration position that allows the processed amount to be maximum may be determined as the light concentration position among the light concentration positions that are actually used when the test processing surface is irradiated with the processing light EL.

An experiment of the inventors of the present application reveals that a possibility that the processed amount is maximum in the state where the light concentration position is away from the surface of the workpiece Wt toward the −Z side is easy to be higher than the processed amount is maximum in the state where the light concentration position is away from the surface of the workpiece Wt toward the +Z side. Thus, the processing apparatus 1 may change the light concentration position only in a range that is at the −Z side from the surface of the workpiece Wt in changing the light concentration position of the processing light EL for every test processing surface. The processing apparatus 1 may change the light concentration position so that the light concentration position is not located in a range that is at the +Z side from the surface of the workpiece Wt in changing the light concentration position of the processing light EL for every test processing surface. Namely, as illustrated in FIG. 19 that is a cross-sectional view that illustrates the positional relationship between the light concentration position and the surface of the workpiece W, the processing apparatus 1 may change the light concentration position in a range that is more distant (namely, farther) from the processing apparatus 1 than the surface of the workpiece Wt. The processing apparatus 1 may change the light concentration position so that the light concentration position is not located in a range that is closer (namely, nearer) to the processing apparatus 1 than the surface of the workpiece Wt. As a result, it is possible to reduce a time required to process the test processing surfaces, compared to the case where the light concentration position is changed in both of the range that is at the −Z side from the surface of the workpiece Wt and the range that is at the +Z side from the surface of the workpiece Wt. However, there is a possibility that the processed amount is maximum not in the state where the light concentration position is away from the surface of the workpiece Wt toward the −Z side but in the state where the light concentration position is away from the surface of the workpiece Wt toward the +Z side in some cases. Thus, the processing apparatus 1 may change the light concentration position in the range that is at the −Z side from the surface of the workpiece Wt and/or the range that is at the +Z side from the surface of the workpiece Wt in changing the light concentration position of the processing light EL for every test processing surface.

Again in FIG. 16, then, the control apparatus 7 calculates the fluence that is realized by the light concentration position determined at the step S25 (a step S26). Namely, the control apparatus 7 calculates the fluence of the processing light EL the light concentration position of which is set to the light concentration position determined at the step S25 (the step S26). Specifically, the control apparatus 7 calculates the fluence on the basis of the total energy amount of the processing light EL that is determined on the basis of an output and the like of the light source 11 (when the processing light EL is the pulsed light, the energy amount per one pulse) and the spot diameter of the processing light EL that is determined on the basis of the light concentration position (namely, the spot diameter (an area size of a spot) on the surface of the workpiece Wt. More specifically, the control apparatus 7 calculates the fluence by dividing the total energy amount of the processing light EL that is determined on the basis of the output and the like of the light source 11 by the spot diameter (the area size of the spot) of the processing light EL that is determined on the basis of the light concentration position. The fluence calculated at the step S26 corresponds to the fluence that allows the processed amount to be maximum. Namely, the fluence calculated at the step S26 corresponds to the fluence that allows the processing efficiency (specifically, the processed amount per unit energy amount) to be maximum. In the below described description, the fluence calculated at the step S26 is referred to as a "calculated fluence". The fluence calculated at the step S26 is the initial value of the fluence of the processing light EL.

Then, the control apparatus 7 determines the spot diameter of the processing light EL, which is one of the processing condition relating to the characteristic of the processing light EL, on the basis of a processing aspect that is actually performed in the processing operation performed after the initial setting operation (a step S27). For example, the finer processing is performed by the processing operation as the spot diameter of the processing light EL is smaller. Thus, the control apparatus 7 may determine the spot diameter of the processing light EL on the basis of a fineness of the processing that is to be realized in the processing operation. The spot diameter determined at the step S27 is the initial value of the spot diameter of the processing light EL.

Then, the control apparatus 7 sets the initial value of the total energy amount of the processing light EL (when the processing light EL is the pulsed light, the energy amount per one pulse) on the basis of the calculated fluence determined at the step S26 and the spot diameter determined at the step S27 (a step S28). Specifically, the control apparatus 7 sets, to the initial value of the total energy amount of the processing light EL, a value that is obtained by multiplying the calculated fluence determined at the step S26 by the spot diameter determined at the step S27. In this case, it can be said that the control apparatus 7 sets the initial value of the total energy amount of the processing light EL so that the fluence of the processing light EL becomes the calculated fluence determined at the step S26 when the workpiece W is irradiated with the processing light EL having the spot diameter determined at the step S27. Namely, it can be said that the control apparatus 7 sets the initial value of the total energy amount of the processing light EL so that the processing efficiency (specifically, the processed amount per unit energy amount) when the workpiece W is processed by using the processing light EL having the spot diameter determined at the step S27 is maximum.

When the initial value of the total energy amount of the processing light EL is determined, the initial value of the output and the like of the light source 11 is also determined on the basis of the total energy amount. Then, the control apparatus 7 may set the processing condition relating to another characteristic of the processing light EL on the basis of the set initial values (specifically, the initial value of the fluence, the initial value of the spot diameter and the initial value of the total energy amount), if needed.

Note that the workpiece Wt may remain to be placed on the stage 32 between the processing of the workpiece Wt by the processing apparatus 1 and the measurement of the workpiece Wt by the measurement apparatus 21, even in the initial setting operation.

(2-3) Temperature Drift Reduction Operation

Next, with reference to FIG. 20, a temperature drift reduction operation that is one of the operations performed by the processing apparatus SYS will be described. The temperature drift reduction operation is an operation for reducing an influence of a temperature drift that is a phenomenon that a measurement accuracy of the measurement apparatus 21 varies depending on a temperature (in other words, a heat) of the measurement apparatus 21. Typically, the measurement accuracy of the measurement apparatus 21 deteriorates when the temperature of the measurement apparatus 21 increases due to the continuous use of the measurement apparatus 2. For example, the measurement result of the measurement apparatus 21 includes a temperature drift component that is an error component caused by the temperature of the measurement apparatus 21. The temperature drift reduction operation is an operation for reducing the deterioration of the measurement accuracy of the measurement apparatus 21 caused by the inclusion of the temperature drift component. Especially in the present embodiment, the temperature drift reduction operation for reducing the deterioration of the measurement accuracy of the position of the workpiece W in the Z axis direction (specifically, reducing an influence of the temperature drift component in the Z axis direction) will be described as one example.

The processing system SYS may perform the temperature drift reduction operation before the above described processing operation is performed. The processing system SYS may perform the temperature drift reduction operation after the above described processing operation is performed. The processing system SYS may perform the temperature drift reduction operation in a period when the above described processing operation is performed. The processing system SYS may perform the temperature drift reduction operation after performing a certain processing operation and before performing another processing operation next. The processing system SYS may perform the temperature drift reduction operation between one period when the workpiece W is processed and another period when the same workpiece W is processed. The processing system SYS may perform the temperature drift reduction operation before the measurement apparatus 21 measures the workpiece W. The processing system SYS may perform the temperature drift reduction operation after the measurement apparatus 21 measures the workpiece W. The processing system SYS may perform the temperature drift reduction operation in a period when the measurement apparatus 21 measures the workpiece W. The processing system SYS may perform the temperature drift reduction operation every time the measurement apparatus 21 measures the workpiece W. The processing system SYS may perform the temperature drift reduction operation every time a predetermined time elapses after the measurement apparatus 21 starts to be used. The processing system SYS may perform the temperature drift reduction operation every time the measurement apparatus 21 measures the workpiece W a predetermine time. However, the processing system SYS may not necessarily perform the temperature drift reduction operation.

In the present embodiment, the processing system may perform at least one of a first temperature drift reduction operation to a third temperature drift reduction operation. Next, the first temperature drift reduction operation to the third temperature drift reduction operation will be described in order.

(2-3-1) First Temperature Drift Reduction Operation

Firstly, with reference to FIG. 20, the first temperature drift reduction operation will be described. FIG. 20 is a flowchart that illustrates a flow of the first temperature drift reduction operation.

As illustrated in FIG. 20, firstly, the measurement apparatus 21 measures a Z fiducial surface BSz (a step S311). Specifically, the stage 32 and/or the measurement apparatus 21 moves so that whole (alternatively, a part in some cases) of the Z fiducial surface BSz is included in the measurement shot area MSA of the measurement apparatus 21. Then, the measurement apparatus 21 measures the Z fiducial surface BSz.

The Z fiducial surface BSz may be a part of the surface of the stage 32. For example, as illustrated in FIG. 21A that is a cross-sectional view that illustrates a cross-sectional surface of the stage apparatus 3 and FIG. 21B that is a planar view that illustrates a top surface of the stage apparatus 3, the Z fiducial surface BSz may be at least a part of an outer circumference surface 323, which is located around the placement surface 321 on which the workpiece W is placed, of the surface of the stage 32. Alternatively, as illustrated in FIG. 22A that is a cross-sectional view that illustrates a cross-sectional surface of the stage apparatus 3 and FIG. 22B that is a planar view that illustrates a top surface of the stage apparatus 3, the Z fiducial surface BSz may be at least a part of a surface of the surface plate 31. The Z fiducial surface BSz may be at least a part of a surface of another member.

After or before the Z fiducial surface BSz is measured, the measurement apparatus 21 measures the workpiece W (a step S312). Specifically, the stage 32 and/or the measurement apparatus 21 moves so that whole (alternatively, a part in some cases) of the workpiece W is included in the measurement shot area MSA of the measurement apparatus 21. Then, the measurement apparatus 21 measures the workpiece W. Note that the operation at the step S312 may be performed as a part of the measurement operation of the workpiece W in the above described processing operation (the step S111 or S121 in FIG. 6). Therefore, when the first temperature drift reduction operation is performed, the processing system SYS may performs the operation at the step S311 in FIG. 20 (namely, the measurement of the Z fiducial surface BSz) after or before the operation at each of the step S111 or S121 in FIG. 6.

Then, the control apparatus 7 calculates the position (especially, the position in the Z axis direction) of the workpiece W on the basis of the measured result of the Z fiducial surface BSz and the measured result of the workpiece W (a step S313). Note that the operation at the step S313 may be performed as a part of the operation for generating the three-dimensional model data (the step S114 or S122 in FIG. 6) and the operation for determining the position of the workpiece W or the processing target area TA (the step S115 or S123 in FIG. 6) in the above described processing operation.

Specifically, the control apparatus 7 calculates a position (namely, a height) of the Z fiducial surface BSz in the Z axis direction on the basis of the measured result of the Z fiducial surface BSz. Moreover, the control apparatus 7 calculates the position (namely, a height) of the workpiece W in the Z axis direction on the basis of the measured result of the workpiece W. Both of the position of the Z fiducial surface BSz and the position of the workpiece W includes the temperature drift component. In this case, a difference between the position of the Z fiducial surface BSz and the position of the workpiece W does not include the temperature drift component. Namely, a relative position of the workpiece W relative to the Z fiducial surface BSz does not include the temperature drift component. This is because the temperature drift component included in the position of the Z fiducial surface BSz and the temperature drift component included in the position of the workpiece W cancel out each other by subtracting the position of the Z fiducial surface BSz from the position of the workpiece W. Therefore, the control apparatus 7 calculates the relative position of the workpiece W relative to the Z fiducial surface BSz in the Z axis direction on the basis of the position of the Z fiducial surface BSz and the position of the workpiece W. In the subsequent process, the control system SYS uses, as information relating to the position of the workpiece W in the Z axis direction, information relating to the relative position of the workpiece W relative to the Z fiducial surface BSz in the Z axis direction, instead of information relating to the position of the workpiece W in the Z axis direction that is calculated from the measured result of the workpiece W. As a result, the processing system SYS performs the processing operation without being affected by the temperature drift component. For example, as illustrated in FIG. 23 that is a graph that illustrates a temporal transition of the position of the workpiece W in a Z axis direction calculated by the control apparatus 7, the temperature drift component is not included or is not easily included in the position (a solid line) of the workpiece W that is calculated when the first temperature drift reduction operation is performed, compared to the position (a dashed line) of the workpiece W that is calculated when the temperature drift reduction operation is not performed.

Note that the processing system SYS may perform the first temperature drift reduction operation for reducing the deterioration of the measurement accuracy of the position of the workpiece W in a direction (for example, at least one of the X axis direction and the Y axis direction) that is different from the Z axis direction by performing an operation that is same as the first temperature drift reduction operation for reducing the deterioration of the measurement accuracy of the position of the workpiece W in the Z axis direction. In this case, however, the control apparatus 7 may calculate the position of the Z fiducial surface BSz (alternatively, another fiducial surface) in the direction that is different from the Z axis direction on the basis of the measured result of the Z fiducial surface BSz (alternatively, another fiducial surface), calculate the position of the workpiece W in the direction that is different from the Z axis direction on the basis of the measured result of the workpiece W, and calculate the relative position of the workpiece W relative to the Z fiducial surface BSz (alternatively, another fiducial surface) in the direction that is different from the Z axis direction.

(2-3-2) Second Temperature Drift Reduction Operation

Next, with reference to FIG. 24, the second temperature drift reduction operation will be described. FIG. 24 is a flowchart that illustrates a flow of the second temperature drift reduction operation. Note that a detailed description of an operation that is same as the operation performed in the above described first temperature drift reduction operation is omitted by assigning same step number to it.

As illustrated in FIG. 24, firstly, the measurement apparatus 21 measures the Z fiducial surface BSz (the step S311).

Then, in the second temperature drift reduction operation, the control apparatus 7 estimates the temperature drift component included in the measured result of the measurement apparatus 21 on the basis of the measured result of the Z fiducial surface BSz (a step S321). Note that the operation at the step S321 may be performed as a part of the operation for generating the three-dimensional model data (the step S114 or S122 in FIG. 6) and the operation for determining the position of the workpiece W or the processing target area TA (the step S115 or S123 in FIG. 6) in the above described processing operation.

Specifically, in the second temperature drift reduction operation, it is a premise that at least a part of a surface of a member, a position in the Z axis direction of which is known to the control apparatus 7, is used as the Z fiducial surface BSz. Moreover, at least a part of a surface of a member, a position in the Z axis direction of which does not change (alternatively, changes only slightly), is used as the Z fiducial surface BSz. The surface plate 31 is one example of the member that satisfies this requirement. Note that the surface plate 31 may be made of a low-thermal expansion ceramic or a low-thermal expansion glass. When the Z fiducial surface BSz that satisfies this requirement is used, information relating to a designed position of the Z fiducial surface BSz is known to the control apparatus 7. Therefore, when the measurement accuracy of the measurement apparatus 21 does not change due to the temperature of the measurement apparatus 21, the position of the Z fiducial surface BSz in the Z axis direction calculated on the basis of the measured result of the measurement apparatus 21 must be same as the designed position. On the other hand, when the position of the Z fiducial surface BSz in the Z axis direction calculated on the basis of the measured result of the measurement apparatus 21 is not same as the designed position, there is a relatively high possibility that the temperature drift affects the position of the Z fiducial surface BSz in the Z axis direction calculated on the basis of the measured result of the measurement apparatus 21. In this case, there is a relatively high possibility that a difference between the position of the Z fiducial surface BSz in the Z axis direction calculated on the basis of the measured result of the measurement apparatus 21 and the designed position corresponds to the temperature drift component. Thus, the control apparatus 7 firstly calculates the position of the Z fiducial surface BSz in the Z axis direction on the basis of the measured result of the Z fiducial surface BSz. Then, the control apparatus 7 calculates the difference between the calculated position of the Z fiducial surface BSz and the designed position of the Z fiducial surface BSz. The calculated difference is used as an estimated value of the temperature drift component.

After or before the Z fiducial surface BSz is measured, the measurement apparatus 21 measures the workpiece W (the step S312). As one example, the measurement apparatus may measure the Z fiducial surface BSz after or before measuring the workpiece W. In this case, as the temperature drift component, the temperature drift component between a timing when the Z fiducial surface BSz is measured before the workpiece W is measured and a timing when the Z fiducial surface BSz is measured after the workpiece W is measured. Then, the control apparatus 7 corrects the measured result of the workpiece W on the basis of the temperature drift component estimated at the step S321 (a step S322). Note that the operation at the step S322 may be performed as a part of the operation for generating the three-dimensional model data (the step S114 or S122 in FIG. 6) and the operation for determining the position of the workpiece W or the processing target area TA (the step S115 or S123 in FIG. 6) in the above described processing operation.

Specifically, the control apparatus 7 calculates the position of the workpiece W in the Z axis direction on the basis of the measured result of the workpiece W. The calculated position of the workpiece W includes the temperature drift component. Thus, the control apparatus 7 subtracts the temperature drift component estimated at the step S321 from the calculated position of the workpiece W. Namely, the control apparatus 7 removes the temperature drift component estimated at the step S321 from the calculated position of the workpiece W. As a result, as illustrated in FIG. 25 that is a graph that schematically illustrates a distribution in the XY plane of the position of the workpiece W in the Z axis direction, the control apparatus 7 obtains information relating to the position of the workpiece W in which the temperature drift component is not included. In the subsequent process, the control system SYS uses, as information relating to the position of the workpiece W in the Z axis direction, information relating to the position of the workpiece W from which the temperature drift component is subtracted, instead of the information relating to the position of the workpiece W in the Z axis direction that is calculated from the measured result of the workpiece W. As a result, the processing system SYS performs the processing operation without being affected by the temperature drift component.

Note that the processing system SYS may perform the second temperature drift reduction operation for reducing the deterioration of the measurement accuracy of the position of the workpiece W in a direction (for example, at least one of the X axis direction and the Y axis direction) that is different from the Z axis direction by performing an operation that is same as the second temperature drift reduction operation for reducing the deterioration of the measurement accuracy of the position of the workpiece W in the Z axis direction. In this case, however, the Z fiducial surface BSz (alternatively, another fiducial surface) is a surface a position in the direction different from the Z axis direction of which is known to the control apparatus 7 and a position in the direction different from the Z axis direction of which does not change (alternatively, changes only slightly). Moreover, the control apparatus 7 may calculate the position of the Z fiducial surface BSz (alternatively, another fiducial surface) in the direction that is different from the Z axis direction on the basis of the measured result of the Z fiducial surface BSz (alternatively, another fiducial surface), estimate the temperature drift component (especially, the temperature drift component in the direction that is different from the Z axis direction) on the basis of the measured result of the Z fiducial surface BSz (alternatively, another fiducial surface), and correct the measured result of the workpiece W on the basis of the estimated temperature drift component.

(2-3-3) Third Temperature Drift Reduction Operation

Next, with reference to FIG. 26, the third temperature drift reduction operation will be described. FIG. 26 is a flowchart that illustrates a flow of the third temperature drift reduction operation. Note that a detailed description of an operation that is same as the operation performed in the above described first or second temperature drift reduction operation is omitted by assigning same step number to it.

As illustrated in FIG. 26, firstly, the control apparatus 7 obtains temperature information relating to the temperature of the measurement apparatus 21 (a step S331). For example, the control apparatus 7 may obtain the temperature information from a temperature sensor that detects the temperature of the measurement apparatus 21. For example, the control apparatus 7 may estimate the temperature of the measurement apparatus 21 on the basis of an operating state of the measurement apparatus 21. Note that an operating time (a time during which it is powered on) may be used as the operating state of the measurement apparatus 21. Moreover, the control apparatus may estimate the temperature of the measurement apparatus 21 on the basis of an operating state of a device that is related to the measurement apparatus 21. A device that controls the temperature of the measurement apparatus 21 itself is one example of the device that is related to the measurement apparatus 21.

Then, the control apparatus 7 estimates the temperature drift component on the basis of the temperature information (a step S332). Specifically, considering that the temperature drift component is generated due to the increase of the temperature of the measurement apparatus 21, there is a relatively high possibility that the temperature drift component is correlated to the temperature of the measurement apparatus 21. Thus, the control apparatus 7 estimates the temperature drift component on the basis of the temperature information. For example, the control apparatus 7 may estimate the temperature drift component on the basis of the temperature information and a correlation information that indicates a correlation between the temperature drift component and the temperature of the measurement apparatus 21.

After or before the operation from the step S331 to the step S332, the measurement apparatus 21 measures the workpiece W (the step S312). Therefore, when the third temperature drift reduction operation is performed, the processing system SYS may perform the operation from the step S331 to the step S332 in FIG. 26 (namely, an operation for estimating the temperature drift component) after or before the operation at each of the steps S111 and S121 in FIG. 6.

Then, the control apparatus 7 corrects the measured result of the workpiece W on the basis of the temperature drift component estimated at the step S332 even in the third temperature drift reduction operation, as with the second temperature drift reduction operation (the step S322). As a result, the processing system SYS performs the processing operation without being affected by the temperature drift component.

Note that the processing system SYS may perform the third temperature drift reduction operation for reducing the deterioration of the measurement accuracy of the position of the workpiece W in a direction (for example, at least one of the X axis direction and the Y axis direction) that is different from the Z axis direction by performing an operation that is same as the third temperature drift reduction operation for reducing the deterioration of the measurement accuracy of the position of the workpiece W in the Z axis direction. Namely, the control apparatus 7 may estimate the temperature drift component in the direction that is different from the Z axis direction and corrects the measured result of the workpiece W on the basis of the estimated temperature drift component.

(2-4) Tilt Measurement Operation

Next, a tilt measurement operation that is one of the operations performed by the processing apparatus SYS will be described. The tilt measurement operation is an operation for measuring a tilt amount (especially, a tilt amount in each of the θX direction and the θY direction) of each of the processing apparatus 1 and the measurement apparatus 2 relative to the stage 32.

(2-4-1) Technical Problem Caused by Tilt

Firstly, with reference to FIG. 27A to FIG. 27D, a technical problem caused when each of the processing apparatus 1 and the measurement apparatus 2 tilts relative to (is inclined with respect to) the stage 32.

FIG. 27A is a cross-sectional view that illustrates the measurement apparatus 2 that tilts relative to the stage 32. Incidentally, when the measurement apparatus 2 is provided with the plurality of measurement apparatuses 21, the tilt of the measurement apparatus 2 relative to the stage 32 may mean the tilt of the each measurement apparatus 21 relative to the stage 32. A state where the measurement apparatus 2 tilts relative to the stage 32 may include a state where the measurement apparatus 2 tilts. The state where the measurement apparatus 2 tilts may include a state where the measurement apparatus 2 tilts relative to a designed arrangement of the measurement apparatus 2. The state where the measurement apparatus 2 tilts relative to the stage 32 may include a state where the stage 32 tilts. The state where the stage 32 tilts may include a state where the stage 32 tilts relative to a designed arrangement of the stage 32. For example, when a state where the placement surface 321 of the stage 32 is a surface that is parallel to the XY plane is the designed arrangement, the state where the stage 32 tilts may include a state where the placement surface 321 tilts relative to the XY plane.

FIG. 27B is a cross-sectional view that illustrates the shape of the workpiece W calculated from the measured result of the measurement apparatus 21 under a situation illustrated in FIG. 27A. As illustrated in FIG. 27B, when the measurement apparatus 2 tilts relative to the stage 32 (in other words, the stage 32 tilts relative to the measurement apparatus 2), the shape of the workpiece W calculated from the measured result of the measurement apparatus 21 is different from the actual shape. For example, in an example illustrated in FIG. 27A and FIG. 27B, the shape of the workpiece W calculated from the measured result of the measurement apparatus 21 is a shape that the surface of the workpiece W tilts relative to the placement surface 321, although the actual shape of the workpiece W is a shape that the surface of the workpiece W is parallel to the placement surface 321. This is because the tilt of the measurement apparatus 2 is not considered at all. Namely, the shape of the workpiece W calculated from the measured result of the measurement apparatus 21 is the shape that the surface of the workpiece W tilts relative to the XY plane, although the actual shape of the workpiece W is a shape that the surface of the workpiece W is parallel to the XY plane.

In this situation, a case where the removal processing of the workpiece W is performed so that the surface of the workpiece W is parallel to the XY plane. In this case, since the surface of the workpiece W is parallel to the XY plane before the processing, the processing target part W_target having constant thickness should be the part that is to be removed by the removal processing, as illustrated in FIG. 27A. However, when the measurement apparatus 2 tilts relative to the stage 32, the control apparatus 7 falsely recognizes that the surface of the workpiece W tilts relative to the XY plane, as illustrated in FIG. 27B. As a result, the processing target part W_target the thickness of which changes in the direction along the XY plane is set as the part that is to be removed by the removal processing, as illustrated in FIG. 27B. As a result, as illustrated in FIG. 27C that is a cross-sectional view that illustrates the workpiece W processed by the processing apparatus 1 under the situation where the measurement apparatus 2 tilts relative to the stage 32, the processing apparatus 1 processes the workpiece W so that the processed amount changes in the direction along the XY plane, although the processing apparatus 1 should process the workpiece W so that the processed amount (for example, the amount of the actual removed thickness) is constant in the direction along the XY plane. Thus, the surface of the processed workpiece W tilts relative to the XY plane, although the surface of the processed workpiece W should be parallel to the XY plane.

Thus, in the present embodiment, the processing system SYS performs the tilt measurement operation for measuring the tilt amount of the measurement apparatus 2 relative to the stage 32. Moreover, the processing system SYS performs the processing operation on the basis of the measured tilt amount so that the workpiece W is processed in the same manner as the case where the measurement apparatus 2 does not tilt relative to the stage 32 even when the measurement apparatus 2 tilts relative to the stage 32. For example, the control apparatus 7 may correct the measured result of the measurement apparatus 2 on the basis of the measured tilt amount so that an influence of the tilt of the measurement apparatus 2 relative to the stage 32 is reduced. As one example, the control apparatus 7 may correct the measured result of the measurement apparatus 2 so that the measured result of the measurement apparatus 2 when the measurement apparatus 2 tilts relative to the stage 32 is same as the measured result of the measurement apparatus 2 when the measurement apparatus 2 does not tilt relative to the stage 32. For example, the control apparatus 7 may move the measurement apparatus 2 by using the driving system 6 and/or may move the stage 32 by using the stage driving system 33 on the basis of the measured tilt amount so that the measurement apparatus 2 does not tilt relative to the stage 32. For example, the control apparatus 7 may set the processing target part W_target (for example, may set the processing target area TA) on the basis of the measured tilt amount so that the influence of the tilt of the measurement apparatus 2 relative to the stage 32 is reduced. As one example, the control apparatus 7 may set the processing target part W_target so that the processing target part W_target that is set when the measurement apparatus 2 tilts relative to the stage 32 is same as the processing target part W_target that is set when the measurement apparatus 2 does not tilt relative to the stage 32. For example, the control apparatus 7 may control the processing apparatus 1 on the basis of the measured tilt amount so that the influence of the tilt of the measurement apparatus 2 relative to the stage 32 is reduced. As one example, the control apparatus 7 may control the processing apparatus 1 so that the part that is processed by the processing apparatus 1 when the measurement apparatus 2 tilts relative to the stage 32 is same as the part that is processed by the processing apparatus 1 when the measurement apparatus 2 does not tilt relative to the stage 32. The control of the processing apparatus 1 may include at least one of a control of the position of the processing apparatus 1 (namely, a control of the driving system 5 that moves the processing apparatus 1), a control of the optical system 12 and a control of the optical system 14 (especially, the Galvano mirror 141). As a result, as illustrated in FIG. 27D that is a cross-sectional view that illustrates the workpiece W processed so that the influence of the tilt of the measurement apparatus 2 relative to the stage 32 is reduced, the processing apparatus 1 processes the workpiece W so that the processed amount (for example, the amount of the actual removed thickness) in the direction along the XY plane, even when the measurement apparatus 2 tilts relative to the stage 32.

Moreover, even when the processing apparatus 1 tilts relative to the stage 32, there is a possibility that the processing apparatus 1 processes the workpiece W in a processing aspect that is different from a processing aspect in which the processing should be performed due to the tilt of the processing apparatus 1 relative to the stage, as with the case where the measurement apparatus 2 tilts relative to the stage 32, although its detailed description is omitted for the purpose of simple description. Thus, in the present embodiment, the processing system SYS performs the tilt measurement operation for measuring the tilt amount of the processing apparatus 1 relative to the stage 32. Moreover, the processing system SYS processes, on the basis of the measured tilt amount, the workpiece W in the same manner as the case where the processing apparatus 1 does not tilt relative to the stage 32 even when the processing apparatus 1 tilts relative to the stage 32. For example, the control apparatus 7 may control the processing apparatus 1 on the basis of the measured tilt amount so that an influence of the tilt of the processing apparatus 1 relative to the stage 32 is reduced. As one example, the control apparatus 7 may control the processing apparatus 1 so that the part that is processed by the processing apparatus 1 when the processing apparatus 1 tilts relative to the stage 32 is same as the part that is processed by the processing apparatus 1 when the processing apparatus 1 does not tilt relative to the stage 32. As a result, the processing apparatus 1 processes the workpiece W in the processing aspect in which the processing should be performed, even when the processing apparatus 1 tilts relative to the stage 32.

The processing system SYS may perform the tilt measurement operation before the above described processing operation is performed. The processing system SYS may perform the tilt measurement operation after the above described processing operation is performed. The processing system SYS may perform the tilt measurement operation in a period when the above described processing operation is performed. The processing system SYS may perform the tilt measurement operation after performing a certain processing operation and before performing another processing operation next. The processing system SYS may perform the tilt measurement operation between one period when the workpiece W is processed and another period when the same workpiece W is processed. The processing system SYS may perform the tilt measurement operation before the measurement apparatus 21 measures the workpiece W. The processing system SYS may perform the tilt measurement operation after the measurement apparatus 21 measures the workpiece W. The processing system SYS may perform the tilt measurement operation in a period when the measurement apparatus 21 measures the workpiece W. The processing system SYS may perform the tilt measurement operation every time a predetermined time elapses after the processing system SYS starts to operate.

Next, a first tilt measurement operation for measuring the tilt amount of the measurement apparatus 2 relative to the stage 32 and a second tilt measurement operation for measuring the tilt amount of the processing apparatus 1 relative to the stage 32 will be described in order.

(2-4-2) First Tilt Measurement Operation for Measuring Tilt Amount of Measurement Apparatus 2 Relative to the Stage 32

Firstly, with reference to FIG. 28, the first tilt measurement operation for measuring the tilt amount of the measurement apparatus 2 relative to the stage 32 will be described. FIG. 28 is a flowchart that illustrates a flow of the first tilt measurement operation for measuring the tilt amount of the measurement apparatus 2 relative to the stage 32. Incidentally, when the measurement apparatus 2 is provided with the plurality of measurement apparatuses 21, the first tilt measurement operation may be performed on each measurement apparatus 21. For example, when the measurement apparatus 2 is provided with the measurement apparatuses 21-1 and 21-2, the first tilt measurement operation for measuring the tilt amount of the measurement apparatus 21-1 relative to the stage 32 and the first tilt measurement operation for measuring the tilt amount of the measurement apparatus 21-2 relative to the stage 32 may be performed separately. Alternatively, when the measurement apparatus 2 is provided with the plurality of measurement apparatuses 21, the first tilt measurement operation may be performed on specific measurement apparatus 21. In this case, the tilt amount measured by the first tilt measurement operation may be used as not only the tilt amount of the measurement apparatus 21 on which the first tilt measurement operation is actually performed but also the tilt amount of another measurement apparatus 21. Namely, the tilt amount measured by the first tilt measurement operation may be used as the tilt amount of each of the plurality of the measurement apparatuses 2.

As illustrated in FIG. 28, firstly, a fiducial member BM is newly placed on the stage 32 (a step S411). The fiducial member BM is a member on a surface of which a predetermined pattern, which is used to measure the tilt amount of the measurement apparatus 2 relative to the stage 32, is formed. FIG. 29 and FIG. 30A to FIG. 30B illustrates examples of the fiducial member BM. For example, as illustrated in FIG. 29 that is a planar view that illustrates a fiducial member BM1 that is one example of the fiducial member BM, the fiducial member BM may be the fiducial member BM1 on a surface (especially, a surface along the XY plane) of which dot patterns DP having any shapes are regularly formed. Note that FIG. 29 illustrates an example of the fiducial member BM1 in which the rectangular dot patterns DP are formed in a matrix (namely, regularly in each of the X axis direction and the Y axis direction, in other word, at a predetermined cycle in the X axis direction and the Y axis direction). The fiducial member BM1 may be referred to as a pattern reticle. For example, as illustrated in FIG. 30A that is a planar view that illustrates a fiducial member BM2 that is one example of the fiducial member BM and FIG. 30B that is a cross-sectional view that illustrates the fiducial member BM2, the fiducial member BM may be the fiducial member BM2 on a surface (especially, a surface along the XY plane) of which a plurality of block patterns BP are formed. The plurality of block patterns BP may be integrated with the fiducial member BM2 or may be detachable from the fiducial member BM2. The plurality of block patterns BP may include a plurality of block pattern BP1 having different sizes in a direction along the XY plane (the X axis direction in an example illustrated in FIG. 30A). The plurality of block patterns BP may include a plurality of block pattern BP2 having different sizes in a direction intersecting with the XY plane (the Z axis direction in an example illustrated in FIG. 30B). Namely, the plurality of block patterns BP may include the plurality of block pattern BP2 having different heights in the direction intersecting with the XY plane (the Z axis direction in an example illustrated in FIG. 30B). Note that the block pattern BP2 has a shape that protrudes from the fiducial member BM2 in the example illustrated in FIG. 30B, however, may have a shape that is carved in the fiducial member BM2.

Moreover, a block gauge a thickness of which is controlled, a glass member having constant flatness and the like may be used as the fiducial member BM.

Again in FIG. 28, then, the measurement apparatus 21 measures the fiducial member BM (a step S412). Specifically, the stage 32 and/or the measurement apparatus 21 moves so that whole (alternatively, a part in some cases) of the fiducial member BM is included in the measurement shot area MSA of the measurement apparatus 21. Alternatively, the stage 32 and/or the measurement apparatus 21 may move so that whole (alternatively, a part in some cases) of the predetermined pattern formed on the fiducial member BM is included in the measurement shot area MSA of the measurement apparatus 21. Then, the measurement apparatus 21 measures the fiducial member BM. Especially, the measurement apparatus 21 measures the predetermined pattern (namely, the predetermined pattern used to measure the tilt amount of the measurement apparatus 2) formed on the fiducial member BM.

Then, the control apparatus 7 calculates the tilt amount of the measurement apparatus 21 (especially, the tilt amount of the measurement apparatus 21 in each of the θX direction and the θY direction) relative to the stage 32 on the basis of the measured result of the measurement apparatus 21 (a step S413). For example, the control apparatus 7 determines a position and/or shape of the pattern formed on the fiducial member BM on the basis of the measured result of the measurement apparatus 21. Then, the control apparatus 7 calculates the tilt amount of the measurement apparatus 21 relative to the stage 32 on the basis of a difference between a designed position and/or shape of the pattern formed on the fiducial member BM (namely, the position and/or shape of the pattern that must be determined from the measured result of the measurement apparatus 21 when the measurement apparatus 21 does not tilt relative to the stage 32) and the actually determined position and/or shape of the pattern. The calculated tilt amount is used as a parameter for operating the processing system SYS so that the workpiece W is processed in the same manner as the case where the measurement apparatus 2 does not tilt relative to the stage 32 even when the measurement apparatus 2 tilts relative to the stage 32. Moreover, the control apparatus 7 may calculate the tilt amount of the stage 32 itself (especially, the tilt amount of the stage 32 in each of the θX direction and the θY direction) on the basis of the measured result of the measurement apparatus 21.

Note that the control apparatus 7 may calculate at least one of the tilt amount of the measurement apparatus 21 in the θZ direction and an offset amount of the position of the measurement apparatus 21 in the Z axis direction (namely, an offset amount of the position of the measurement apparatus 21 from a fiducial point in the Z axis direction) on the basis of the measured result of the measurement apparatus 21, depending on the pattern formed on the fiducial member BM. For example, when the fiducial member BM2 on the surface of which the dot patterns DP are regularly formed is used as illustrated in FIG. 29, the control apparatus 7 may calculate the tilt amount of the measurement apparatus 21 in the θZ direction on the basis of the measured result of the measurement apparatus 21. For example, when the fiducial member BM2 on the surface of which the plurality of block patterns BP having the different sizes in the direction intersecting with the XY plane are formed is used as illustrated in FIG. 30B, the control apparatus 7 may calculate the offset amount of the position of the measurement apparatus 21 in the Z axis direction on the basis of the measured result of the measurement apparatus 21. In this case, the tilt amount of the measurement apparatus 21 in the θZ direction may be used as a parameter for operating the processing system SYS so that the workpiece W is processed in the same manner as the case where the measurement apparatus 21 does not tilt relative to the stage 32 in the θZ direction even when the measurement apparatus 21 tilts relative to the stage 32 in the θZ direction. The offset amount of the measurement apparatus 21 in the Z axis direction may be used as a parameter for operating the processing system SYS so that the workpiece W is processed in the same manner as the case where there is no offset of the measurement apparatus 21 in the Z axis direction even when there is the offset of the measurement apparatus 21 in the Z axis direction.

Moreover, the control apparatus 7 may calculate a parameter relating to a shape of the measurement shot area MSA of the measurement apparatus 21, depending on the pattern formed on the fiducial member BM. The parameter relating to the shape of the measurement shot area MSA may include at least one of a degree of a distortion of the measurement shot area MSA, a magnification of the measurement shot area MSA (for example, a magnification of an actual size of the measurement shot area MSA with respect to a designed size of the measurement shot area MSA), a degree of a curvature of the measurement shot area MSA (for example, a degree of a curvature of the measurement shot area MSA with respect to a plane along the XY plane), for example. Here, the measurement shot area MSA may be a three-dimensional area. Note that the degree of the distortion of the measurement shot area MSA may be represented by a difference between a XY position when there is no error and an actually measured XY position or a difference between a Z position when there is no error and an actually measured Z position in a XYZ coordinate system in which the measurement shot area MSA is defined. Moreover, the degree of the curvature of the measurement shot area MSA may be represented by a degree of a deviation, from the XY plane that is a basis, of a plane that approximates a XYZ position at which a Z displacement outputted from the measurement apparatus 21 is a predetermined Z displacement output in the XYZ coordinate system in which the measurement shot area MSA is defined.

For example, when the fiducial member BM2 on the surface of which the dot patterns DP are regularly formed is used as illustrated in FIG. 29, the control apparatus 7 may calculate at least one of the degree of the distortion of the measurement shot area MSA and the magnification of the measurement shot area MSA on the basis of the measured result of the measurement apparatus 21. For example, when the fiducial member BM2 on the surface of which the plurality of block patterns BP having the different sizes in the direction intersecting with the XY plane are formed is used as illustrated in FIG. 30B, the control apparatus 7 may calculate the degree of the curvature of the measurement shot area MSA on the basis of the measured result of the measurement apparatus 21. In this case, the degree of the distortion of the measurement shot area MSA may be used as a parameter for operating the processing system SYS so that the workpiece W is processed in the same manner as the case where the measurement shot area MSA is not distorted even when the measurement shot area MSA is distorted. The magnification of the measurement shot area MSA may be used as a parameter for operating the processing system SYS so that the workpiece W is processed in the same manner as the case where the magnification of the measurement shot area MSA is a desired magnification even when the magnification of the measurement shot area MSA is not the desired magnification. The degree of the curvature of the measurement shot area MSA may be used as a parameter for operating the processing system SYS so that the workpiece W is processed in the same manner as the case where the measurement shot area MSA is not curved even when the measurement shot area MSA is curved.

Moreover, in the above described description, the fiducial member BM is placed on the stage 32 in order to perform the first tilt measurement operation. However, a predetermined pattern, which is used to measure the tilt amount of the measurement apparatus 2 relative to the stage 32, may be formed on a stage 32' itself, as illustrated in FIG. 31 that is a planar view that illustrates the stage 32' modified in order to perform the first tilt measurement operation. FIG. 31 illustrates an example in which the dot patterns DP are formed on the outer circumference surface 323 that is located around the placement surface 321 of the surface of the stage 32. In this case, the fiducial member BM may not be placed on the stage 32 in the first tilt measurement operation, and the measurement apparatus 2 may measure the pattern formed on the stage 32' in addition to or instead of the pattern formed on the fiducial member BM placed on the stage 32. Note that the dot patterns DP may be formed at least a part of the outer circumference surface 323 that is located around the placement surface 321 of the surface of the stage 32.

Moreover, a pattern formed at the workpiece W by means of the processing apparatus 1 processing the workpiece W may be used as the pattern that is measured by the measurement apparatus 2 to measure the tilt amount and the like. In this case, firstly, the processing apparatus 1 may process the workpiece W to form the predetermined pattern that is used to measure the tilt amount of the measurement apparatus 2 relative to the stage 32. In this case, the workpiece W on which the predetermined pattern that is used to measure the tilt amount of the measurement apparatus 2 relative to the stage 32 may be different from the workpiece W that is expected to be processed by the above described processing operation (for example, may be a workpiece for a test), or may be the workpiece W that is expected to be processed by the above described processing operation. Then, the measurement apparatus 2 may measure the pattern formed at the workpiece W in addition to or instead of the fiducial member BM placed on the stage 32.

(2-4-3) Second Tilt Measurement Operation for Measuring Tilt Amount of Processing Apparatus 1 Relative to the Stage 32

Next, with reference to FIG. 32, the second tilt measurement operation for measuring the tilt amount of the processing apparatus 1 relative to the stage 32 will be described. FIG. 32 is a flowchart that illustrates a flow of the second tilt measurement operation for measuring the tilt amount of the processing apparatus 1 relative to the stage 32.

As illustrated in FIG. 32, the processing apparatus 1 processes the workpiece W to form a predetermined pattern that is used to measure the tilt amount of the processing apparatus 1 relative to the stage 32 (a step S421). The predetermined pattern formed at the step S421 may be a same pattern as the predetermined that is used to measure the tilt amount of the measurement apparatus 2 relative to the stage 32 in the first tilt amount measurement operation. Alternatively, the predetermined pattern formed at the step S421 may be a different pattern from the predetermined that is used to measure the tilt amount of the measurement apparatus 2 relative to the stage 32 in the first tilt amount measurement operation.

Then, the measurement apparatus 21 measures the workpiece W processed at the step S421 (especially, the processed part processed at the step S421) (a step S422). Thus, firstly, the stage 32 and/or the measurement apparatus 21 moves so that the processed part of the workpiece W processed at the step S421 is located in the measurement shot area MSA of the measurement apparatus 21. Namely, the stage 32 moves so that the processed part of the workpiece W processed at the step S421 moves from the processing shot area PSA to the measurement shot area MSA. In this case, as described above, the workpiece W may remain to be placed on the stage 32. Then, the measurement apparatus 21 measures the processed part of the workpiece W processed at the step S421.

Then, the control apparatus 7 calculates the tilt amount of the processing apparatus 1 (especially, the tilt amount of the processing apparatus 1 in each of the θX direction and the θY direction) relative to the stage 32 on the basis of the measured result of the measurement apparatus 21 (a step S423). For example, the control apparatus 7 determines an actual position and/or shape of the pattern formed at the workpiece W on the basis of the measured result of the measurement apparatus 21. Then, the control apparatus 7 calculates the tilt amount of the processing apparatus 1 relative to the stage 32 on the basis of a difference between a designed position and/or shape of the pattern formed at the workpiece W (namely, the position and/or shape of the pattern that must be processed by the processing apparatus 1 when the processing apparatus 1 does not tilt relative to the stage 32) and the actual position and/or shape of the pattern formed at the workpiece W. The calculated tilt amount is used as a parameter for operating the processing system SYS so that the workpiece W is processed in the same manner as the case where the processing apparatus 1 does not tilt relative to the stage 32 even when the processing apparatus 1 tilts relative to the stage 32.

Note that the control apparatus 7 may calculate at least one of the tilt amount of the processing apparatus 1 in the θZ direction, an offset amount of the position of the processing apparatus 1 in the Z axis direction (namely, an offset amount of the position of the processing apparatus 1 from a fiducial point in the Z axis direction) and a parameter relating to a shape of the processing shot area of the processing apparatus 1 on the basis of the measured result of the measurement apparatus 21, depending on the pattern formed at the workpiece W. The parameter relating to the shape of the processing shot area PSA may include at least one of a degree of a distortion of the processing shot area PSA, a magnification of the processing shot area PSA (for example, a magnification of an actual size of the processing shot area PSA with respect to a designed size of the processing shot area PSA), a degree of a curvature of the processing shot area PSA (for example, a degree of a curvature of the processing shot area PSA with respect to a plane along the XY plane), for example. In this case, the tilt amount of the processing apparatus 1 in the θZ direction may be used as a parameter for operating the processing system SYS so that the workpiece W is processed in the same manner as the case where the processing apparatus 1 does not tilt relative to the stage 32 in the θZ direction even when the processing apparatus 1 tilts relative to the stage 32 in the θZ direction. The offset amount of the processing apparatus 1 in the Z axis direction may be used as a parameter for operating the processing system SYS so that the workpiece W is processed in the same manner as the case where there is no offset of the processing apparatus 1 in the Z axis direction even when there is the offset of the processing apparatus 1 in the Z axis direction. The degree of the distortion of the processing shot area PSA may be used as a parameter for operating the processing system SYS so that the workpiece W is processed in the same manner as the case where the processing shot area PSA is not distorted even when the processing shot area PSA is distorted. The magnification of the processing shot area PSA may be used as a parameter for operating the processing system SYS so that the workpiece W is processed in the same manner as the case where the magnification of the processing shot area PSA is a desired magnification even when the magnification of the processing shot area PSA is not the desired magnification. The degree of the curvature of the processing shot area PSA may be used as a parameter for operating the processing system SYS so that the workpiece W is processed in the same manner as the case where the processing shot area PSA is not curved even when the processing shot area PSA is curved. Note that a magnification, a distortion and a curvature of field of an optical system (typically, fθ lens) of the processing apparatus 1 may be used as a parameter in addition to or instead of the parameter relating to the shape of the processing shot area PSA.

Moreover, the fiducial member BM (especially, the fiducial member BM on which the predetermined pattern that is used to measure the tilt amount of the processing apparatus 1 relative to the stage 32 is formed) may be placed on the stage 32 even in the second tilt measurement operation, as with the first tilt measurement operation. Alternatively, the predetermined pattern that is used to measure the tilt amount of the processing apparatus 1 relative to the stage 32 may be formed on the stage 32. In this case, the processing apparatus 1 may observe (substantially, measure) a position and/or shape of the pattern formed on the fiducial member BM and/or the stage 32 by using the observation apparatus 16 of the processing apparatus 1. Moreover, the control apparatus 7 may calculate the tilt amount of the processing apparatus 1 relative to the stage 32 on the basis of the observed result of the observation apparatus 16. Specifically, the control apparatus 7 may determine an actual position and/or shape of the pattern formed on the fiducial member BM on the basis of the observed result of the observation apparatus 16. Then, the control apparatus 7 may calculate the tilt amount of the processing apparatus 1 relative to the stage 32 on the basis of a difference between a designed position and/or shape of the pattern formed on the fiducial member BM and the actually determined position and/or shape of the pattern formed on the fiducial member BM. In this case, the processing apparatus 1 may not process the workpiece W to form the predetermined pattern that is used to measure the tilt amount of the processing apparatus 1 relative to the stage 32.

(3) TECHNICAL EFFECT

As described above, the processing system SYS is provided with both of the processing apparatus 1 and the measurement apparatus 2. Especially, the processing system SYS is provided with both of the processing apparatus 1 and the measurement apparatus 2 in the housing 4 in which the stage apparatus 3 is housed (namely, the workpiece W is housed). Thus, the workpiece W may not be unloaded from the stage 32 in a period after the processing apparatus 1 processes the workpiece W and before the measurement apparatus 2 measures the processed workpiece W. Similarly, the workpiece W may not be unloaded from the stage 32 in a period after the measurement apparatus 2 measures the workpiece W and before the processing apparatus 1 processes the measured workpiece W. Thus, a through put relating to the processing of the workpiece W improves, compared to the case where the workpiece W is needed to be unloaded from the stage 32 in the period after the processing apparatus 1 processes the workpiece W and before the measurement apparatus 2 measures the processed workpiece W and/or the period after the measurement apparatus 2 measures the workpiece W and before the processing apparatus 1 processes the measured workpiece W, because an unloading the workpiece W from the stage 32 and a re-loading the workpiece W on the stage 32 are not necessary. Moreover, the through put relating to the processing of the workpiece W improves because an alignment operation (for example, an alignment operation of the workpiece W with respect to the stage 32), which may be necessary due to the re-loading the workpiece W on the stage 32, is not performed.

Moreover, in the processing system SYS, the workpiece W may remain to be placed on the stage 32 between the processing of the workpiece W by the processing apparatus 1 and the measurement of the workpiece W by the measurement apparatus 2. Thus, an influence of a processing error and a measurement error due to the loading and unloading of the workpiece W are reduced and the through put relating to the processing of the workpiece W improves.

Moreover, since the processing system SYS is provided with both of the processing apparatus 1 and the measurement apparatus 2, the processing system SYS may process the workpiece W while measuring the state of the workpiece W processed by the processing apparatus 1 by using the measurement apparatus 2. As a result, the processing system SYS may promptly control the processing apparatus 1 so that the state of the workpiece W comes close to or is equal to a desired state when the state of the workpiece W is different from the desired state (for example, the processed amount of the workpiece W is not appropriate and/or a processing position of the workpiece W is not appropriate). For example, the processing system SYS may promptly control the processing apparatus 1 so that the processed amount of the workpiece W is appropriate and/or the processing position of the workpiece W is appropriate when the processed amount of the workpiece W is not appropriate and/or the processing position of the workpiece W is not appropriate. Thus, the workpiece W is processes with higher accuracy by the processing system SYS, compared to the case where the workpiece W is processed without measuring the state of the workpiece W processed by the processing apparatus 1 by using the measurement apparatus 2.

Moreover, since the processing apparatus 1 processes the workpiece W by using the processing light EL, a cut chip of the workpiece W is not generated easily, compared to the case where the workpiece W is processed by a cutting member and the like. Thus, the appropriate operation of the measurement apparatus 2 is hardly prevented by the cut chip, even when the processing apparatus 1 and the measurement apparatus 2 are housed in the same housing 4.

Moreover, since the processing apparatus 1 processes the workpiece W by using the processing light EL, a relatively large external force is hardly applied to the workpiece W, compared to the case where the workpiece W is processed by the cutting member and the like. Thus, the stage 32 may not necessarily hold the workpiece by a relatively large holding force. As a result, the workpiece W is allowed to be placed on the stage in a substantially same manner in both of the case where the processing apparatus 1 processes the workpiece W and the measurement apparatus 2 measures the workpiece W. Thus, the measurement apparatus 2 is allowed to measure the workpiece W that is placed on the stage 32 in a state that is same as a state of the case where the processing apparatus 1 processes the workpiece W. Namely, the measurement apparatus 2 is allowed to measure the workpiece W with a relatively higher accuracy without being affected by a micro distortion of the workpiece W caused by the relatively large force, compared to the case where the workpiece W is held by the relatively large holding force when the processing apparatus 1 processes the workpiece W. Moreover, it is possible to process the workpiece W with a relatively higher accuracy in a state where an influence of the distortion of the workpiece W is reduced.

Moreover, the processing system SYS is allowed to perform the initial setting operation for setting the initial value of the processing condition. Thus, the processing system SYS is allowed to set the initial value of the processing condition relatively easily in a short time.

Moreover, the processing system SYS is allowed to perform the temperature drift reduction operation. Thus, the processing system SYS is allowed to appropriately reduce the influence of the temperature drift that is the phenomenon that the measurement accuracy of the measurement apparatus 21 varies depending on the temperature of the measurement apparatus 21. Therefore, the processing system SYS is allowed to measure the workpiece W with a relatively higher accuracy, compared to the case where the influence of the temperature drift is not reduced. Moreover, the processing system SYS is allowed to process the workpiece W with a relatively higher accuracy by using the relatively highly accurate measured result of the workpiece W.

Moreover, the processing system SYS is allowed to perform the tilt measurement operation. Thus, the processing system SYS is allowed to process the workpiece W to reduce the influence of the tilt. Namely, the processing system SYS is allowed to process the workpiece W in the same manner as the case where the processing apparatus 1 and/or the measurement apparatus 2 does not tilt relative to the stage 32 even when the processing apparatus 1 and/or the measurement apparatus 2 tilts relative to the stage 32.

(4) MODIFIED EXAMPLE

Next, a modified example of the processing system SYS will be described.

(4-1) Processing System SYSa in First Modified Example

Firstly, with reference to FIG. 33, a processing system SYSa in a first modified example will be described. FIG. 33 is a cross-sectional view that illustrates the structure of the processing system SYSa in the first modified example. Note that FIG. 33 does not illustrate a cross-sectional surface of a part of the components of the processing system SYSa for the purpose of simple illustration.

As illustrated in FIG. 33, the processing system SYSa in the first modified example is different from the above described processing system in that it is provided with a gas supply apparatus 8a. Another feature of the processing system SYSa may be same as another feature of the processing system SYS. Note that FIG. 33 omits or simplifies a part of the components of the processing system SYSa for the purpose of simple illustration.

The gas supply apparatus 8a supplies (namely, flows) a gas to the housing space SP. At least one of an air, a CDA (Clean Dry Air) and an inert gas is one example of the gas supplied by the gas supply apparatus 8a. A nitrogen gas and an argon gas are examples of the inert gas.

The gas supply apparatus 8a may supply the gas to reduce an adherence, to the measurement apparatus 2, of a substance that is generated from the workpiece W by the irradiation of the processing light EL to the workpiece W. Namely, the gas supply apparatus 8a may serve as an adherence reduction apparatus that is configured to reduce the adherence, to the measurement apparatus 2, of the substance that is generated from the workpiece W by the irradiation of the processing light EL to the workpiece W. The substance that is generated from the workpiece W by the irradiation of the processing light EL to the workpiece W may include the melted or vaporized material of the workpiece W. In the below described description, the substance that is generated from the workpiece W by the irradiation of the processing light EL to the workpiece W is referred to as a "fume".

Especially, the gas supply apparatus 8a may supply the gas to reduce the adherence of the fume to a specific part of the measurement apparatus 2. The specific part of the measurement apparatus 2 may be a part to which the adherence of the fume may result in the deterioration of the measurement accuracy of the measurement apparatus 2. For example, when the measurement apparatus 2 measures the workpiece W by irradiating the workpiece W with the measurement light (for example, the slit light in the light section method or the white light in the white interference method), an optical surface 211s of an optical system 211 of the measurement apparatus 2 is one example of the specific part. Especially, an optical surface of a terminal optical element (namely, an optical element that faces the housing space SP) of the optical system 221 is one example of the specific part.

When the fume is adhered to the measurement apparatus 2 (especially, its specific part), there is a possibility that the adhered fume prevents the irradiation of the measurement light (for example, the irradiation to the workpiece W). As a result, there is a possibility that the measurement apparatus 2 is not capable of measuring the workpiece W appropriately. However, in the first modified example, the adherence of the fume to the measurement apparatus 2 (especially, its specific part) is reduced. As a result, the measurement apparatus 2 is allowed to measure the workpiece W appropriately in a state where an influence of the fume is reduced.

As illustrated in FIG. 34 that is a schematic view that illustrates a first supply aspect of the gas by the gas supply apparatus 8a, the gas supply apparatus 8a may supply the gas to a space between the processing apparatus 1 and the measurement apparatus 2 in the housing space SP. The gas supply apparatus 8a may supply the gas along a direction including a component along the propagating direction of the processing light EL propagating from the processing apparatus 1 to the workpiece W (in an example illustrated in FIG. 34, a direction including the Z axis direction as a component). In this case, the gas supplied from the gas supply apparatus 8a serves as an air curtain. Namely, the gas supplied from the gas supply apparatus 8a serves as the air curtain that is configured to reduce a possibility that the fume enters from a space that is closer to the processing apparatus 1 than the air curtain to a space that is closer to the measurement apparatus 1 than the air curtain. As a result, a possibility that the fume is adhered to the measurement apparatus 2 is reduced appropriately. Moreover, a possibility that the fume enters a space including an optical path of the measurement light is reduced appropriately.

As illustrated in FIG. 35 that is a schematic view that illustrates a second supply aspect of the gas by the gas supply apparatus 8a, the gas supply apparatus 8a may supply the gas to a space between the measurement apparatus 2 and the stage 32 in the housing space SP. The gas supply apparatus 8a may supply the gas to a space including the optical path of the measurement light from the measurement apparatus in the housing space SP. The gas supply apparatus 8a may supply the gas along a direction intersecting with the propagating direction of the processing light EL propagating from the processing apparatus 1 to the workpiece W (in an example illustrated in FIG. 35, the Y axis direction). The gas supply apparatus 8a may supply the gas that flows from the space including the optical path of the measurement light to a space optical path of the processing light EL. As a result, it becomes difficult for the fume to enter the space including the optical path of the measurement light easily, and thus, the possibility that the fume is adhered to the measurement apparatus 2 is reduced appropriately. Moreover, the possibility that the fume enters a space including an optical path of the measurement light is reduced appropriately. Moreover, when the gas supplied from the gas supply apparatus 8 is blown to the specific part (for example, the above described optical surface 211s of the optical system 211) of the measurement apparatus 2, the fume adhered to the specific part of the measurement apparatus 2 is blown off (namely, removed) by the gas. Thus, even when the fume is adhered to the measurement apparatus 2, a possibility that the fume keeps being adhered to the measurement apparatus 2 is reduced appropriately. And, a possibility that the fume is adhered to a specific part (for example, an optical surface of a terminal optical element of the fθ lens 142) of the processing apparatus 1, and thus, an appropriately processing is realized. As described above, the supply of the gas by the gas supply apparatus 8a forms a flow path of the gas in a direction that intersects with the optical path of the processing light EL and/or the measurement light, and thus, the fume moves along the flow path and the possibility that the fume is adhered to the processing apparatus 1 and the measurement apparatus 2 is reduced.

(4-2) Processing System SYSb in Second Modified Example

Next, with reference to FIG. 36, a processing system SYSb in a second modified example will be described. FIG. 36 is a cross-sectional view that illustrates the structure of the processing system SYSb in the second modified example. Note that FIG. 36 does not illustrate a cross-sectional surface of a part of the components of the processing system SYSb for the purpose of simple illustration.

As illustrated in FIG. 36, the processing system SYSb in the second modified example is different from the above described processing system in that it is provided with a collection apparatus 8b. Another feature of the processing system SYSb may be same as another feature of the processing system SYS. Note that FIG. 36 omits or simplifies a part of the components of the processing system SYSb for the purpose of simple illustration.

The collection apparatus 8b collects a gas (alternatively, any fluid including a liquid, the same applies to the second modified example) from the housing space SP in the housing 4. Specifically, the collection apparatus 8b collects the gas from the housing space SP through a collection port 81b that is an aperture formed at a wall of the housing and a collection pipe 82b connected to the collection port 81b. The collection apparatus 8b may collect the gas by sucking the gas from the housing space SP through the collection port 81b and the collection pipe 82b. The collection apparatus 8b may collect the gas by exhausting at least a part of the housing space SP through the collection port 81b and the collection pipe 82b. The collection apparatus 8b is provided with the collection port 81b at an opposite side of the measurement apparatus 2 viewed from the processing apparatus 1 and forms a flow path of the fluid (the gas) in a path that reaches from a position just below the measurement apparatus 2 to the collection port 81b through a position just below the processing apparatus 1. Note that the space outside the housing 4 and an inner space (the housing space) may be viewed to be substantially separated from each other by the housing 4 even in the case illustrated in FIG. 36.

The collection apparatus 8b may collect at least a part of the fume in the housing space SP with the gas. The collection apparatus 8b may collect the gas and the fume in a direction intersecting with the propagating direction of the processing light EL propagating from the processing apparatus 1 to the workpiece W (in an example illustrated in FIG. 36, the Y axis direction). The fume collected from the housing space SP by the collection apparatus 8b may be adsorbed by a filter 83b disposed in the collection pipe 82b. The filter 83 may be detachable and may be exchangeable. As a result, the adherence of the fume to the measurement apparatus 2 is prevented more appropriately, compared to the case where the fume is not collected by the collection apparatus 8b. Therefore, the collection apparatus 8b may serve as an adherence prevention apparatus that is configured to reduce the adherence of the fume to the measurement apparatus 2. Note that a flow sensor may be disposed at a downstream of the filter 83b and a clog of the filter 83b may be monitored. Moreover, a timing at which the filter 83b is exchanged may be estimated from an output of the flow sensor.

The collection of the gas by the collection apparatus 8b forms the flow path of the gas in the direction that intersects with the optical path of the processing light EL and/or the measurement light, and thus, the fume is collected by the collection apparatus 8b along the flow path and the possibility that the fume is adhered to the processing apparatus 1 and the measurement apparatus 2 is reduced.

Note that the processing system SYSb in the second modified example may be provided with the gas supply apparatus 8a, as with the processing system SYSa in the first modified example. In this case, the adherence of the fume to the processing apparatus 1 and the measurement apparatus 2 is reduced more.

(4-3) Processing System SYSc in Third Modified Example

Next, with reference to FIG. 37, a processing system SYSc in a third modified example will be described. FIG. 37 is a cross-sectional view that illustrates the structure of the processing system SYSc in the third modified example. Note that FIG. 37 does not illustrate a cross-sectional surface of a part of the components of the processing system SYSc for the purpose of simple illustration.

As illustrated in FIG. 37, the processing system SYSc in the third modified example is different from the above described processing system in that it is provided with a housing 8c. Another feature of the processing system SYSc may be same as another feature of the processing system SYS. Note that FIG. 37 omits or simplifies a part of the components of the processing system SYSc for the purpose of simple illustration.

The housing 8c is disposed in the housing space SP. The housing 8c houses at least a part of the measurement apparatus 2 (for example, the specific part of the measurement apparatus 2) in the housing space SP. Specifically, as illustrated in FIG. 37, the housing 8c is provided with a wall member 81c. The wall member 81c forms an inner space 82c in which the measurement apparatus 2 is housed. As a result, housing 8c (especially, the wall member 81c) prevents the fume from entering from the housing space SP to the housing space 82c. Thus, the adherence of the fume to the measurement apparatus 2 housed in the housing space 82c is prevented appropriately.

However, it is not preferable that the irradiation of the measurement is prevented by the housing 8c when the measurement apparatus 2 measures the workpiece W by emitting the measurement light. Thus, a part of the wall member 81c that overlaps with the optical path of the measurement light from the measurement apparatus 2 may be made of a light passing part 83c. The light passing part 83c may be a member through which the measurement light is allowed to pass and through which the fume is not allowed to pass. As one example, the light passing member 83c may be a member that is transparent to the measurement light (for example, a transmittance of which is equal to or higher than a predetermined ratio), for example. Alternatively, the light passing part 83c may be a member through which the measurement light is allowed to pass in at least a part of a period when the measurement light is emitted (for example, the period when the measurement apparatus 2 measures the workpiece W) and through which the fume is not allowed to pass in at least a part of a period when the measurement light is not emitted (for example, a period when the measurement apparatus 2 does no measure the workpiece W, and typically the period when the processing apparatus 1 processes the workpiece W). A light transmissive substrate such as a glass substrate is one example of the light passing member 83c. As a result, the light passing member 83c prevents the fume from entering the housing space SP to the housing space 82c and the workpiece W is irradiated with the measurement light from the measurement apparatus 2 through the light passing member 83c. Thus, the adherence of the fume to the measurement apparatus 2 housed in the housing space 82a-3 is prevented appropriately and the measurement apparatus 2 is allowed to measure the workpiece W appropriately.

The light passing member 83c faces the housing space SP, and thus, there is a possibility that the fume is adhered to the light passing member 83c. Thus, the fume that is adhered to the light passing member 83c may be removed. For example, the processing system SYSc may supply a gas to blow off (namely, remove) the fume that is adhered to the light passing member 83c. In this case, the processing system SYSc may blow off (namely, remove) the fume that is adhered to the light passing member 83c by using the air supply apparatus 8a. For example, as illustrated in FIG. 38 that is a cross-sectional view that illustrates another structure of the processing system SYSc, the processing system SYSc may be provided with a vibration apparatus 84c that vibrates the light passing member 83c to drop (namely, remove) the fume that is adhered to the light passing member 83c. As a result, it is possible to prevent the fume from keeps being adhered to the light passing member 83c. Therefore, the irradiation of the measurement light from the measurement apparatus 2 is not prevented by the fume that keeps being adhered to the light passing member 83c.

The fume adhered to the light passing member 83c may be removed at a desired timing. For example, the more an amount of the fume adhered to the light passing member 83c is, the more the measurement light scattered by the fume is. Thus, the control apparatus 7 may determine whether or not the fume is adhered to (alternatively, a predetermined amount of the fume is adhered to) the light passing member 83c on the basis of a detected result of a detection apparatus that detects the scattered measurement light, and the fume adhered to the light passing member 83c may be removed when it is determined that the fume is adhered to (alternatively, a predetermined amount of the fume is adhered to) the light passing member 83c.

Note that the light passing member 83c may be detachable from the housing 8c. Moreover, the light passing member 83c may be exchangeable by another light passing member different therefrom.

Note that the processing system SYSc in the third modified example may be provided with at least one of the gas supply apparatus 8a and the collection apparatus 8b, as with at least one of the processing system SYSa in the first modified example and the processing system SYSb in the second modified example. In this case, the adherence of the fume to the measurement apparatus 2 is reduced more appropriately.

(4-4) Processing System SYSd in Fourth Modified Example

Next, a processing system SYSd in a fourth modified example will be described. The processing system SYSd in the fourth modified example is different from the above described processing system in that it is provided with a light receiving apparatus 9d. Another feature of the processing system SYSd may be same as another feature of the processing system SYS. Therefore, in the below described description, with reference to FIG. 39A and FIG. 39B, the light receiving apparatus 9d will be described. FIG. 39A is a cross-sectional view that illustrates a structure of the light receiving apparatus 9d and FIG. 39B is a planar view that illustrates the structure of the light receiving apparatus 9d.

As illustrated in FIG. 39A and FIG. 39B, the light receiving apparatus 9d is placed at the stage 32. The light receiving apparatus 9d is placed at a position that is away from the placement surface 321 of the stage 32 on which the workpiece W is placed in at least one of the X axis direction and the Y axis direction. For example, the light receiving apparatus 9d may be placed at the outer circumference surface 322 of the stage 32 (especially, a member of the stage 32 a surface of which is the outer circumference surface 322). However, the light receiving apparatus 9d may be placed at the placement surface 321 of the stage 32 (especially, a member of the stage 32 a surface of which is the placement surface 321). The light receiving apparatus 9d may be placed at any position of the stage 32. At least a part of the light receiving apparatus 9d may be detachable from the stage 32. Alternatively, the light receiving apparatus 9d may be integrated with the stage 32. Moreover, the light receiving apparatus 9d may be placed in the placement surface 321.

The light receiving apparatus 9d is provided with a light shielding member 91d and a detector 92d.

The light shielding member 91d is a member that is configured to shield the processing light EL. The light shielding member 91d is placed at the stage 32. A height of a front surface (a surface at the +Z side) of the light shielding member 91d is same as that of a front surface (the surface at the +Z side and the outer circumference surface 322, for example) of the stage 32, however, they may be different from each other. A height of a rear surface (a surface at the −Z side) of the light shielding member 91d is same as that of a rear surface (the surface at the −Z side) of the stage 32, however, they may be different from each other. At least a part of the light shielding member 91d may be integrated with the stage 32. At least a part of the stage 32 may be used as the light shielding member 91d. However, the light shielding member 91d may be detachable from the stage 32.

An aperture 93d is formed in the light shielding member 91d. The aperture 93d is a through hole that penetrates from the front surface to the rear surface of the light shielding member 91d. When at least a part of the light shielding member 91d is integrated with the stage 32, the aperture 93d may be a through hole that penetrates from the front surface (for example, the outer circumference surface 322) to the rear surface of the stage 32. A shape of the aperture 93d in a plane along the XY plane is a slit shape, however, may be any other shape. For example, a size (for example, a size in a longitudinal direction of the slit shape) of the aperture 93d in the plane along the XY plane is several micrometers to several dozens of micrometers (for example, 5 micrometers to 10 micrometers), however, may be any other size. The aperture 93d is a through hole through which the processing light EL is allowed to pass. The aperture 93d is a through hole through which the processing light EL, which is emitted toward the front surface of the stage 32, is allowed to pass to the rear surface of the stage 32. Therefore, the light shielding member 91d in which the aperture 93d is formed serves as a light transmissive member through which the processing light EL is allowed to pass. Note that the light shielding member 91*d* may be constituted by a light transmissive substrate on a part of an upper surface of which a light shielding film is formed. In this case, a part at which the light shielding film is not formed corresponding to the aperture 93*d*.

The detector 92*d* is a light detector that is configured to detect (for example, optically receive) the processing light EL. A photoelectric converter that is configured to photoelectric-converts the received processing light EL is one example of the light detector. The detector 92*d* is placed at the rear surface of the light shielding member 91*d*. When at least a part of the light shielding member 91*d* is integrated with the stage 32, the detector 92*d* is placed at the rear surface of the stage 32. The detector 92*d* detects the processing light EL that enters the detector 92*d* through the aperture 93*d*. The detector 92*d* detects the processing light EL that enters the detector 92*d* after passing through the aperture 93*d*.

A detected result of the detector 92*d* includes information relating to the state of the processing light EL entering the detector 92*d*. For example, the detected result of the detector 92*d* includes information relating to the intensity (specifically, an intensity in a plane intersecting with the XY plane) of the processing light EL entering the detector 92*d*. More specifically, the detected result of the detector 92*d* includes information relating to the intensity distribution of the processing light EL entering the detector 92*d*. The detected result of the detector 92*d* is outputted to the control apparatus 7.

The control apparatus 7 controls the processing system SYSd (for example, at least one of the processing apparatus 1, the measurement apparatus 2, the stage apparatus 3, the driving system 5 and the driving system 6) on the basis of the detected result of the detector 92*d* so that the processing system SYSd processes the workpiece W appropriately. For example, the control apparatus 7 may perform a focus control operation for controlling the light concentration position on the basis of the detected result of the detector 92*d*. For example, the control apparatus 7 may perform a light state control operation for controlling the state of the processing light EL in synchronization with the sweeping of the processing light EL using the Galvano mirror 141 on the basis of the detected result of the detector 92*d*. For example, the control apparatus 7 may perform a Galvano control operation for controlling the Galvano mirror 141 to reduce an influence of a temperature drift that is a phenomenon that an irradiation position of the processing light EL in a plane along the XY plane varies depending on a temperature (namely, a heat) of the Galvano mirror 141. The processing system SYSd may perform at least a part of these operations (for example, the focus control operation, the light state control operation and the Galvano control operation) before the above described processing operation is performed. The processing system SYSd may perform at least a part of these operations after the above described processing operation is performed. The processing system SYSd may perform at least a part of these operations in a period when the above described processing operation is performed. The processing system SYSd may perform at least a part of these operations after performing a certain processing operation and before performing another processing operation next. The processing system SYSd may perform at least a part of these operations between one period when the workpiece W is processed and another period when the same workpiece W is processed. The processing system SYSd may perform at least a part of these operations every time a predetermined time elapses after the processing system SYSd starts to operate. When at least a part of these operations is performed before the above described processing operation is performed or after the above described processing operation is performed, the workpiece W may not be placed on the stage 32 in a period when at least a part of these operations is performed. Note that each of the focus control operation, the light state control operation and the Galvano control operation will be described later in detail.

The processing system SYSd may be provided with a plurality of light receiving apparatuses 9*d*. FIG. 39B illustrates an example in which the processing system SYSd is provided with two light receiving apparatuses 9*d*(*x*) and 9*d*(*y*). The shapes (especially, the shapes in a plane along the XY plane) of the apertures 93*d* of the plurality of light receiving apparatuses 9*d* may be the slit shapes the longitudinal directions of which are along different directions, respectively. For example, FIG. 39B illustrates the example in which a shape of an aperture 93*d*(*x*) of the light receiving apparatus 9*d*(*x*) is the slit shape the longitudinal direction of which is along the X axis direction and a shape of an aperture 93*d*(*y*) of the light receiving apparatus 9*d*(*y*) is the slit shape the longitudinal direction of which is along the Y axis direction.

Note that the number of the plurality of light receiving apparatuses 9*d* is not limited to two, and one or more light receiving apparatus 9*d* having the slit shape the longitudinal direction of which is inclined with respect to the X axis or the Y axis by a predetermined angle (as one example, 45 degree) may be used in addition to the light receiving apparatuses 9*d*(*x*) and 9*d*(*y*), for example.

Moreover, the shape of the aperture 93*d* of the light receiving apparatus 9*d* is not limited to the rectangular shape, and may be a circular shape (a pin-hole shape), a L-shape or a cross shape, as one example. Here, when the shape of the aperture 93*d* is the L-shape or the cross shape, functions of the plurality of light receiving apparatuses 9*d* may be realized by one light receiving apparatus 9*d*.

Considering that the workpiece W is processed by the irradiation of the processing light EL, there is a possibility that at least a part of the light receiving apparatus 9*d* (furthermore, the stage 32 at which the light receiving apparatus 9*d*) is processed (substantially, damaged) by the irradiation of the processing light EL. The intensity (for example, an energy amount per unit area in a plane intersecting with the propagating direction of the processing light EL) of the processing light EL may be controlled so that the intensity (for example, an energy amount per unit area in a detection surface of the detector 92*d*) of the processing light EL with which the light receiving apparatus 9*d* is irradiated is smaller than the intensity (for example, an energy amount per unit area in the surface of the workpiece W) of the processing light EL with which the workpiece W is irradiated to process the workpiece W. For example, the light source 11 of the processing apparatus 1 may generate the processing light EL so that the intensity of the processing light that is emitted in a period when the light receiving apparatus 9*d* is irradiated with the processing light EL is smaller than the intensity of the processing light that is emitted in a period when the workpiece W is irradiated with the processing light EL to process the workpiece W. For example, as illustrated in FIG. 40 that is a cross-sectional view that illustrates the processing light EL with which the light receiving apparatus 9*d* is irradiated, an attenuation member 18*d* that is configured to attenuate the processing light EL may be placed on the optical path of the processing light EL. In this case, the processing apparatus 1 may irradiate the light receiving apparatus 9d with the processing light EL through the attenuation member 18d and may irradiate the workpiece W with the processing light EL not through the attenuation member 18d. Therefore, the attenuation member 18 may be allowed to be inserted to and extracted from the optical path of the processing light so that it is located on the optical path of the processing light in the period when the light receiving apparatus 9d is irradiated with the processing light EL and it is not located on the optical path of the processing light in the period when the workpiece W is irradiated with the processing light EL to process the workpiece W. Note that the attenuation member 18d may be placed inside the processing apparatus 1, or may be placed outside the processing apparatus 1 (for example, in a space between the processing apparatus 1 and the light receiving apparatus 9d or a space above the light receiving apparatus 9d. When the attenuation member 18d is used as described above, the processing light EL is allowed to be measured while making an emitting condition (a lasing condition, as one example) of the light source 11 be same as that when the processing is performed, and thus, it is possible to reduce an disadvantage that the intensity distribution of the measured processing light EL is different from that when the processing is performed. Note that the intensity of the processing light EL may be changed by changing the emitting condition of the light source 11. In this case, the measured result may be corrected by using information relating to a relationship between the emitting condition of the light source 11 and the intensity distribution of the processing light EL.

(4-4-1) Focus Control Operation

Next, with reference to FIG. 41A to FIG. 41C, the focus control operation that is one example of the operations performed on the basis of the optical received result of the detector 9d of the light receiving apparatus 9d will be described. FIG. 41A is a cross-sectional view that illustrates an aspect of the processing apparatus 1 that irradiates the light receiving apparatus 9d with the processing light EL in order to perform the focus control operation, FIG. 41B is a planar view that illustrates an aspect of the processing apparatus 1 that irradiates the light receiving apparatus 9d with the processing light EL in order to perform the focus control operation, and FIG. 41C is a graph that illustrates the detected result of the detector 92d of the light receiving apparatus 9d.

As illustrated in FIG. 41A and FIG. 41B, the processing apparatus 1 irradiates the light receiving apparatus 9d (especially, the detector 92d) with the processing light EL in order to perform the focus control operation. Thus, firstly, the stage 32 and/or the processing apparatus 1 moves so that the aperture 93d is located in the processing shot area PSA. Then, the processing apparatus 1 irradiates the detector 92d with the processing light EL through the aperture 93d.

In this case, the processing apparatus 1 sweeps at least a part of the surface of the stage 32 (specifically, a surface including a part at which the aperture 93d is formed) with the processing light EL by allowing the processing light EL deflected by the Galvano mirror 141 to pass through the fθ lens 142. Especially, the processing apparatus 1 sweeps at least a part of the surface of the stage 32 with the processing light EL so that the processing light EL (more specifically, the irradiation area EA of the processing light EL) traverses the aperture 93d in a plane along the XY plane. Especially, the processing apparatus 1 may sweep at least a part of the surface of the stage 32 with the processing light EL so that the processing light EL traverses the aperture 93d along a short direction of the slit that forms the aperture 93d in the plane along the XY plane. For example, when the processing apparatus 1 irradiates the light receiving apparatus 9d(x) illustrated in FIG. 39B with the processing light EL, the processing apparatus 1 may sweep at least a part of the surface of the stage 32 with the processing light EL so that the processing light EL traverses the aperture 93d(x) along the Y axis direction, which is a short direction of the slit that forms the aperture 93d(x), in the plane along the XY plane. For example, when the processing apparatus 1 irradiates the light receiving apparatus 9d(y) illustrated in FIG. 39B with the processing light EL, the processing apparatus 1 may sweep at least a part of the surface of the stage 32 with the processing light EL so that the processing light EL traverses the aperture 93d(y) along the X axis direction, which is a short direction of the slit that forms the aperture 93d(y), in the plane along the XY plane. In a strict sense, a result when the processing light EL is moved relative to the apertures 93(x) and 9(y) that is spatially static is different from a result when the apertures 93(x) and 9(y) is moved relative to the processing light EL that is spatially static, however, both may be viewed to be equivalent to each other when a sweeping amount (a moving amount of the processing light EL in the XY plane) is small (for example, smaller than ten times of a spot size of the processing light EL). Note that FIG. 41A and FIG. 41B illustrates an example in which the processing light EL traverses the aperture 93d along the Y axis direction, which is a short direction of the slit that forms the aperture 93d, in the plane along the XY plane.

The stage 32 may not move in a period when at least a part of the surface of the stage 32 is swept with the processing light EL. Namely, the positional relationship (especially, a direction along the XY plane) between the processing apparatus 1 and the stage 32 may be fixed in the period when at least a part of the surface of the stage 32 is swept with the processing light EL. As a result, at least a part of the surface of the stage 32 is swept with the processing light EL at a constant sweeping speed that is determined on the basis of a characteristic of the Galvano mirror 141. Namely, the irradiation area EA of the processing light EL moves on at least a part of the surface of the stage 32 along a direction along the surface of the stage 32 (for example, at least one of the X axis direction and the Y axis direction) at a constant speed.

As a result, the aperture 93d is irradiated with the processing light EL in a certain timing in the period when at least a part of the surface of the stage 32 is swept with the processing light EL. Namely, the processing light EL is detected by the detector 92d in a certain timing in the period when at least a part of the surface of the stage 32 is swept with the processing light EL.

The control apparatus 7 obtains, as the detected result of the detector 92d, a detection signal that indicates that the intensity of the processing light EL in a period when the aperture 93d is irradiated with at least a part of the processing light EL is higher than the intensity of the processing light EL in a period when the aperture 93d is not irradiated with the processing light EL, as illustrated in FIG. 41C. Note that a time (a detected timing) represented by a horizontal axis of FIG. 41C may be replaced by a relative position of the processing light EL and the stage 32 along the sweeping direction (the Y direction). The control apparatus 7 may calculate the spot diameter (namely, the spot diameter on the surface of the workpiece W) of the processing light EL on the basis of the detection signal. Specifically, the control apparatus 7 may determine a period when the intensity of the processing light EL is higher than a predetermined value (namely, the period when the aperture 93d is irradiated with at least a part of the processing light EL) from the detection signal. In this case, the control apparatus 7 may calculates the spot diameter of the processing light on the basis of the determined period and the sweeping speed of the processing light EL.

Then, the control apparatus 7 may control the light concentration position of the processing light EL so that the calculated sport diameter is equal to the spot diameter that is set as the processing condition (for example, the spot diameter that is set by the above described initial setting operation). In this case, when the light concentration position is changed, the control apparatus 7 may control the processing apparatus 1 so that the light receiving apparatus 9*d* redetects the processing light EL to determine whether or not the changed light concentration position is an appropriate. In this case, the control apparatus 7 may determine whether or not the spot diameter that is recalculated on the basis of the redetected result of the detector 92*d* is equal to the spot diameter that is set as the processing condition.

Note that, in the example illustrated in FIG. 39 to FIG. 41, a width (the position) of the spot of the processing light EL along the Y direction is detected by sweeping, along the Y direction, the aperture 93*d* (x) the longitudinal direction of which is the X direction (having a width in the Y direction that is smaller than that in the X direction), and a width (the position) of the spot of the processing light EL along the X direction is detected by sweeping, along the X direction, the aperture 93*d*(*y*) the longitudinal direction of which is the Y direction (having a width in the X direction that is smaller than that in the Y direction). Therefore, a degree of ellipticity (a ratio (difference) between a X direction size and a Y direction size) of the spot of the processing light EL may be calculated, Note that an optical member (for example, a toric lens, a cylindrical lens and the like) in which refractive powers in two orthogonal directions different from each other may be located in the optical system of the processing apparatus 1 to reduce the degree of ellipticity when the degree of ellipticity of the spot of the processing light EL is large (the difference between the X direction size and the Y direction size is large).

According to the above described focus control operation, the light concentration position of the processing light EL is controllable appropriately.

Figure 42A:
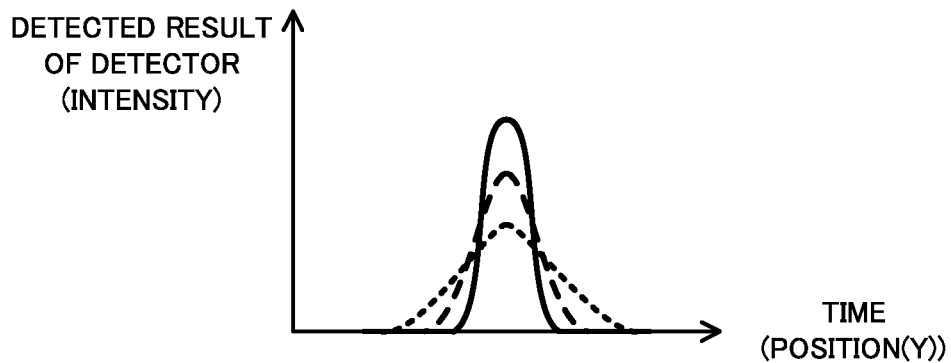

Note that the light receiving apparatus 9*d* may repeat detecting the processing light EL while changing a position of the light receiving apparatus 9*d* (especially, the detector 92*d*) in a direction (for example, the Z axis direction) intersecting with the XY plane, if needed. Namely, the light receiving apparatus 9*d* may detect the processing light EL in a state where the light receiving apparatus 9*d* (especially, the detector 92*d*) is located at a first position in the direction intersecting with the XY plane, and the light receiving apparatus 9*d* may detect the processing light EL in a state where the light receiving apparatus 9*d* (especially, the detector 92*d*) is located at a second position (note that the second position is different from the first position) in the direction intersecting with the XY plane. Note that the light receiving apparatus 9*d* may repeat detecting the processing light EL while changing the light concentration position of the processing light EL in a direction (for example, the Z axis direction) intersecting with the XY plane. In these cases, as illustrated in FIG. 42A that is a graph that illustrates the detected result of the detector 92*d*, the control apparatus 7 obtains a plurality of detection signals due to the change of the position of the light receiving apparatus 9*d*. In this case, the control apparatus 7 may calculate the light concentration position of the processing light EL on the basis of the plurality of detection signals and the position of the light receiving apparatus 9 when each detection signal is obtained, and furthermore, may control the light concentration position of the processing light EL. For example, changing the position of the light receiving apparatus 9*d* (especially, the detector 92*d*) in the direction intersecting with the XY plane is substantially equivalent to changing the light concentration position of the processing light EL relative to the light receiving apparatus 9*d*. Thus, the control apparatus 7 may determine how much the spot diameter of the processing light EL changes when the light receiving apparatus 9*d* is moved to what extent (namely, the light concentration position is moved to what extent) on the basis of the plurality of detection signals and the position of the light receiving apparatus 9 when each detection signal is obtained. As a result, the control apparatus 7 may determine how much the light concentration position should be moved in order to allow the spot diameter of the processing light EL to be equal to the spot diameter that is set as the processing condition.

Figure 42B:
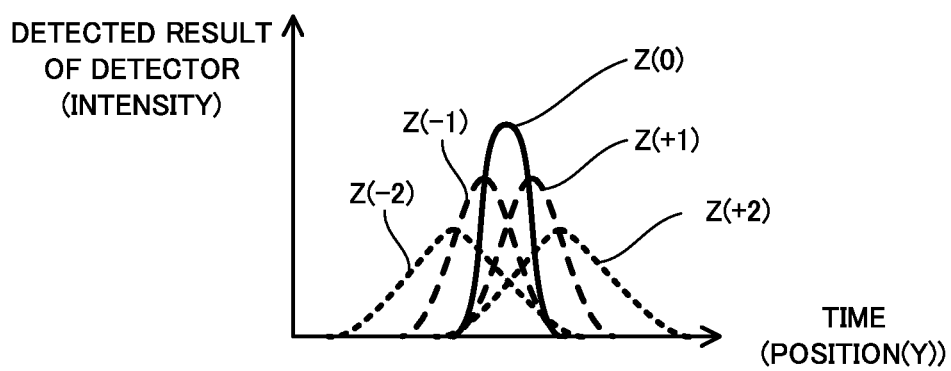
Figure 42C:
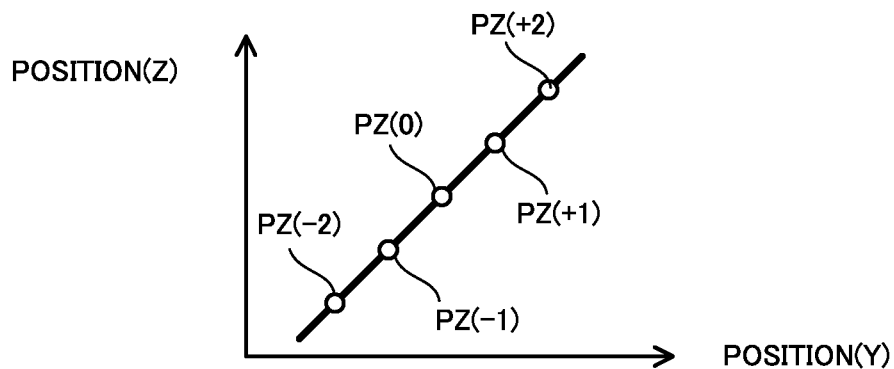

Moreover, a telecentricity of the processing light EL (a telecentric parameter, and a degree of inclination of the processing light EL with respect to the optical axis) may be calculated by detecting the processing light EL while changing the position of the light receiving apparatus 9*d* (especially, the detector 92*d*) in the Z axis direction or detecting the processing light EL while changing the light concentration position of the processing light EL in the Z axis direction. FIG. 42B illustrates the detected results in a plurality of positions in the Z axis direction in a state where they are superimposed. In FIG. 42B, Z(0) indicates the detected result in a state where the light receiving apparatus 9*d* is located at a first position in the Z axis direction, Z(+1) indicates the detected result in a state where the light receiving apparatus 9*d* is located at a second position in the Z axis direction (the second position is closer to the +Z side (the processing apparatus 1 side) than the first position), Z(+2) indicates the detected result in a state where the light receiving apparatus 9*d* is located at a third position in the Z axis direction (the third position is closer to the +Z side (the processing apparatus 1 side) than the second position), Z(−1) indicates the detected result in a state where the light receiving apparatus 9*d* is located at a fourth position in the Z axis direction (the fourth position is closer to the −Z side (is farther from the processing apparatus 1 side) than the first position), and Z(−2) indicates the detected result in a state where the light receiving apparatus 9*d* is located at a fifth position in the Z axis direction (the fifth position is closer to the −Z side (is farther from the processing apparatus 1 side) than the fourth position). FIG. 42C is a graph in which positions PZ at which the intensity is maximum in the detected results are plotted, and a line that connects plotted positions PZ(−2), PZ(−1), PZ(0), PZ(+1) and PZ(+2) represents the telecentricity. Here, when the line extends vertically, the position of the point PZ in the Y direction at which the intensity is maximum does not change even when the position in the Z axis direction changes, and thus, the telecentricity is maintained. Note that the positions PZ(−2), PZ(−1), PZ(0), PZ(+1) and PZ(+2) correspond to the detected result Z(−2), Z(−1), Z(0), Z(+1) and Z(+2), respectively.

Incidentally, when the telecentricity is not good, the telecentricity may be corrected by changing a position of at least a part of (alternatively, whole of) the fθ lens 142 in the optical axis direction.

(4-4-2) Light State Control Operation

Next, the light state control operation will be described. Firstly, with reference to FIG. 43, a technical reason why the light state control operation is performed. FIG. 43 is a planar view that schematically illustrates a spot diameter of the processing light EL at each position on the surface of the workpiece W when the surface of the workpiece W is swept by the processing light EL that is deflected by the Galvano mirror 141 and that is displaced by the fθ lens.

As illustrated in FIG. 43, the Galvano mirror 141 deflects the processing light EL to sweep a surface part of the surface of the workpiece W included in the processing shot area PSA with the processing light EL. In this case, a state where the state of the processing light EL is constant at any position in the processing shot area PSA is one example of an ideal state for processing the workpiece W with high accuracy. For example, a state where the state of the processing light EL with which a position P#1 is irradiated, the state of the processing light EL with which a position P#2 is irradiated, the state of the processing light EL with which a position P#3 is irradiated, the state of the processing light EL with which a position P#4 is irradiated, the state of the processing light EL with which a position P#5 is irradiated, the state of the processing light EL with which a position P#6 is irradiated, the state of the processing light EL with which a position P#7 is irradiated, the state of the processing light EL with which a position P#8 is irradiated and the state of the processing light EL with which a position P#9 is irradiated are same as one another is one example of the ideal state.

However, actually, as illustrated in FIG. 43, there is a possibility that the state of the processing light EL with which a certain position in the processing shot area PSA is irradiated is not same as the state of the processing light EL with which another position in the processing shot area PSA is irradiated. Namely, there is a possibility that the state of the processing light EL varies in the processing shot area PSA depending on the position that is irradiated with the processing light EL. Note that FIG. 43 illustrates an example in which the spot diameter of the processing light EL with which a certain position in the processing shot area PSA is irradiated is not same as the spot diameter of the processing light EL with which another position in the processing shot area PSA is irradiated. It is thought that one reason is the character of the Galvano mirror 141 and a character (typically, an aberration) of the fθ lens 42.

Thus, the processing system SYSd performs the light state control operation to change the state of the processing light EL in synchronization with the sweeping of the processing light EL so that a difference between the state of the processing light EL with which a certain position in the processing shot area PSA is irradiated and the state of the processing light EL with which another position in the processing shot area PSA is irradiated is smaller than that in the case where the light state control operation is not performed.

Firstly, the processing system SYSd performs, as a part of the light state control operation, a state detection operation for detecting, by the light receiving apparatus 9d, the state of the processing light EL with which each of a plurality of positions in the processing shot area PSA is irradiated. In order to perform the state detection operation, as illustrated in FIG. 44A that is a cross-sectional view that illustrates a positional relationship between the processing apparatus 1 and the light receiving apparatus 9d in a period when a state detection operation is performed and FIG. 44B that is a planar view that illustrates the positional relationship between the processing apparatus 1 and the light receiving apparatus 9d in the period when the state detection operation is performed, the stage 32 and/or the processing apparatus 1 moves so that the light receiving apparatus 9d (especially, the aperture 93d) is located in the processing shot area PSA. Namely, the processing system SYSd changes the positional relationship between the processing apparatus 1 and the light receiving apparatus 9d (more specifically, the positional relationship between the processing shot area PSA and the aperture 93d) in a plane along the XY plane so that the aperture 93d is located in the processing shot area PSA. As a result, the aperture 93 is located at a first position DTP#1 in the processing shot area PSA. Then, the processing apparatus 1 sweeps the surface part of the surface of the stage 32 included in the processing shot area PSA with the processing light EL. As a result, the detector 92d detects the processing light EL at a timing when the processing light EL traverses the aperture 92d located at the first position DTP#1. Namely, the aperture 9e d located at the first position DTP#1 is irradiated with the processing light EL and the detector 92d detects the processing light EL at a timing when a displacement amount (in other words, a deflected angle) of the processing light EL is a first displacement amount. Thus, the control apparatus 7 obtains, from the detector 92d, information relating to the state of the processing light EL with which the first position DTP#1 in the processing shot area PSA is irradiated. Namely, the control apparatus 7 obtains, from the detector 92d, information relating to the state of the processing light EL the displacement amount of which is the first displacement amount. Furthermore, when the detector 92d detects the processing light EL, the control apparatus 7 obtains, from the position detector 34, information relating to the position of the stage 32 at the timing when the detector 92d detects the processing light EL together. Since the light receiving apparatus 9d is placed at the stage 32, the information relating to the position of the stage 32 includes information relating to the position of the light receiving apparatus 9d (especially, the position of the aperture 93d).

Then, as illustrated in FIG. 44C that is a cross-sectional view that illustrates a positional relationship between the processing apparatus 1 and the light receiving apparatus 9d in a period when a state detection operation is performed and FIG. 44D that is a planar view that illustrates the positional relationship between the processing apparatus 1 and the light receiving apparatus 9d in the period when the state detection operation is performed, the stage 32 and/or the processing apparatus 1 moves so that the light receiving apparatus 9d (especially, the aperture 93d) is located at a position at which the processing light EL is not yet detected in the processing shot area PSA. Namely, the processing system SYSd changes the positional relationship between the processing apparatus 1 and the light receiving apparatus 9d to change the positional relationship between the processing shot area PSA and the aperture 93d in the plane along the XY plane. As a result, the aperture 93 is located at a second position in the processing shot area PSA. Then, the processing apparatus 1 sweeps the surface part of the surface of the stage 32 included in the processing shot area PSA with the processing light EL. As a result, the detector 92d detects the processing light EL at a timing when the processing light EL traverses the aperture 92d located at the second position. Namely, the aperture 9e d located at the second position is irradiated with the processing light EL and the detector 92d detects the processing light EL at a timing when the displacement amount of the processing light EL is a second displacement amount. Thus, the control apparatus 7 obtains, from the detector 92d, information relating to the state of the processing light EL with which the second position in the processing shot area PSA is irradiated. Namely, the control apparatus 7 obtains, from the detector 92d, information relating to the state of the processing light EL the displacement amount of which is the second displacement amount. Even in this case, the control apparatus 7 obtains, from the position detector 34, information relating to the position of the stage 32.

Then, the operation for changing the positional relationship between the processing shot area PSA and the aperture 93d in the plane along the XY plane and the operation for obtaining the information relating to the state of the processing light EL and the information relating to the position of the stage 32 are repeated necessary times. As a result, the control apparatus 7 obtains the information relating to the state of the processing light EL with which each of the plurality of positions in the processing shot area PSA is irradiated After the state detection operation is performed, the processing system SYSd performs, as another part of the light state control operation, a state control operation for controlling the state of the processing light EL in synchronization with the sweeping of the processing light EL on the basis of the information obtained by the state detection operation. Specifically, firstly, the control apparatus 7 calculates the position (especially, the position in the stage coordinate system) of the aperture 93d at the timing when the detector 92d detects the processing light EL on the basis of the information relating to the position of the stage 32 that is obtained by the state detection operation. As a result, the control apparatus 7 obtains information relating to a relationship between the position of the aperture 93d and the state of the processing light EL that is detected through the aperture 93d. Moreover, the position of the aperture 93d in the stage coordinate system is convertible to the position of the aperture 93d in the processing shot area PSA. Thus, the control apparatus 7 obtains information relating to a relationship between the position of the aperture 93d in the processing shot area PSA and the state of the processing light EL that is detected through the aperture 93d. Namely, the control apparatus 7 obtains information relating to a relationship between the irradiation position of the processing light EL in the processing shot area PSA and the state of the processing light EL with which the irradiation position is irradiated.

When the obtained information indicates that the state of the processing light EL is constant (namely, does not change) regardless of the irradiation position of the processing light EL in the processing shot area PSA, it is presumed that the state of the processing light E is the ideal state that is the state where the state of the processing light EL is constant at any position in the processing shot area PSA. Therefore, in this case, the control apparatus 7 may not change the state of the processing light EL in synchronization with the sweeping of the processing light EL when the workpiece W is actually processed. On the other hand, when the obtained information indicates that the state of the processing light EL changes depending on the irradiation position of the processing light EL in the processing shot area PSA, it is presumed that the state of the processing light EL is not the ideal state. Therefore, in this case, the control apparatus 7 changes the state of the processing light EL in synchronization with the sweeping of the processing light EL when the workpiece W is actually processed. Specifically, the control apparatus 7 changes the state of the processing light EL in synchronization with the sweeping of the processing light EL so that the difference between the state of the processing light EL with which a certain position in the processing shot area PSA is irradiated and the state of the processing light EL with which another position in the processing shot area PSA is irradiated becomes small. The control apparatus 7 changes the state of the processing light EL in synchronization with the sweeping of the processing light EL so that a variation of the state of the processing light EL becomes small. In this case, the control apparatus 7 may change the state of the processing light EL in synchronization with the sweeping of the processing light EL so that the state of the processing light EL is constant at any position in the processing shot area PSA. The control apparatus 7 may change the state of the processing light EL in synchronization with the sweeping of the processing light EL so that there is no variation of the state of the processing light EL. Note that the 9ontrol apparatus 7 may not change the state of the processing light EL in synchronization with the sweeping of the processing light EL when the workpiece W is actually processed, even when the state of the processing light EL changes depending on the irradiation position of the processing light EL in the processing shot area PSA For example, the control apparatus 7 may change the state of the processing light EL in synchronization with the sweeping of the processing light EL to satisfy a spot diameter condition that a difference between the spot diameter of the processing light EL at the first position in the processing shot area PSA and the spot diameter of the processing light EL at the second position in the processing shot area PSA is smaller (alternatively, equal to) than a predetermined allowable value. In this case, the control apparatus 7 may change the light concentration position of the processing light EL in synchronization with the sweeping of the processing light EL to satisfy the spot diameter condition. For example, the control apparatus 7 may change the light concentration position of the processing light EL to a desired value that is determined on the basis of the irradiation position of the processing light EL to satisfy the spot diameter condition. For example, the control apparatus 7 may change the light concentration position of the processing light EL to a desired value that differs from or is optimized for each irradiation position of the processing light EL.

For example, the control apparatus 7 may change the state of the processing light EL in synchronization with the sweeping of the processing light EL to satisfy an intensity condition that a difference between the intensity (for example, the energy amount per unit area) of the processing light EL at the first position in the processing shot area PSA and the intensity of the processing light EL at the second position in the processing shot area PSA is smaller (alternatively, equal to) than a predetermined allowable value. In this case, the control apparatus 7 may change the intensity of the processing light EL generated by the light source 11 in synchronization with the sweeping of the processing light EL to satisfy the intensity condition. The control apparatus 7 may change a controlling aspect of the intensity distribution of the processing light EL by the intensity distribution control member 123 of the optical system 12 in synchronization with the sweeping of the processing light EL to satisfy the intensity condition.

For example, the control apparatus 7 may change the state of the processing light EL in synchronization with the sweeping of the processing light EL to satisfy an intensity distribution condition that a difference between the intensity distribution of the processing light EL at the first position in the processing shot area PSA and the intensity distribution of the processing light EL at the second position in the processing shot area PSA is smaller (alternatively, equal to) than a predetermined allowable range. In this case, the control apparatus 7 may change the controlling aspect of the intensity distribution of the processing light EL by the intensity distribution control member 123 of the optical system 12 in synchronization with the sweeping of the processing light EL to satisfy the intensity distribution condition.

The control apparatus 7 may control the state of the processing light EL with which the first position in the processing shot area PSA is irradiated on the basis of the detected result of the state of the processing light EL that enters the detector 92*d* through the aperture 93*d* that is located at the first position in the processing shot area PSA, when the workpiece W is processed. The control apparatus 7 may control the state of the processing light EL on the basis of the detected result of the state of the processing light EL that enters the detector 92*d* through the aperture 93*d* that is located at the first position in the processing shot area PSA at a timing when the first position in the processing shot area PSA is irradiated with the processing light EL, when the workpiece W is processed. On the other hand, the control apparatus 7 may control the state of the processing light EL with which the second position in the processing shot area PSA is irradiated on the basis of the detected result of the state of the processing light EL that enters the detector 92*d* through the aperture 93*d* that is located at the second position in the processing shot area PSA, when the workpiece W is processed. The control apparatus 7 may control the state of the processing light EL on the basis of the detected result of the state of the processing light EL that enters the detector 92*d* through the aperture 93*d* that is located at the second position in the processing shot area PSA at a timing when the second position in the processing shot area PSA is irradiated with the processing light EL, when the workpiece W is processed.

According to the above described light state control operation, the variation of the state of the processing light EL caused by the characteristic of the Galvano mirror 141 and the fθ lens 142. Therefore, the processing system SYSd is allowed to process the workpiece W appropriately by using the processing light EL the variation of the stage of which is reduced.

Incidentally, when the state of the processing light EL varies in the processing shot area PSA, there is a possibility that the influence of the variation emerges as a variation of the processed amount of the workpiece W. Thus, the processing system SYSd may change the state of the processing light EL in synchronization with the sweeping of the processing light EL on the basis of a measured result of the actual processed amount of the workpiece W, in addition to or instead of changing the state of the processing light EL in synchronization with the sweeping of the processing light EL on the basis of the detected result of the detector 92*d*. In this case, for example, the processing system SYSd processes the workpiece W (for example, the workpiece on which the processing operation is performed or which is for the test) by using the processing apparatus 1 and measures the processed result of the workpiece W by using the measurement apparatus 2. Then, the processing system SYSd obtains the information relating to a relationship between the irradiation position of the processing light EL in the processing shot area PSA and the state of the processing light EL with which the irradiation position is irradiated on the basis of the measured result of the measurement apparatus 2. Then, the processing system SYSd changes the state of the processing light EL changes the state of the processing light EL on the basis of the information relating to a relationship between the irradiation position of the processing light EL in the processing shot area PSA and the state of the processing light EL with which the irradiation position is irradiated in the same manner as the case where the state of the processing light EL is changed on the basis of the detected result of the detector 92*d*.

Note that the above described light state control operation may be performed in not only a case where the variation of the state of the processing light EL does not temporally change but also a case where the variation of the state of the processing light EL temporally changes. In this case, the state detection operation may be performed while performing the removal processing (the step S131 in the example of FIG. 6) and the state control operation may be performed by using its result.

(4-4-3) Galvano Control Operation

Next, the Galvano control operation will be described. As described above, the Galvano control operation is an operation for controlling the Galvano mirror 141 to reduce the influence of the temperature drift that is the phenomenon that the irradiation position of the processing light EL in the plane along the XY plane varies depending on the temperature (namely, the heat) of the Galvano mirror 141. Firstly, with reference to FIG. 45A and FIG. 45B, the phenomenon that the irradiation position of the processing light EL in the plane along the XY plane varies depending on the temperature of the Galvano mirror 141 will be described.

FIG. 45A is a planar view that illustrates the irradiation positions of the processing light EL on the surface of the workpiece W (namely, in the plane along the XY plane) in the situation where the temperature drift does not arise. FIG. 45B is a planar view that illustrates the irradiation positions of the processing light EL on the surface of the workpiece W (namely, in the plane along the XY plane) in the situation where the temperature drift arises. As illustrated in FIG. 45A, when the temperature drift does not arise, the processing light EL is allowed to sweep the surface of the workpiece W (namely, the plane along the XY plane) along an ideal sweeping trajectory in the processing shot area PSA. Specifically, the processing light EL is allowed to sweep the surface of the workpiece W so that the sweeping trajectory of the processing light EL in the Y axis direction extends in a liner line. On the other hand, as illustrated in FIG. 45B, when the temperature drift arises, there is a possibility that the processing light EL sweeps the surface of the workpiece W along a sweeping trajectory that is different from the ideal sweeping trajectory in the processing shot area PSA. Specifically, there is a possibility that the processing light EL sweeps the surface of the workpiece W so that the sweeping trajectory of the processing light EL in the Y axis direction extends in a curved line.

Namely, when the temperature drift arises, there is a possibility that the irradiation position of the processing light EL deflected by the Galvano mirror 141 is different from an ideal position (for example, a designed position), compared to the case where the temperature drift does not arise. When the temperature drift arises, there is a possibility that the sweeping trajectory of the processing light EL deflected by the Galvano mirror 141 is different from the ideal sweeping trajectory (for example, a designed sweeping trajectory), compared to the case where the temperature drift does not arise. The state in which the irradiation position of the processing light EL is different from the ideal position is not desirable from the point of view of the appropriate processing of workpiece W.

Thus, the control apparatus 7 determines, on the basis of the detected result of the detector 92*d*, the irradiation position of the processing light EL in the plane along the XY plane in a period when the Galvano mirror 141 deflects the processing light EL. Then, the control apparatus 7 controls the Galvano mirror 141 so that the irradiation position of the processing light EL in the plane along the XY plane during the period when the Galvano mirror 141 deflects the processing light EL comes close to (or coincides with) an ideal position.

The processing system SYSd firstly performs, as a part of the Galvano control operation, an irradiation position detection operation for detecting the irradiation position of the processing light EL deflected by the Galvano mirror 141 by the light receiving apparatus 9d. In order to perform the irradiation position detection operation, the stage 32 and/or the processing apparatus 1 moves so that the light receiving apparatus 9d (especially, the aperture 93d) is located in the processing shot area PSA. In this state, the processing apparatus 1 sweep a surface portion of the surface of the stage 32 that is included in the processing shot area PSA with the processing light EL. As a result, the detector 92d detects the processing light EL at the timing when the processing light EL traverses the aperture 92d. In this case, the control apparatus 7 obtains the information relating to the position of the stage 32 at the timing when the detector 92d detects the processing light EL from the position measurement device 34. Since the light receiving apparatus 9d is disposed at the stage 32, the information relating to the position of the stage 32 includes the information about the position of the light receiving apparatus 9d (especially, the position of the aperture 93d). The above described operation is repeated while moving the light receiving apparatus 9d (especially, the aperture 93d) in the processing shot area PSA. As a result, the control device 7 obtains information relating to a plurality of irradiation positions each of which is irradiated with the processing light EL deflected by the Galvano mirror 141. Namely, the control apparatus 7 obtains information relating to the irradiation position of the processing light EL in each of the plurality of areas in the plane along the XY plane. Considering that a trajectory connecting the plurality of irradiation positions in sequence is the sweeping trajectory of the processing light EL, the control apparatus 7 obtains information relating to the sweeping trajectory of the processing light EL deflected by the Galvano mirror 141.

After the irradiation position detection operation is performed, the control apparatus 7 performs, as another part of the Galvano control operation, a control operation for actually controlling the Galvano mirror 141 on the basis of the information obtained by the irradiation position detection operation. Specifically, the control apparatus 7 firstly calculates, on the basis of the information relating to the irradiation positions of the processing light EL obtained by the irradiation position detection operation, a difference between the irradiation position of the processing light EL and the ideal position in the plane along the XY plane during the period when the Galvano mirror 141 deflects the processing light EL. Then, the control apparatus 7 controls the Galvano mirror 141 so that the calculated difference is reduced (or reduced to zero). For example, the control apparatus 7 may control a driving amount (specifically, a swinging amount or a rotating amount) of the X sweeping mirror 141X and the Y sweeping mirror 141Y of the Galvano mirror 141. As a result, the irradiation position (namely, the sweeping position) of the processing light EL in the plane along the XY plane is corrected to come close to or coincide with the ideal position. The irradiation position of the processing light EL in at least one of the X axis direction and the Y axis direction is corrected to come close to or coincide with the ideal position. The sweeping trajectory of the processing light EL is corrected to come close to or coincide with the ideal trajectory.

According to the above described Galvano control operation, the influence of the temperature drift that is the phenomenon that the irradiation position of the processing light EL in the plane along the XY plane varies (namely, fluctuates) depending on the temperature of the Galvano mirror 141 is reduced. Therefore, the processing system SYS is allowed to process the workpiece W with relatively high accuracy by irradiating the processing light EL deflected by the Galvano mirror 141 at the ideal position. Note that the phenomenon that the irradiation position of the processing light EL in the plane along the XY plane varies (namely, fluctuates) depending on a temperature of an optical system other than the Galvano mirror 141 may be reduced in the same manner as this example.

Note that not only the light receiving apparatus 9d but also any detection apparatus that is configured to detect the processing light EL may be used to determine the irradiation position of the processing light EL deflected by the Galvano mirror 141. For example, as illustrated in FIG. 46A that is a cross-sectional view that illustrates the stage 32 and FIG. 46B that is a plan view that illustrates the stage 32, a plurality of photodetectors (for example, quadripartite photodetectors) 9e disposed at a plurality of positions of the stage 32 may be used to determine the irradiation position of the processing light EL deflected by the Galvano mirror 141. Note that the light receiving apparatus 9d having the aperture 93d may also be disposed at a plurality of positions of the stage 32 in the same manner as the example of FIG. 46.

Incidentally, when the irradiation position of the processing light EL is different from the ideal position, there is a possibility that the influence emerges as a variation of the processed amount of the workpiece W. Thus, the processing system SYSd may obtain the information relating to the irradiation position of the processing light EL in each of the plurality of areas in the plane along the XY plane on the basis of the measured result of the actual processed amount of the workpiece W, in addition to or instead of the detected result of the detector 92d. In this case, for example, the processing system SYSd processes the workpiece W (for example, the workpiece on which the processing operation is performed or which is for the test) by using the processing apparatus 1 and measures the processed result of the workpiece W by using the measurement apparatus 2. Then, the processing system SYSd may obtain the information relating to the irradiation position of the processing light EL in each of the plurality of areas in the plane along the XY plane on the basis of the measured result of the measurement apparatus 2.

Moreover, since the temperature (namely, the heat) of the Galvano mirror 141 is the cause of the difference between the irradiation position of the processing light EL and the ideal position, the control apparatus 7 may estimates the irradiation position of the processing light EL in each of the plurality of areas in the plane along the XY plane on the basis of the temperature of the Galvano mirror 141 in addition to or instead of the detected result of the detector 92d. Furthermore, since the processing apparatus 1 is provided with the Galvano mirror 141, there is a possibility that the temperature of the Galvano mirror 141 may be correlated with the temperature of the processing apparatus 1. Thus, the control apparatus 7 may estimate the irradiation position of the processing light EL at each of the plurality of areas in the plane along the XY plane on the basis of the temperature of the processing apparatus 1. In this case, the information relating to the estimated irradiation position may be used as the information relating to the irradiation position of the processing light EL at each of the plurality of areas in the plane along the XY plane.

Note that the above described Galvano control operation may be performed in not only a case where the variation of the irradiation position of the processing light EL does not temporally change but also a case where the variation of the irradiation position of the processing light EL temporally changes. In this case, an initial value of variation of the irradiation position of the processing light EL in the plane along the XY plane may be calculated by using the irradiation position detection operation and the control operation for actually controlling the Galvano mirror 141 may be performed by using its result.

(4-4-4) Other Usage of Light Receive Apparatus 9d

In the above described description, the light receiving apparatus 9d is mainly used to control the processing system SYSd on the basis of the detected result of the detector 92d of the light receiving apparatus 9d. However, the light receiving apparatus 9d may be used for other uses. As one example, at least a part of the light receiving apparatus 9d (for example, the aperture 93d) may be used as a marker (namely, an indicator) that is measurable or detectable by the measurement apparatus 2. In this case, the processing system SYSd (for example, at least one of the processing apparatus 1, the measurement apparatus 2, the stage apparatus 3, the driving system 5 and the driving system 6) may be controlled so that the processing system SYSd appropriately processes the workpiece W on the basis of the measured result of the aperture 93d by the measurement apparatus 2. Next, as one example, with reference to FIG. 47, a stage control operation for controlling the position of the stage 32 on the basis of the measured result of the aperture 93d by the measurement apparatus 2 will be described. FIG. 47 is a flowchart that illustrates a flow of the stage control operation for controlling the position of the stage 32 on the basis of the measured result of the aperture 93d by the measurement apparatus 2.

As illustrated in FIG. 47, the stage 32 and/or the processing apparatus 1 moves so that the light receiving apparatus 9d (especially, the aperture 93d) is located in the processing shot area PSA (a step S51). Namely, the stage 32 and/or the processing apparatus 1 moves so that the light receiving apparatus 9d is located at a position at which it is allowed to optically receive the processing light EL from the processing apparatus 1.

Then, the processing apparatus 1 irradiates a processing base point in the processing shot area PSA with the processing light EL (a step S52). For example, the processing apparatus 1 may irradiate the processing base point with the processing light EL by emitting the processing light EL without deflecting the processing light EL by the Galvano mirror 141 (namely, without driving the Galvano mirror 141). Note that the processing base point may be irradiated with the processing light EL by deflecting the processing light EL (namely, by driving the Galvano mirror 141). The processing reference point may be a center of the processing shot area PSA, for example. The processing reference point may be an intersection point between the optical axis of the processing apparatus 1 and the processing shot area PSA, for example. In that state, the stage 32 and/or the processing apparatus 1 moves along the XY plane until the detector 92d is allowed to detect the processing light EL (a step S52). In other words, the stage 32 and/or the processing apparatus 1 moves along the XY plane until the light receiving apparatus 9d is allowed to optically receive the processing light EL (step S52). Note that his movement may be stepwise (repeating the movement and stopping).

Then, when the stage 32 move in at least one of the steps S51 and S52, the control apparatus 7 obtains, from the position measurement device 34, stage position information relating to the position (especially, the position in the plane along the XY plane along which the stage 32 moves) of the stage 32 at a timing when the detector 92d detects the processing light EL (a step S53). In addition, at the point when the detector 92d is able to detect the processing light EL, the stage 32 is located on the surface plate 31. Furthermore, when the processing apparatus 1 moves in at least one of the steps S51 and S52, the control apparatus 7 obtains, from the position measurement device 51, processing position information relating to the position (especially, the position in the plane along the XY plane along which the processing apparatus 1 moves) of the processing apparatus 1 at the timing when the detector 92d detects the processing light EL (the step S53).

Then, the stage 32 and/or the measurement apparatus 2 moves so that the light receiving apparatus 9d (especially, the aperture 93d) is located in the measurement shot area MSA (a step S54). Then, the measurement apparatus 2 measures the aperture 93d (a step S55). Especially, the measurement apparatus 2 measures the position of the aperture 93d. In that state, the stage 32 and/or the measurement apparatus 2 moves along the XY plane until the aperture 93d is located at a measurement base point in the measurement shot area MSA (a step S55). The measurement base point may be a center of the measurement shot area MSA, for example. The measurement base point may be an intersection of the optical axis of the measurement apparatus 2 and the measurement shot area MSA. When the measurement apparatus 2 is provided with a light receiving device including the plurality of photodetectors that are arranged in the single dimensional direction or the two dimensional direction (as one example, a single dimensional imaging sensor or a two-dimensional imaging sensor), the measurement base point may be a position in the measurement area MSA that corresponds to at least one particular photodetector of the plurality of photodetectors.

Then, when the stage 32 move in at least one of the steps S51 and S52, the control apparatus 7 obtains, from the position measurement device 34, the stage position information relating to the position (especially, the position in the plane along the XY plane along which the stage 32 moves) of the stage 32 at a timing when the aperture 93d is located at the measurement base point (a step S56). Note that the stage 32 is located on the surface plate 31 at the timing when the aperture 93d is located at the measurement base point. Furthermore, when the measurement apparatus 2 moves in at least one of the steps S51 and S52, the control apparatus 7 obtains, from the position measurement device 61, measurement position information relating to the position (especially, the position in the plane along the XY plane along which the measurement apparatus 2 moves) of the measurement apparatus 2 at the timing when the aperture 93d is located at the measurement base point (the step S56).

The stage position information obtained at the step S53 corresponds to information relating to the position of the stage 32 in a state where the aperture 93d is located at the processing base point. Since the aperture 93d is formed at the stage 32, it can be said that the information relating to the position of the stage 32 in the state where the aperture 93d is located at the processing base point indirectly represents the position of the aperture 93d that is located at the processing base point, the position of the processing base point and a relative position of the aperture 93d and the processing apparatus 1 that is the base for the processing base point. Furthermore, the stage position information obtained at the step S56 corresponds to information relating to the position of the stage 32 in a state where the aperture 93d is located at the measurement base point. Therefore, it can be said that the information relating to the position of the stage 32 in the state where the aperture 93d is located at the measurement base point indirectly represents the position of the aperture 93d that is located at the measurement base point, the position of the measurement base point and a relative position of the aperture 93d and the measurement apparatus 2 that is the base for the measurement base point. In addition, a difference between the position of the stage 32 indicated by the stage position information obtained at the step S53 and the position of the stage 32 indicated by the stage position information obtained at step S56 corresponds to a difference between the position of the processing base point and the position of the measurement base point. Thus, the control apparatus 7 calculates, on the basis of the stage position information obtained at the step S53 and the step S56, a baseline amount that corresponds to a distance (specifically, a distance along the XY plane) between the processing base point and the measurement base point (a step S57). In this case, since both of the stage position information obtained at the step S53 and the step S56 is information relating to the position in the stage coordinate system, the control apparatus 7 calculates the baseline amount in the stage coordinate system. Note that FIG. 48 is a cross-sectional view that schematically illustrates the baseline amount in the fourth modified example.

Furthermore, the processing position information obtained at the step S53 corresponds to information relating to the position of the processing apparatus 1 in the state where the aperture 93d is located at the processing base point. Furthermore, since the position of the processing shot area PSA (furthermore, the processing base point) is the position that is defined on the basis of the processing apparatus 1, it can be said that the processing position information obtained at the step S53 indirectly represents the relative position of the aperture 93d and the processing apparatus 1 that is the base for the processing base point. The measurement position information obtained at the step S56 corresponds to information relating to the position of the measurement apparatus 2 in the state where the aperture 93d is located at the measurement base point. Furthermore, since the position of the measurement shot area MSA (furthermore, the measurement base point) is the position that is defined on the basis of the measurement apparatus 2, it can be said that the measurement position information obtained at the step S56 indirectly represents the relative position of the aperture 93d and the measurement apparatus 2 that is the base for the processing base point. Thus, the difference between the position of the processing apparatus 1 indicated by the processing position information obtained at the step S53 and the position of the measurement apparatus 1 indicated by the measurement position information obtained at step S56 corresponds to the difference between the position of the processing base point and the position of the measurement base point. Thus, the control apparatus 7 calculates, on the basis of the processing position information and the measurement position information obtained at the step S53 and the step S56, respectively, the baseline amount that corresponds to the distance (specifically, the distance along the XY plane) between the processing base point and the measurement base point (a step S57).

Considering that the processing shot area PSA is the position that is defined on the basis of the processing apparatus 1 and the measurement shot area MSA is the position that is defined on the basis of the measurement apparatus 2, it can be said that the baseline amount calculated at the step S57 is information relating to a relative position of the processing apparatus 1 and the measurement apparatus 2. Therefore, the control apparatus 7 may calculate not only the baseline amount but also the information relating to the relative position of the processing apparatus 1 and the measurement apparatus 2 at the step S57. The information relating to the relative position of the processing apparatus 1 and the measurement apparatus 2 may include at least one of information relating to a relative position of the processing shot area PSA and the measurement shot area MSA and information relating to a relative position of the processing base point and the measuring base point, for example. When the measurement apparatus 2 is provided with the light receiving device including the plurality of photodetectors that are arranged in the single dimensional direction or the two dimensional direction (as one example, the single dimensional imaging sensor or the two dimensional imaging sensor), the control apparatus 7 may associate each of the plurality of photodetectors of the light receiving device to the stage coordinate system.

At the step S57, the control apparatus 7 may separately calculate, as the baseline amount, a baseline amount indicating the distance between the processing base point and the measurement base point in the X axis direction and a baseline amount indicating the distance between the processing base point and the measurement base point in the Y axis direction. Moreover, the control apparatus 7 may calculate a baseline amount indicating the distance between the processing base point and the measurement base point in the Z axis direction separately from the baselines regarding the X axis direction and the Y-axis direction described above.

At the step S57, the controller 7 may perform at least one of an operations for calculating the baseline amount on the basis of the stage position information and an operation for calculating the baseline amount on the basis of the processing position information and the measurement position information. When the operation for calculating the baseline amount on the basis of the stage position information is not performed, the information relating to the position of the stage 32 may not be obtained at each of the steps S53 and S56. When the operation for calculating the baseline amount on the basis of the processing position information and the measurement position information is not performed, the information relating to the position of the processing apparatus 1 may not be obtained at the step S53, and the information relating to the position of the measurement apparatus 2 may not be obtained at the step S56.

The operation from the step S51 to the step S57 may be performed before the processing system SYSd actually processes the workpiece W. The operation from the step S51 to the step S57 may be performed after the processing system SYSd actually processes the workpiece W. The operation from the step S51 to the step S57 may be performed after the processing system SYSd performs a certain processing operation and before the processing system SYSd performs another processing operation next. The operation from the step S51 to the step S57 may be performed between one period when the workpiece W is processed and another period when the same workpiece W is processed. However, the operation from the step S51 to the step S57 may be performed in a period when the processing system SYSd actually processes the workpiece W. The operation from the step S51 to the step S57 may be performed every time a predetermined time elapses after the processing system SYSd starts to operate.

Thereafter, during the period when the processing system SYSd actually processes the workpiece W (namely, during the period when the above described processing operation is performed), the processing system SYSd performs the processing operation on the basis of the baseline amount calculated at the step S57 (a step S58). For example, the control apparatus 7 may control the position of the stage 32 on the basis of the baseline amount calculated at the step S57 (the step S58). The control apparatus 7 may control the stage driving system 33 so that the stage 32 moves on the basis of the baseline amount calculated at the step S57 (the step S58). The control apparatus 7 may control the driving system 5 so that the processing apparatus 1 moves on the basis of the baseline amount calculated at the step S57. The control apparatus 7 may control the driving system 6 so that the measurement apparatus 2 moves on the basis of the baseline amount calculated at the step S57.

At the step S58, for example, the control apparatus 7 may move the stage 32 so that the processing apparatus 1 irradiates a measured part of the workpiece W that is actually already measured by the measurement apparatus 2 with the processing light EL and thus the measured part is processed. For example, the control apparatus 7 may move the stage 32 so that the measurement apparatus 2 measures the processed part of the workpiece W that is already processed by the processing apparatus 1 (namely, the part that is already irradiated with the processing light EL).

Incidentally, considering that the baseline amount is calculated on the basis of the stage position information obtained at the step S53 and the step S56, the control apparatus 7 may control the position of the stage 32 on the basis of the stage position information obtained at the step S53 and the step S56 without calculating the baseline amount.

Similarly, considering that the baseline amount is calculated on the basis of the processing position information and the measurement position information obtained at the step S53 and the step S56, respectively, the control apparatus 7 may control the position of the stage 32 on the basis of the processing position information and the measurement position information obtained at the step S53 and the step S56, respectively, without calculating the baseline amount. For example, the control apparatus 7 may move the stage 32 on the basis of the processing position information and the measurement position information so that the measurement apparatus 2 measures the processed part of the workpiece W that is already processed by the processing apparatus 1 (namely, the part that is already irradiated with the processing light EL).

The position indicated by the processing position information and the position indicated by the measurement position information are different from the position in the stage coordinate system. Thus, the control apparatus 7 may manage the position indicated by the processing position information as the position in the stage coordinate system. Similarly, the control apparatus 7 may manage the position indicated by the measurement position information as the position in the stage coordinate system. As one example, for example, the control apparatus 7 may calculate the position of the processing base point in the stage coordinate system on the basis of the position indicated by the processing position information obtained at the step S53 (furthermore, the stage position information obtained at the step S53, if needed). For example, the control apparatus 7 may calculate a positional relationship between the stage coordinate system and the measurement shot area MSA on the basis of the position indicated by the measurement position information obtained at the step S56 (furthermore, the stage position information obtained at the step S56, if needed). Then, the control apparatus 7 may move the stage 32 on the basis of information relating to the relationship between the stage coordinate system and the measurement shot area MSA and information relating to the position of the processing base point in the stage coordinate system so that the measurement apparatus 2 measures the processed part of the workpiece W that is already processed by the processing apparatus 1 (namely, the part that is already irradiated with the processing light EL). Alternatively, the control apparatus 7 may move the stage 32 on the basis of the information relating to the relationship between the stage coordinate system and the measurement shot area MSA and the information relating to the position of the processing base point in the stage coordinate system so that the processing apparatus 1 irradiates the measured part of the workpiece W that is actually already measured by the measurement apparatus 2 with the processing light EL and thus the measured part is processed.

According to the above described stage control operation, the processing system SYSd performs the processing operation on the basis of the relative position of the processing apparatus 1 and the measurement apparatus 2 (for example, the relative position of the processing base point and the measurement base point). Therefore, the processing system SYSd is allowed to perform the processing operation without being affected by changes in the relative position of the processing apparatus 1 and the measurement apparatus 2, even when the relative position of the processing apparatus 1 and the measurement apparatus 2 (for example the relative position of the processing base point and the measurement base point) changes over time. As a result, the machining system SYSd is allowed to process the workpiece W with relatively high accuracy, compared to a case where a stage movement control is not performed.

Incidentally, in the above described description, the aperture 93d is used as the marker (namely, the indicator) that is measurable by the measurement apparatus 2. However, any marker AM that is different from the aperture 93d may be measured by the measurement apparatus 2. In this case, the stage 32 and/or the processing apparatus 1 may move so that the marker AM is located in the processing shot area PSA (the step S51 in FIG. 47), the observation apparatus 16 images the marker AM (namely, the observation apparatus 16 optically receives the returned light ILr of the illumination light IL from the marker AM) to measure a position of the marker AM, and the control apparatus 7 may obtain the information relating to the positions of the stage 32 and the processing apparatus 1 at this timing (the step S53 in FIG. 47). Furthermore, the stage 32 and/or the measurement apparatus 2 may move so that the marker AM is located in the measurement shot area MSA (the step S54 in FIG. 47), the measurement apparatus 2 may measure the position of the marker AM and the control apparatus 7 may obtain the information relating to the positions of the stage 32 and the measurement apparatus 2 at this timing (the step S56 in FIG. 47). Then, the same operation may be performed as with the case where the aperture 93d is used.

The measurement apparatus 2 may measure the aperture 93d and any marker AM. In this case, an operation for moving the stage 32 and/or the processing apparatus 1 so that the aperture 93d is located in the measurement shot area MSA and measuring the aperture 93d by the measurement apparatus 2 and an operation for moving the stage 32 and/or the processing apparatus 1 so that the marker AM is located in the measurement shot area MSA and measuring the marker AM by the measurement apparatus 2 may be performed separately. Moreover, when the aperture 93d and the marker AM are allowed to be located in the measurement shot area MSA of the measurement apparatus 2, both operations may be performed at the same time.

Figure 49A:
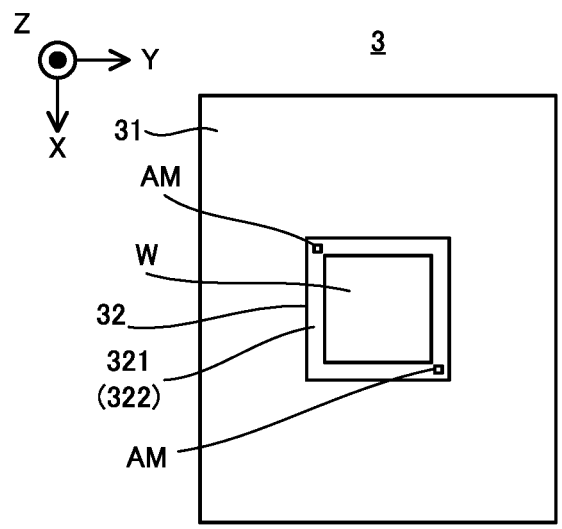
Figure 49B:
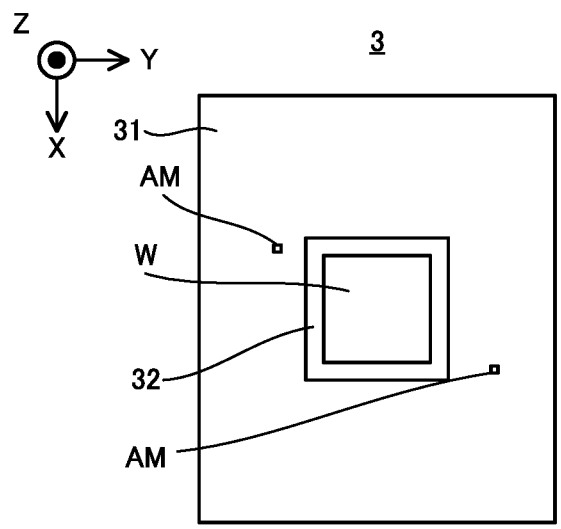
Figure 49C:
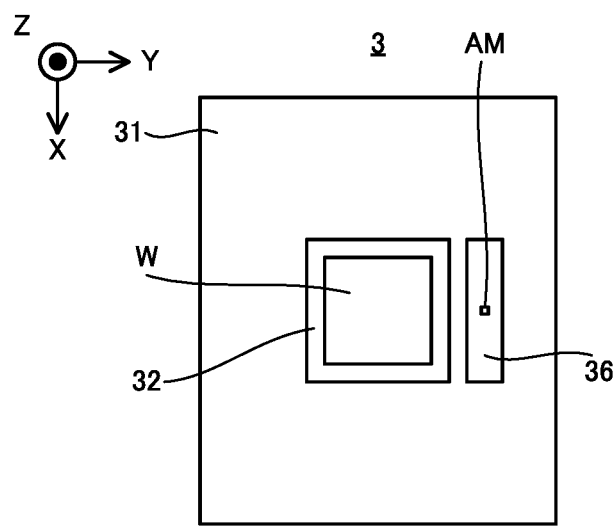

One example of any marker different from the aperture 93d is illustrated in FIG. 49A to FIG. 49D. FIG. 49A illustrates an example in which the marker AM is formed on the surface (for example, the outer circumference surface 322 (alternatively, the placement surface 321)) of the stage 32. FIG. 49A illustrates an example in which the marker AM is formed on the surface of the stage 32. FIG. 49B illustrates an example in which the marker AM is formed on the surface of the surface plate 31. FIG. 49C illustrates an example in which a marker member 36 at which the marker AM is formed is disposed on the surface plate 31 in addition to the stage 31.

Figure 49D:
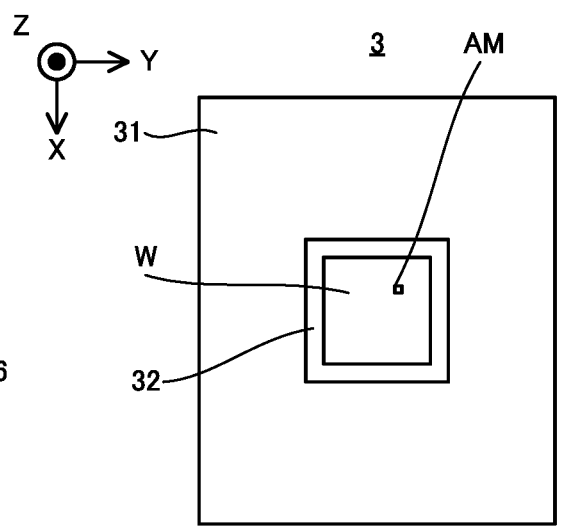

The marker member 36 may be movable with the stage 32. FIG. 49D illustrates an example in which the marker AM is formed at the workpiece W that is placed on the stage 32. The marker AM formed at the workpiece W may include a marker AM that is formed on the workpiece W in advance or may include a marker AM that includes a structure formed by the processing operation by the processing apparatus 1.

Incidentally, when any maker AM that is different from the aperture 93d is measured by the measurement apparatus 2, the relationship between the position of the aperture 93d and the position of any marker AM may be obtained by the measurement apparatus 2 or another measurement apparatus. Here, any marker AM may be regarded as being a part of a relating object that is related to the aperture 93d (the light receiving apparatus 9d).

Moreover, the baseline amount may be calculated by processing the workpiece W by the processing apparatus 1 and measuring the processed workpiece W by the measurement apparatus 2.

(4-5) Fifth Modified Example

In the above described description, the processing apparatus 1 performs the subtractive (substractive) processing for subtracting a part of the workpiece W by irradiating the workpiece W with the processing light EL. However, the processing apparatus 1 may perform a processing that is different from the subtractive processing by irradiating the workpiece W with the processing light EL. The processing apparatus 1 may perform the processing that is different from the subtractive processing in addition to or instead of the subtractive processing. For example, the processing apparatus 1 performs the additive manufacturing by irradiating the workpiece W with the processing light EL.

When the processing apparatus 1 performs the additive manufacturing, the operation for determining whether or not the processed amount by the processing apparatus 1 is the appropriate amount in the processing operation (the step S133 in FIG. 6) may include an operation for determining whether or not an added amount by the processing apparatus 1 is an appropriate amount. The added amount is an amount relating to a material that is newly added to the workpiece W, and a thickness of a layered structural object may be used as the added amount when the additive manufacturing for forming a plurality of layered structural objects in order is performed, for example.

FIG. 50 is a diagram that illustrates an overview structure of a processing system SYSe that performs the removal processing and the additive processing. The processing system SYSe illustrated in FIG. 50 is provided with a processing apparatus 1B that performs the additive processing in addition to the processing system SYS. Note that the support frame 8 is omitted in FIG. 50 for the purpose of clear illustration. The processing apparatus 1B of the processing system SYSe is configured to perform the additive processing on the workpiece W under the control of the control apparatus 7.

In FIG. 51 that illustrates the processing apparatus 1B in detail, the processing apparatus 1B is configured to form a three-dimensional structural object (namely, a three-dimensional object having a size in each of three-dimensional directions, and a solid object). The processing apparatus 1B is configured to form the three-dimensional structural object ST on the workpiece W that is a base for forming the three-dimensional structural object. The processing apparatus 1B is configured to form the three-dimensional structural object on the workpiece W that is a target for the additive processing. The workpiece W may be referred to as a base member or base. The processing apparatus 1B is configured to form the three-dimensional structural object by performing the additive processing on the workpiece W. When the workpiece W is an existing structural object held by the stage 31 (alternatively, supported by or mounted on the stage 31), the processing apparatus 1B is configured to form the three-dimensional structural object on the existing structural object. In this case, the processing apparatus 1B may form the three-dimensional structural object that is integrated with the existing structural object. An operation for forming the three-dimensional structural object that is integrated with the existing structural object is equivalent to an operation for adding a new structural object to the existing structural object. Note that the processing apparatus 1B may form the three-dimensional structural object that is separable from the existing structural object. Note that FIG. 50 and FIG. 51 illustrates an example in which the workpiece W is the existing structural object held by the stage 31. The below described description also uses the example in which the workpiece W is the existing structural object held by the stage 31.

The processing apparatus 1B is configured to form the three-dimensional structural object by a Laser Metal Deposition. Namely, it can be said that the processing apparatus 1B is a 3D printer that forms an object by using an Additive layer manufacturing technique. Note that the Additive layer manufacturing technique may be referred to as a Rapid Prototyping, a Rapid Manufacturing or an Additive Manufacturing.

In order to form the three-dimensional structural object, as illustrated in FIG. 51, the processing apparatus 1B is provided with a material supply apparatus 101 and a processing head 102. At least a part of each of the processing head 102 and the stage 32 is housed in the housing 4 in which the processing apparatus 1 and the measurement apparatus 2 are housed.

The material supply apparatus 101 supplies build materials M. The material supply apparatus 101 supplies, to the processing head 102, the build materials M the amount of which is necessary to form the three-dimensional structural object per unit time by supplying the build materials M at a desired supply rate that is based on the necessary amount. Namely, the material supply apparatus 101 supplies the build materials M so that a supplied amount of the build materials M per unit time is a desired supplied amount based on the necessary amount.

The build material M is a material that is molten by an irradiation of the processing light EL having a predetermine intensity or more intensity. At least one of a metal material and a resin material is usable as the build material M, for example. However, another material that is different from the metal material and the resin material may be used as the build material M. In this example, the build materials M are powder-like materials. However, the build materials M may be a wire-like build materials.

The processing apparatus 1B forms the three-dimensional structural object by using the build materials M supplied from the material supply apparatus 101. In order to form the three-dimensional structural object by using the build materials M, the processing apparatus 1B is provided with the processing head 102 and a driving system 5B. Moreover, the processing head 102 is provided with an irradiation optical system 1021 and a material nozzle 1022 (namely, a supply system or a supply apparatus that supplies the build materials M).

The irradiation optical system 1021 is an optical system (for example, a condensing optical system) for emitting a processing light FL from an emitting part 1023. Note that the processing light EL emitted from the irradiation optical system 1021 (namely, the processing light EL emitted from the processing apparatus 1B) is referred to as a "processing light FL" to distinguish it from the processing light EL emitted from the above described processing apparatus 1. The irradiation system 1021 emits the processing light FL in a downward direction (namely, toward a −Z side) from the irradiation optical system 1021. The stage 32 is disposed below the irradiation optical system 1021. When the workpiece W is placed on the stage 32, the irradiation optical system 1021 is configured to emit the processing light FL toward the workpiece W. Specifically, the irradiation optical system 1021 irradiates an irradiation area FA that is set on the workpiece W as an area that is irradiated with the processing light FL (typically, in which the light is condensed). Moreover, a state of the irradiation optical system 1021 is switchable between a state where the irradiation area FA is irradiated with the processing light FL and a state where the irradiation area FA is not irradiated with the processing light FL under the control of the control apparatus 7. Note that a direction of the processing light FL emitted from the irradiation optical system 1021 is not limited to a vertical downward direction (namely, coincident with the −Z axis direction), and may be a direction that is inclined with respect to the Z axis by a predetermined angle, for example.

The material nozzle 1022 is a material supply member (a powder supply member) that supplies the build materials to the workpiece W. Specifically, the material nozzle 1022 has a supply outlet 1024 that supplies the build materials M. The supply outlet 1024 is formed at a part of the material nozzle 1022 that faces toward the workpiece W (namely, that faces the workpiece W and faces toward the −Z side), for example. The material nozzle 1022 supplies (specifically, injects, blows out or sprays) the build materials M from the supply outlet 1024. The material nozzle 1022 supplies the build materials M in a downward direction (namely, toward the −Z side) from the material nozzle 1022. The stage 32 is disposed below the material nozzle 1022. When the workpiece W is placed on the stage 32, the material nozzle 1022 supplies the build materials M toward the workpiece W. Note that although a moving direction of the build materials M supplied from the material nozzle 41 is a direction that is inclined with respect to the Z axis by a predetermined angle (as one example, an acute angle), it may be the −Z axis direction (namely, a vertical downward direction).

In the fifth modified example, the material nozzle 1022 is aligned to the irradiation optical system 1021 so as to supply the build materials M to the irradiation area FA that is irradiated with the processing light FL by the irradiation optical system 101. In other words, in the fifth modified example, the irradiation optical system 1021 is aligned to the material nozzle 1022 so as to emit the processing light FL toward a supply area MA that is set on the workpiece W as an area to which the material nozzle 1022 supplies the build materials M. Namely, the material nozzle 1022 is aligned to the irradiation optical system 1021 so that the irradiation area FA is coincident with (alternatively, at least partially overlaps with) the supply area MA. Note that the material nozzle 1022 may aligned so as to supply the build materials M to a melt pool that is formed at the workpiece W by the processing light FL emitted from the irradiation optical system 1021.

The driving system 5B moves the processing head 102. The driving system 5B moves the processing head 102 along at least one of the X axis, the Y axis and the Z axis. Moreover, the driving system 5B may move the processing head 102 along a rotation direction of at least one of the θX direction, the θY direction and the θZ direction in addition to or instead of at least one of the X axis, the Y axis and the Z axis. In other words, the driving system 5B may rotate the processing head 102 around at least one of the X axis, the Y axis and the Z axis. The driving system 5B may change an attitude of the processing head 102 around at least one of the X axis, the Y axis and the Z axis. The driving system 5B includes a motor or the like, for example. Moreover, the processing system SYSe is provided with a position measurement device 51B that is configured to measure a position of the processing head 101 that is moved by the driving system 5B. The position measurement device 51B may include at least one of an encoder and an interferometer, for example.

When the processing head 102 moves along at least one of the X axis and the θY direction, each of the irradiation area FA and the supply area MA moves on the workpiece W along the X axis. When the processing head 102 moves along at least one of the Y axis and the θX direction, each of the irradiation area FA and the supply area MA moves on the workpiece W along the Y axis. Namely, the driving system 5B is configured to change a positional relationship between the workpiece W and each of the irradiation area FA and the supply area MA by moving the processing head 102.

Note that the driving system 5B may move the irradiation optical system 1021 and the material nozzle 1022 separately. Specifically, for example, the driving system 5B may adjust at least one of a position of the emitting part 1023, a direction of the emitting part 1023, a position of the supply outlet 1024 and a direction of the supply outlet 1024. In this case, the irradiation area FA that is irradiated with the processing light FL by the irradiation optical system 1021 and the supply area MA to which the material nozzle 1022 supplies the build materials M are controllable separately.

The control apparatus 7 controls an operation of the processing system SYSe. For example, the control apparatus 7 may control an emitting aspect of the processing light FL by the irradiation optical system 1021. The emitting aspect may include at least one of an intensity of the processing light FL and an emitting timing of the processing light FL, for example. When the processing light FL is a pulsed light, the emitting aspect may include a ratio (what we call a duty ratio) of a length of an ON time of the pulsed light to an emitting cycle of the pulsed light. Moreover, the emitting aspect may include at least one of the length itself of the ON time of the pulsed light and the emitting cycle itself of the pulsed light. Moreover, the control apparatus 7 may control a moving aspect of the processing head 102 by the driving system 5B. The moving aspect may include at least one of a moving distance, a moving speed, a moving direction and a moving timing, for example. Moreover, the control apparatus 7 may control a supplying aspect of the build materials M by the material supply apparatus 101. The supplying aspect may include at least one of a supplied amount (especially, a supplied amount per unit time) a supply timing.

As described above, the processing system SYSe determines whether or not an additive processed amount and a removal processed amount is the appropriate amount, and sets the processing condition (at least one of the emitting aspect of the processing light FL, the suppling aspect of the build materials M and a relative moving aspect of the irradiation area FA and the supply area MA, for example, when the additive processing is performed) on the basis of the determined result, and thus, realizes the high accurate processing.

(4-6) Sixth Modified Example

In the above described description, the processing system SYS is provided with one type of processing apparatus 1. However, the processing system SYS may be provided with plurality of types of processing apparatuses 1. A processing system SYSf illustrated in FIG. 52 is provided with the processing apparatus 1 that is provided with the light source 11 having a first output of power and a processing apparatus 17 that is provided with a light source 11 having a second output of power that is different from the first output of power (typically, an output of power that is larger than the first output of power). The light source 11 of the processing apparatus 1 may supply, as the processing light EL, a pulsed light having a first emitting time (typically, a pico-second, a femto-second) and the light source of the processing apparatus 17 may supply, as the processing light EL, a pulsed light having a second emitting time (typically, a nano-second) that is longer than the first emitting time. However, the light source of the processing apparatus 17 may supply, as the processing light EL, a pulsed light having an emitting time that is comparable with the first emitting time.

In FIG. 52, the processing apparatus 17 irradiates the workpiece W with the processing light EL to perform the removal processing for removing a part of the workpiece W. Here, since the second output of power of the light source of the processing apparatus 17 is larger than the first output of power of the light source 11 of the processing apparatus 1, it is possible to perform the removal processing on the workpiece W with a high throughput.

Note that a driving system 171 moves the processing apparatus 17 along at least one of the X axis direction, the Y axis direction, the Z axis direction, the θX direction, the θY direction and the θZ direction under the control of the control apparatus 7, in FIG. 52. A position measurement device 1711 is configured to measure a position of the processing apparatus 17 that is moved by the driving system 171.

The measurement apparatus 2 measures the workpiece W processed by the processing apparatus 17. The measurement apparatus 2 may measure a shape (a three-dimensional shape) of a processed part of the workpiece W processed by the processing apparatus 17.

The processing apparatus 1 performs an additional processing, on the basis of the measured result of the shape of the processed part of the workpiece W measured by the measurement apparatus 2, so that the processed part has a target shape. Thus, the high accurate processing is realized with a high throughput by using the plurality of types of processing apparatuses 1 and 17.

(4-7) Seventh Modified Example

In the above described description, the light receiving apparatus 9d that is configured to detect the processing light EL detects, by the detector 92d, the processing light EL that passes through the aperture 93d formed at the light shielding member 91d. However, the light receiving apparatus 9d may detect, by the detector, the processing light EL through a light transmissive substrate on a part of an upper surface of which a light shielding film is formed.

Next, with reference to FIG. 53A, FIG. 53B and FIG. 54, a light receiving apparatus 9f will be described. FIG. 53A is a planar view that illustrates an arrangement of the light receiving apparatus 9f and FIG. 53B is a cross-sectional view that illustrates a structure of the light receiving apparatus 9f. FIG. 54 is a planar view that illustrates a pattern formed at the light shielding film.

As illustrated in FIG. 53A, the light receiving apparatus 9f is disposed at the stage 32. The light receiving apparatus 9f is disposed at a position that is away from the placement surface 321 of the stage 32 on which the workpiece W is placed in at least one of the X axis direction and the Y axis direction.

As illustrated in FIG. 53B, the light receiving apparatus 9f is provided with a light transmissive substrate 91f1, a light shielding film 91f2 that is formed on a part of the upper surface of the light transmissive substrate 91f1 and a detector 92f.

The light shielding film 91f2 is a member which is configured to shield the processing light EL. A height of the surface (the upper surface of the light transmissive substrate 91f1) on which the light shielding film 91f2 is formed is same as that of the surface (for example, the outer circumference surface 322) of the stage 32, however, they may be different from each other.

An aperture 93f is formed at the light shielding film 91f2. The light shielding film 91f2 is irradiated with a part of the processing light EL that is emitted toward the aperture 93f and a vicinity of the aperture 93f and the aperture 93f is irradiated with another part of that processing light EL. The processing light EL with which the aperture 93f is irradiated is optically received by the detector 92f after passing through the aperture 93f.

(4-8) Eighth Modified Example

In the second supply aspect of the gas by the gas supply apparatus 8a illustrated in FIG. 35, the processing is performed in the housing space SP in which the processing apparatus 1 and the measurement apparatus 2 are housed. However, as illustrated in FIG. 54, a housing space SP1 in which the processing apparatus 1 and the measurement apparatus 2 are housed may be separated from a space SP2 in which the processing is performed. A processing system SYSg illustrated in FIG. 54 is provided with a separator 8g for separating the housing space SP1 from the space SP2. At least a part of the gas supply apparatus 8a is disposed in the space SP2. Here, a part of at least a gas supply port of the gas supply apparatus 8a may be disposed in the space SP2.

The gas supply apparatus 8a may supply the gas along the direction intersecting with the propagating direction of the processing light EL propagating from the processing apparatus 1 to the workpiece W (in an example illustrated in FIG. 54, the Y axis direction) to form a laminar flow near the processing apparatus 1 in the space SP2. Namely, the separator 8g may be one of a device that forms the laminar flow.

(4-9) Ninth Modified Example

In the above illustrated example, the gas supply apparatus 8a supplies the gas to whole of the housing space SP in the housing 4 and the collection apparatus 8b collects the gas and the like from whole of the housing space SP in the housing 4. However, as illustrated in FIG. 55, the gas supply apparatus 8a may supply the gas to a space near the workpiece W (near the optical path of the processing light EL) in the housing space SP and the collection apparatus 8b may collect the gas and the like from a space near the workpiece W (near the optical path of the processing light EL) in the housing space SP. In FIG. 55, the gas supply apparatus 8a is provided with a gas supply port 8a1. A position of the gas supply port 8a1 may be changeable. Moreover, the collection apparatus 8b is provided with a collection port 8b1. A position of the collection port 8b1 may be changeable. Here, the position of the gas supply port 8a1 and the position of the collection port 8b1 may be set to form a laminar flow that flows in a direction intersecting with the optical path of the processing light in a space near the workpiece W (near the optical path of the processing light EL) in the housing space SP. Note that the positions of the gas supply port 8a1 and the collection port 8b1 may be changeable not only in the Z axis direction but also the XY axis direction.

(4-10) Other Modified Example

In the above described description, the processing apparatus 1 performs the removal processing or the additive processing by irradiating the workpiece W with the processing light EL. However, the processing apparatus 1 may perform a processing that is different from the removal processing and the additive processing by irradiating the workpiece W with the processing light EL. The processing apparatus 1 may perform the processing that is different from the removal processing or the additive processing in addition to or instead of at least one of the removal processing and the additive processing. For example, the processing apparatus 1 may perform the marking processing for forming a desired pattern (for example, a character pattern, a diagram pattern or any pattern) on the surface of the workpiece W by changing a characteristic of at least a part of the surface of the workpiece W by the irradiation of the processing light EL.

When the processing apparatus 1 performs the marking processing, the operation for determining whether or not the processed amount by the processing apparatus 1 is the appropriate amount (the step S133 in FIG. 6) may include an operation for determining whether or not a characteristic of a pattern formed by the processing apparatus 1 is appropriate. A reflectance of the pattern to the light, a color of the pattern and a shape of the pattern is one example of the characteristic of the pattern.

In the above described description, the stage apparatus 3 is provided with the stage driving system 33, however, may not be provided with the stage driving system 33. Namely, the stage 32 may not move. When the stage 32 does not move, the stage apparatus 3 may not be provided with the position measurement device 34. In the above described description, the processing system SYS is provided with the driving system 5, however, may not be provided with the driving system 5. Namely, the processing apparatus 1 may not move. When the processing apparatus 1 does not move, the processing system SYS may not be provided with the position measurement device 51. In the above described description, the processing system SYS is provided with the driving system 6, however, may not be provided with the driving system 6. Namely, the measurement apparatus 2 may not move. When the measurement apparatus 2 does not move, the processing system SYS may not be provided with the position measurement device 61.

In the above described description, the processing apparatus 1 is provided with the retuned light prevention apparatus 15, however, may not be provided with the retuned light prevention apparatus 15. In the above described description, the processing apparatus 1 is provided with the observation apparatus 16, however, may not be provided with the observation apparatus 16. When the processing apparatus 1 is not provided with the observation apparatus 16, the processing apparatus 1 may not be provided with the dichroic mirror 13 that is an optical element used to partially overlap the optical path of the processing light EL and the optical path of the illumination light IL.

In the above described description, the processing apparatus 1 processes the workpiece W by irradiating the workpiece W with the processing light EL. However, the processing apparatus 1 may process the workpiece W by irradiating the workpiece W with any energy beam that is different from the light. In this case, the processing apparatus 1 may be provided with a beam irradiation apparatus that is configured to emit any energy beam in addition to or instead of the light source 11. Any energy beam may include a charged particle beam such as an electron beam and an ion beam or an electromagnetic wave, although it is not limited.

(5) ADDITIONAL STATEMENT

Regarding the above described embodiment, below described additional statements are further disclosed.

A processing system according to an item 1 is a processing system that is provided with:
  a processing apparatus that processes an object; and
  a measurement apparatus that performs a measurement operation relating to a processing by the processing apparatus.

A processing system according to an item 2 is the processing system according to the item 1, wherein
  the processing system is further provided with an object placing apparatus on which the object is placed.

A processing system according to an item 3 is the processing system according to the item 2, wherein
  the processing apparatus processes the object placed on the object placing apparatus,
  the measurement apparatus performs the measurement operation on the object placed on the object placing apparatus, A processing system according to an item 4 is the processing system according to the item 2 or 3, wherein
  the object placing apparatus is movable between a processing performed position at which the processing by the processing apparatus is performed and a measurement performed position at which the measurement operation by the measurement apparatus is performed.

A processing system according to an item 5 is the processing system according to the item 4, wherein
  the object placing apparatus moves to be located at the processing performed position in at least a part of a processing period when the processing apparatus processes the object and to be located at the measurement performed position in at least a part of a measurement period when the measurement apparatus performs the measurement operation.

A processing system according to an item 6 is the processing system according to the item 4 or 5, wherein
  the object placing apparatus is movable between the processing performed position and the measurement performed position while the object remains being placed thereon.

A processing system according to an item 7 is the processing system according to any one of the items 2 to 6, wherein
  the object placing apparatus is configured to hold the object,
  a holding aspect of the object placing apparatus that holds the object in at least a part of a processing period when the processing apparatus processes the object is same as a holding aspect of the object placing apparatus that holds the object in at least a part of a measurement period when the measurement apparatus performs the measurement operation.

A processing system according to an item 8 is the processing system according to the item 7, wherein
  the holding aspect includes a force for holding the object.

A processing system according to an item 9 is the processing system according to any one of the items 1 to 8, wherein
  the processing system is provided with a housing apparatus that is configured to house at least a part of the processing apparatus, at least a part of the measurement apparatus and the object in a housing space.

A processing system according to an item 10 is the processing system according to the item 9, wherein
  the housing apparatus houses the object in the housing space in both of at least a part of a processing period when the processing apparatus processes the object and in at least a part of a measurement period when the measurement apparatus performs the measurement operation.

A processing system according to an item 11 is the processing system according to any one of the items 1 to 10, wherein
  the processing apparatus processes the object on the basis of a measured result of the measurement apparatus.

A processing system according to an item 12 is the processing system according to any one of the items 1 to 11, wherein
  the processing system alternately repeats the measurement operation by the measurement apparatus and the processing of the object by the processing apparatus.

A processing system according to an item 13 is the processing system according to any one of the items 1 to 12, wherein
  the processing system determines, on the basis of a measured result of the measurement apparatus, a processing target area of the object that should be processed by the processing apparatus.

A processing system according to an item 14 is the processing system according to any one of the items 1 to 13, wherein
  the processing system determines, on the basis of a measured result of the measurement apparatus, a processing condition of the processing apparatus.

A processing system according to an item 15 is the processing system according to any one of the items 1 to 14, wherein
  the measurement apparatus measures the object every time the processing apparatus processes the object,
  the processing system changes, on the basis of a measured result of the measurement apparatus, a processing condition of the processing apparatus when the processing apparatus processes the object next.

A processing system according to an item 16 is the processing system according to any one of the items 1 to 15, wherein
  the measurement apparatus performs the measurement operation to measure a state of the object.

A processing system according to an item 17 is the processing system according to item 16, wherein
  the state of the object includes at least one of a position, a shape and a size of the object.

A processing system according to an item 18 is the processing system according to item 16 or 17, wherein
  the measurement apparatus measures the state of one part of the object and then the measurement apparatus measures the state of another part of the object that is different from the one part.

A processing system according to an item 19 is the processing system according to item, wherein
  the one part and the another part are adjacent to each other without being overlapped with each other.

A processing system according to an item 20 is the processing system according to item 18, wherein
  the one part and the another part are adjacent to each other with being partially overlapped with each other.

A processing system according to an item 21 is the processing system according to any one of the items 1 to 20, wherein
  the processing apparatus processes the object by irradiating the object with an energy beam.

A processing system according to an item 22 is the processing system according to item 21, wherein
  the energy beam includes a pulsed light that is pulse-emitted at an emitting time that is equal to or shorter than femto-second.

A processing system according to an item 23 is the processing system according to any one of the items 1 to 22, wherein
  the measurement apparatus includes a first measurement apparatus and a second measurement apparatus.

A processing system according to an item 24 is the processing system according to item 23, wherein
  a measurement resolution of the first measurement apparatus is different from a measurement resolution of the second measurement apparatus.

A processing system according to an item 25 is the processing system according to item 23 or 24, wherein
  a measurement range of the first measurement apparatus is different from a measurement range of the second measurement apparatus.

A processing system according to an item 26 is the processing system according to any one of the items 1 to 25, wherein
  the measurement apparatus performs the measurement operation to measure a position of a measurement target object, the measurement apparatus corrects a measured result of the position of the measurement target object on the basis of accuracy information relating to an accuracy of the measured result of the position of the measurement target object.

A processing system according to an item 27 is the processing system according to item 26, wherein
the accuracy information includes information relating to a position of a predetermined fiducial surface.

A processing system according to an item 28 is the processing system according to item 27, wherein
the measurement apparatus performs the measurement operation to measure positions of the fiducial surface and the measurement target object,
the measurement apparatus corrects the measured result of the position of the measurement target object on the basis of the accuracy information including information relating to the measured result of the position of the fiducial surface.

A processing system according to an item 29 is the processing system according to item 27 or 28, wherein
the processing system further comprising an object placing apparatus that includes a placement surface on which the object is placed and the fiducial surface.

A processing system according to an item 30 is the processing system according to any one of the items 27 to 29, wherein
the processing system further comprises an object apparatus on which the object is placed and a fiducial member including the fiducial surface.

A processing system according to an item 31 is the processing system according to any one of the items 27 to 30, wherein
the measurement apparatus corrects the measured result of the position in one direction of the measurement target object on the basis of the accuracy information including information relating to the measured result of the position in the one direction of the fiducial surface.

A processing system according to an item 32 is the processing system according to any one of the items 26 to 31, wherein
the accuracy information includes information relating to an accuracy of the measured result of the position in one direction of the measurement target object,
the measurement apparatus corrects the measured result of the position in the one direction of the measurement target object on the basis of the accuracy information.

A processing system according to an item 33 is the processing system according to item 31 or 32, wherein
the one direction includes a gravity direction.

A processing system according to an item 34 is the processing system according to any one of the items 26 to 33, wherein
the accuracy information includes information relating to a temperature of the measurement apparatus.

A processing system according to an item 35 is the processing system according to any one of the items 26 to 34, wherein
the measurement target object includes the object.

A processing system according to an item 36 is the processing system according to any one of the items 1 to 35, wherein
the processing system generates first position information relating a relative position of the processing apparatus and the measurement apparatus and processes the object on the basis of the first position information.

A processing system according to an item 37 is the processing system according to item 36, wherein
the processing system generates the first position information by using a predetermined marker.

A processing system according to an item 38 is the processing system according to item 37, wherein
the processing system generates the first position information by determining a relative position of the marker and the processing apparatus by using the maker and determining a relative position of the marker and the measurement apparatus by using the maker and then determining the relative position of the processing apparatus and the measurement apparatus on the basis of the relative position of the marker and the processing apparatus and the relative position of the marker and the measurement apparatus.

A processing system according to an item 39 is the processing system according to item 37 or 38, wherein
the processing apparatus further comprises a position measurement apparatus that measures a relative position of the processing apparatus and the marker,
the processing system generates the first position information on the basis of a measured result of the first position measurement apparatus.

A processing system according to an item 40 is the processing system according to item 39, wherein
the position measurement apparatus measures the relative position of the processing apparatus and the marker by imaging the marker.

A processing system according to an item 41 is the processing system according to item 39 or 40, wherein
the processing apparatus processes the object by irradiating a surface of the object with an energy beam.
the position measurement apparatus measures the relative position of the processing apparatus and the marker by detecting a beam through the marker that is irradiated with the energy beam.

A processing system according to an item 42 is the processing system according to any one of the items 39 to 41, wherein
the marker includes an aperture formed at a predetermined surface,
the position measurement apparatus measures the relative position of the processing apparatus and the marker by detecting a state of the energy beam through the aperture.

A processing system according to an item 43 is the processing system according to any one of the items 37 to 42, wherein
the measurement apparatus measures a relative position of the measurement apparatus and the marker,
the processing system generates the first position information on the basis of a measured result of the measurement apparatus.

A processing system according to an item 44 is the processing system according to any one of the items 37 to 43, wherein
the marker is formed at at least a part of the object.

A processing system according to an item 45 is the processing system according to any one of the items 37 to 44, wherein
the marker includes a structural object formed at the object by the processing of the processing apparatus.

A processing system according to an item 46 is the processing system according to any one of the items 37 to 45, wherein the marker includes an aperture formed at a predetermined surface.

A processing system according to an item 47 is the processing system according to any one of the items 37 to 46, wherein
the processing system further comprising an object placing apparatus that includes a placement surface on which the object is placed and a marker forming surface at which the marker is formed.

A processing system according to an item 48 is the processing system according to any one of the items 37 to 47, wherein
the processing system further comprising an object placing apparatus t on which the object is placed and a marker member at which the marker is formed.

A processing system according to an item 49 is the processing system according to any one of the items 36 to 48, wherein
the first position information includes information relating to the relative position of the processing apparatus and the measurement apparatus in at least one of a first direction and a second direction that intersects with the first direction.

A processing system according to an item 50 is the processing system according to any one of the items 1 to 49, wherein
the processing system further comprising an object placing apparatus t on which the object is placed
the processing system generates second position information relating a relative position of the object placing apparatus and at least one of the processing apparatus and the measurement apparatus and processes the object on the basis of the second position information.

A processing system according to an item 51 is the processing system according to item 50, wherein
the processing system generates the second position information by using a predetermined fiducial member.

A processing system according to an item 52 is the processing system according to item 51, wherein
the fiducial member is placed on the object placing apparatus.

A processing system according to an item 53 is the processing system according to item 51 or 52, wherein
the fiducial member is formed at the object placing apparatus.

A processing system according to an item 54 is the processing system according to any one of the items 51 to 53, wherein
the fiducial member includes a structural object formed at the object by the processing of the processing apparatus.

A processing system according to an item 55 is the processing system according to any one of the items 51 to 54, wherein
the fiducial member includes a pattern member having a surface, which is along a placement surface of the object placing apparatus on which the object is placed, on which a predetermined pattern is formed.

A processing system according to an item 56 is the processing system according to any one of the items 51 to 55, wherein
the fiducial member includes a plurality of step members having different sizes, respectively, in at least one of a direction along a placement surface of the object placing apparatus on which the object is placed and a direction that intersects with the placement surface.

A processing system according to an item 57 is the processing system according to any one of the items 52 to 56, wherein
the measurement apparatus measures a state of the fiducial member,
the processing system generates the second position information on the basis of the measured result of the measurement apparatus.

A processing system according to an item 58 is the processing system according to any one of the items 52 to 57, wherein
the processing apparatus further comprises a position measurement apparatus that measures a state of the fiducial member,
the processing system generates the second position information on the basis of a measured result of the first position measurement apparatus.

A processing system according to an item 59 is the processing system according to any one of the items 50 to 58, wherein
the second position information includes information relating to the relative position of the object placing apparatus and at least one of the processing apparatus and the measurement apparatus in at least one of a first rotational direction around an axis along a first direction and a second rotational direction around an axis along a second direction that intersects with the first direction.

A processing system according to an item 60 is the processing system according to any one of the items 1 to 59, wherein
the processing system further comprises an adherence prevention apparatus that prevents a substance generated by the processing of the object from being adhered to a specific part that is at least a part of the measurement apparatus.

A processing system according to an item 61 is the processing system according to item 60, wherein
the specific part includes a part that causes a deterioration of a measurement accuracy when the substance is adhered thereto.

A processing system according to an item 62 is the processing system according to item 60 or 61, wherein
the specific part includes an optical surface of an optical system of the measurement apparatus.

A processing system according to an item 63 is the processing system according to any one of the items 60 to 62, wherein
the adherence prevention apparatus includes a gas supply apparatus that supplies gas.

A processing system according to an item 64 is the processing system according to item 63, wherein
the gas supply apparatus supplies the gas to prevent the substance from entering a space between the specific part and the object.

A processing system according to an item 65 is the processing system according to item 63 or 64, wherein
the gas supply apparatus supplies the gas to prevent the substance from entering the specific part.

A processing system according to an item 66 is the processing system according to any one of the items 63 to 65, wherein
the gas supply apparatus supplies the gas to blow off the substance adhered to the specific part.

A processing system according to an item 67 is the processing system according to any one of the items 60 to 66, wherein the adherence prevention apparatus includes a containing apparatus that contains the specific part in an inner space.

A processing system according to an item 68 is the processing system according to item 67, wherein
the containing apparatus has a wall part that separate a space in which the object is generated from the inner space.

A processing system according to an item 69 is the processing system according to item 67 or 68, wherein
the measurement apparatus performs the measurement operation by emitting a measurement light by using the specific part,
the containing apparatus includes a passing part through which the measurement light is allowed to pass.

A processing system according to an item 70 is the processing system according to item 69, wherein
the adherence prevention apparatus prevents the substance from entering a space between the passing part and the object.

A processing system according to an item 71 is the processing system according to item 69 or 70, wherein
the adherence prevention apparatus supplies gas to prevent the substance from entering a space between the passing part and the object.

A processing system according to an item 72 is the processing system according to any one of items 69 to 71, wherein
the adherence prevention apparatus removes the substance adhered to the passing part.

A processing system according to an item 73 is the processing system according to item 72, wherein
the adherence prevention apparatus removes the substance by blowing gas to the passing part and/or vibrating the passing part.

A processing system according to an item 74 is the processing system according to item 72 or 73, wherein
the adherence prevention apparatus determines whether or not the substance is adhered to the passing part on the basis of a light that is generated when the substance adhered to the passing part is irradiated with the measurement light and removes the substance when it is determined that the substance is adhered to the passing part.

A processing system according to an item 75 is the processing system according to any one of items 1 to 74, wherein
the processing system further comprising a suction apparatus that sucks a substance generated by the processing of the object.

A processing system according to an item 76 is the processing system according to any one of items 1 to 75, wherein
the processing apparatus processes the object by irradiating a surface of the object with an energy beam while changing an energy amount of the energy beam per unit area on the surface of the object,
the measurement apparatus performs the measurement operation to measure a state of the object processed by the processing apparatus,
the processing system determines a processing condition of the processing apparatus on the basis of a measured result of the measurement apparatus.

A processing system according to an item 77 is the processing system according to item 76, wherein
the processing apparatus processing the object by emitting the energy beam so that a total energy amount added to the object from the energy beam does not change before and after the change of the energy amount of the energy beam per unit area.

A processing system according to an item 78 is the processing system according to item 76 or 77, wherein
the processing apparatus changes the energy amount of the energy beam per unit area on the surface of the object by changing a relative position of the surface of the object and a light concentration position at which the energy beam is concentrated in a direction that intersects with the surface of the object.

A processing system according to an item 79 is the processing system according to item 78, wherein
the processing apparatus changes the energy amount of the energy beam per unit area on the surface of the object by changing the relative position of the surface of the object and the light concentration position while fixing a characteristic of the energy beam other than the light concentration position.

A processing system according to an item 80 is the processing system according to item 78 or 79, wherein
the processing apparatus changes the relative position of the surface of the object and the light concentration position in a state where the light concentration position is more distant from the processing apparatus than the surface of the object.

A processing system according to an item 81 is the processing system according to any one of items 76 to 80, wherein
the processing system determines the processing condition of the processing apparatus so that a processed amount of the object per unit energy by the processing apparatus is maximum.

A processing system according to an item 82 is the processing system according to any one of items 76 to 81, wherein
the state of the object includes a processed amount of the object by the processing apparatus.

A processing system according to an item 83 is the processing system according to any one of items 76 to 82, wherein
the processing condition includes the energy amount of the energy beam per unit area on the surface of the object.

A processing system according to an item 84 is the processing system according to any one of items 76 to 83, wherein
the processing condition includes the energy amount of the energy beam per unit area on the surface of the object, a beam diameter of the energy beam on the surface of the object and a total energy amount added to the object from the energy beam.

A processing system according to an item 85 is the processing system according to item 84, wherein
the processing system determines the energy amount of the energy beam per unit area on the surface of the object on the basis of the measured result of the measurement apparatus, determines the beam diameter on the basis of a processing aspect and determines the total energy amount added to the object from the energy beam so that the energy amount of the energy beam, which has the determined beam diameter, per unit area on the surface of the object is the determined energy amount.

A processing system according to an item 86 is the processing system according to any one of items 1 to 85, wherein the processing apparatus processes the object by irradiating a surface of the object with an energy beam,
the processing system further comprises:
an object placing apparatus that includes a placement surface on which the object is placed and an aperture formed surface at which an aperture is formed; and
a beam detection apparatus that detects a state of the energy beam through the aperture,
the processing apparatus changes a characteristic of the energy beam on the basis of a detected result of the beam detection apparatus.

A processing system according to an item 87 is a processing system that comprises:
an object placing apparatus that includes a placement surface on which an object is placed and an aperture formed surface at which an aperture is formed;
a processing apparatus that processes the object by irradiating a surface of the object with an energy beam; and
a beam detection apparatus that detects a state of the energy beam through the aperture,
the processing apparatus changes a characteristic of the energy beam on the basis of a detected result of the beam detection apparatus.

A processing system according to an item 88 is the processing system according to item 86 or 87, wherein
the placement surface and the aperture formed surface faces toward same direction.

A processing system according to an item 89 is the processing system according to any one of items 86 to 88, wherein
the object is not placed on the aperture formed surface.

A processing system according to an item 90 is the processing system according to any one of items 86 to 89, wherein
the processing apparatus emits the energy beam so that the energy beam crosses the aperture.

A processing system according to an item 91 is the processing system according to any one of items 1 to 90, wherein
the processing apparatus processes the object by irradiating a surface of the object with an energy beam,
the processing system further comprises a beam detection apparatus that detects a state of the energy beam through an aperture that is formed at a predetermined surface,
the processing apparatus emits the energy beam so that the energy beam courses the aperture and changes a characteristic of the energy beam on the basis of a detected result of the beam detection apparatus.

A processing system according to an item 92 is a processing system that comprises:
a processing apparatus that processes an object by irradiating a surface of the object with an energy beam; and
a beam detection apparatus that detects a state of the energy beam through an aperture that is formed at a predetermined surface,
the processing apparatus emits the energy beam so that the energy beam courses the aperture and changes a characteristic of the energy beam on the basis of a detected result of the beam detection apparatus.

A processing system according to an item 93 is the processing system according to any one of items 90 to 92, wherein
the processing apparatus deflects the energy beam so that the energy beam crosses the aperture.

A processing system according to an item 94 is the processing system according to item 93, wherein
the processing apparatus irradiates the aperture with the energy beam by deflecting the energy beam in at least a part of a period when a relative position of the processing apparatus and the aperture is fixed.

A processing system according to an item 95 is the processing system according to any one of items 86 to 94, wherein
the aperture includes a first aperture that extends in a first extending direction that is along the surface of the object and a second aperture that extends in a second extending direction that is along the surface of the object and that intersects with the first extending direction.

A processing system according to an item 96 is the processing system according to any one of items 86 to 95, wherein
the processing apparatus irradiates the aperture with the energy beam by deflecting the energy beam,
the beam detection apparatus detects states of a plurality of energy beams deflected amounts of which are different from each other,
the processing apparatus changes the state of the energy beam on the basis of the detected result of the beam detection apparatus in at least a part of a processing period when the processing apparatus processes the object.

A processing system according to an item 97 is a processing system that comprises:
a processing apparatus that processes an object by irradiating a surface of the object with an energy beam while deflecting the energy beam; the aperture with the energy beam by deflecting the energy beam; and
a beam detection apparatus that detects states of a plurality of energy beams deflected amounts of which are different from each other,
the processing apparatus changes a characteristic of the energy beam on the basis of the detected result of the beam detection apparatus in at least a part of a processing period when the processing apparatus processes the object.

A processing system according to an item 98 is the processing system according to item 96 or 97, wherein
the beam detection apparatus detects the state of the energy beam the deflected amount of which is a first amount and the state of the energy beam the deflected amount of which is a second amount that is different from the first amount,
the processing apparatus changes the state of the energy beam on the basis of the detected result of the stage of the energy beam the deflected amount of which is the first amount at a timing when the energy beam the deflected amount of which is the first amount is emitted in the processing period and changes the state of the energy beam on the basis of the detected result of the stage of the energy beam the deflected amount of which is the second amount at a timing when the energy beam the deflected amount of which is the second amount is emitted in the processing period A processing system according to an item 99 is the processing system according to any one of items 96 to 98, wherein
the beam detection apparatus detects the states of the plurality of energy beams deflected amounts of which are different from each other by changing a relative position of the processing apparatus and the beam detection apparatus in a direction that intersects with a propagating direction of the energy beam.

A processing system according to an item 100 is the processing system according to any one of items 96 to 99, wherein
  the stage of the energy beam includes a light concentration position at which the energy beam is concentrate.

A processing system according to an item 101 is the processing system according to item 100, wherein
  the processing apparatus changes the light concentration position to a desired position that is determined on the basis of the detected result of the beam detection apparatus.

A processing system according to an item 102 is the processing system according to item 100 or 101, wherein
  the beam detection apparatus detects states of a plurality of energy beams the light concentration positions of which are different from each other,
  the processing apparatus changes the light concentration position to a desired position that is determined on the basis of the detected result of the states of the plurality of energy beams by the beam detection apparatus.

A processing system according to an item 103 is the processing system according to any one of items 96 to 100, wherein
  the state of the energy beam includes an intensity of the energy beam per unit area.

A processing system according to an item 104 is the processing system according to item 103, wherein
  the processing apparatus changes the intensity to a desired intensity that is determined on the basis of the detected result of the beam detection apparatus.

A processing system according to an item 105 is the processing system according to any one of items 86 to 104, wherein
  an energy amount of the energy beam per unit area on a detection surface of the beam detection apparatus in a period when the beam detection apparatus detects the state of the energy beam is smaller than an energy amount of the energy beam per unit area on the surface of the object in a processing period when the processing apparatus processes the object.

A processing system according to an item 106 is the processing system according to item 105, wherein
  the processing system comprises an attenuate apparatus that attenuates the energy beam on a path of the energy beam between the processing apparatus and the beam detection apparatus.

A processing system according to an item 107 is the processing system according to item 106, wherein
  the processing apparatus has a beam source that generates the energy beam,
  the beam source generates, in a period when the beam detection apparatus detects the state of the energy beam, the energy beam having the energy amount per unit area on an optical plane intersecting with a propagating direction of the energy beam is equal to that in the processing period when the object is processed.

A processing system according to an item 108 is the processing system according to item 105, wherein
  the processing apparatus has a beam source that generates the energy beam,
  the beam source generates, in a period when the beam detection apparatus detects the state of the energy beam, the energy beam having the energy amount per unit area on an optical plane intersecting with a propagating direction of the energy beam is smaller than that in the processing period when the object is processed.

A processing system according to an item 109 is the processing system according to any one of items 1 to 108, wherein
  the processing apparatus processes the object by irradiating a surface of the object with an energy beam while deflecting the energy beam,
  the processing system further comprises a measurement apparatus that performs a measurement operation for measuring a state of the object processed by the processing apparatus,
  the processing apparatus changes a state of the energy beam on the basis of a measured result of the measurement apparatus.

A processing system according to an item 110 is the processing system according to item 109, wherein
  the measurement apparatus measures a variation of the state of the object in a direction that intersects with the surface of the object,
  the processing apparatus changes the state of the energy beam on the basis of the measured result of the measurement apparatus to reduce the variation in the processing period.

A processing system according to an item 111 is the processing system according to item 109 or 110, wherein
  the state of the object includes a processed amount of the object by the processing apparatus.

A processing system according to an item 112 is the processing system according to any one of items 1 to 111, wherein
  the processing apparatus processes the object by sweeping a surface of the object with an energy beam,
  the processing system further comprises a sweep position correct apparatus that corrects a sweeping position of the energy beam in at least a part of a processing period when the processing apparatus processes the object on the basis of a sweeping position information relating to a sweeping position of the energy beam.

A processing system according to an item 113 is a processing system that comprises:
  a processing apparatus that processes an object by sweeping a surface of the object with an energy beam; and
  a sweep position correct apparatus that corrects a sweeping position of the energy beam in at least a part of a processing period when the processing apparatus processes the object on the basis of a sweeping position information relating to a sweeping position of the energy beam.

A processing system according to an item 114 is the processing system according to item 112 or 113, wherein
  the sweeping position information is generated on the basis of a state of the object that is already processed by the processing apparatus.

A processing system according to an item 115 is the processing system according to item 114, wherein
  the processing system further comprises a measurement apparatus that measures the state of the object processed by the processing apparatus.

A processing system according to an item 116 is the processing system according to item 115, wherein
  the sweeping position correct apparatus generates the sweeping position information on the basis of a measured result of the measurement apparatus.

A processing system according to an item 117 is the processing system according to any one of items 112 to 116, wherein
  the sweeping position information is generated on the basis of a measured result of the sweeping position of the energy beam in at least a part of a period when the surface of the object is swept with the energy beam.

A processing system according to an item 118 is the processing system according to any one of items 112 to 117, wherein
the sweeping position information is generated on the basis of a measured result of the sweeping position of the energy beam in each of a plurality of areas positions of which are different from each other in a direction along the surface of the object.

A processing system according to an item 119 is the processing system according to item 117 or 118, wherein
the processing system further comprises a sweeping position detection apparatus that detects the sweeping position of the energy beam.

A processing system according to an item 120 is the processing system according to item 119, wherein
the sweeping position correct apparatus generates the sweeping position information on the basis of a detected result of the sweeping position detection apparatus.

A processing system according to an item 121 is the processing system according to item 119 or 120, wherein
the processing system comprises a plurality of sweeping position detection apparatuses.

A processing system according to an item 122 is the processing system according to any one of items 119 to 121, wherein
the processing system comprises an object placing apparatus on which the object is placed,
the sweeping position detection apparatus is placed at the object placing apparatus.

A processing system according to an item 123 is the processing system according to item 122, wherein
the object placing apparatus includes a placement surface on which the object is placed and apparatus placing surface at which the sweeping position detection apparatus is placed.

A processing system according to an item 124 is the processing system according to any one of items 119 to 123, wherein
the processing apparatus sweeps, in a period when the sweeping position detection apparatus detects the sweeping position of the energy beam, the surface of the object with the energy beam having the energy amount per unit area on an optical plane intersecting with a propagating direction of the energy beam is smaller than that in a period when the object is processed.

A processing system according to an item 125 is the processing system according to any one of items 112 to 124, wherein
the sweeping position information is generated on the basis of a temperature of the processing apparatus.

A processing system according to an item 126 is the processing system according to item 125, wherein
the sweeping position information is generated on the basis of a temperature of a sweep apparatus of the processing apparatus that performs the sweeping by the energy beam.

A processing system according to an item 127 is the processing system according to any one of items 112 to 126, wherein
the sweeping position change apparatus corrects the sweeping position of the energy beam in at least one of one direction that is long the surface of the object and another direction that is along the surface of the object and that intersects with the one direction.

A processing system according to an item 128 is the processing system according to any one of items 1 to 127, wherein
the processing apparatus processes the object by irradiating the object with an energy beam emitted from a beam source through an optical system,
the processing system further comprises a returned beam prevention app A processing system according to an item 129 is the processing system according to any one of items 1 to 128, wherein
the processing apparatus processes the object by irradiating the object with an energy beam through an optical system,
the processing system further comprises an observation apparatus that observes the object through the optical system.

A processing system according to an item 130 is the processing system according to any one of items 1 to 129, wherein
the processing apparatus performs at least one of a removal processing for reducing at least a part of the object, a connect processing for connecting the object and another object, an additive processing for adding a material to the object and a marking processing for making a mark at an object.

At least a part of the features of each embodiment described above may be appropriately combined with at least another part of the features of each embodiment described above. A part of the features of each embodiment described above may not be used. Moreover, the disclosures of all publications and United States patents that are cited in each embodiment described above are incorporated in the disclosures of the present application by reference if it is legally permitted.

The present invention is not limited to the above described examples and is allowed to be changed, if desired, without departing from the essence or spirit of the invention which can be read from the claims and the entire specification. A processing system and a processing method, which involve such changes, are also intended to be within the technical scope of the present invention.

DESCRIPTION OF REFERENCE CODES

SYS processing system
1 processing apparatus
11 light source
12 optical system
121 beam expander
122 focus lens
13 dichroic mirror
14 optical system
141 Galvano mirror
142 fθ lens
15 returned light prevention apparatus
16 observation apparatus
2, 21-1, 21-2 measurement apparatus
3 stage apparatus
31 stage
4 housing
7 control apparatus
W workpiece
EL processing light

The invention claimed is:

1. A processing system comprising:
an irradiation optical system that irradiates an object with an energy beam from a light source;
an object placing apparatus on which the object is placed;
a light receiving apparatus that is disposed at the object placing apparatus and that optically receives the energy beam from the irradiation optical system;
a movement apparatus that moves the object placing apparatus along each of a first direction and a second direction intersecting the first direction;
a measurement apparatus that measures at least one of the light receiving apparatus and a reference part the moves with the light receiving apparatus when the light receiving apparatus is moved by the movement apparatus moving the object placing apparatus; and
a control apparatus that controls at least the movement apparatus,
wherein
the control apparatus:
controls the movement apparatus to move the object placing apparatus to a position at which the light receiving apparatus is allowed to optically receive the energy beam from the irradiation optical system and move the object placing apparatus to a position at which the measurement apparatus is allowed to measure the at least one of the light receiving apparatus and the reference part;
controls the irradiation optical system to irradiate the at least one of the light receiving apparatus and the reference part with the energy beam while controlling the movement apparatus to move the object placing apparatus along the first direction;
controls the irradiation optical system to irradiate the at least one of the light receiving apparatus and the reference part with the energy beam while controlling the movement apparatus to move the object placing apparatus along the second direction; and
controls at least one of the position of the object placing apparatus at a time of the irradiation by the irradiation optical system and the position of the object placing apparatus at a time of the measurement by the measurement apparatus by using (a) first information relating to the position of the object placing apparatus when the light receiving apparatus optically receives the energy beam that is acquired as a result of the energy beam being irradiated onto the light receiving apparatus while moving the object placing apparatus along each of the first and second directions, and (b) second information relating to the position of the object placing apparatus when the measurement apparatus measures the at least one of the light receiving apparatus and the reference part.

2. The processing system according to claim 1, wherein the object is processed by the energy beam from the irradiation optical system.

3. The processing system according to claim 1, wherein the measurement apparatus measures the object.

4. The processing system according to claim 3, wherein a shape of the object is measurable by using the measurement apparatus.

5. The processing system according to claim 3, wherein the control apparatus controls the movement apparatus to allow the measurement apparatus to measure an irradiation position on the object that is irradiated with the energy beam.

6. The processing system according to claim 3, wherein the control apparatus controls the movement apparatus so that at least a part of an area on the object that is measured by the measurement apparatus is irradiated with the energy beam.

7. The processing system according to claim 3, wherein the control apparatus calculates a positional relationship between an irradiation position of the energy beam and a measurement area of the measurement apparatus by using the first information and the second information.

8. The processing system according to claim 3, wherein the control apparatus allows the measurement apparatus to measure at least a part of an area on the object that is irradiated with the energy beam by using third information relating to an irradiation position of the energy beam in a movement coordinate system of the object placing apparatus and fourth information relating to a relationship between the movement coordinate system and a measurement area of the measurement apparatus.

9. The processing system according to claim 1, wherein the object placing apparatus is movable on a surface plate, and
the object placing apparatus is located on the surface plate when the light receiving apparatus optically receives the energy beam and when the measurement apparatus measures the light receiving apparatus.

10. The processing system according to claim 1, wherein the measurement apparatus has a first measurement apparatus having a first measurement range and a second measurement apparatus having a second measurement range that is different from the first measurement range.

11. The processing system according to claim 10, wherein the first measurement range is wider than the second measurement range, and
a measurement resolution of the second measurement apparatus is higher than a measurement resolution of the first measurement apparatus.

12. The processing system according to claim 1, wherein the processing system comprises a fiducial member that is measurable by the measurement apparatus.

13. The processing system according to claim 12, wherein the measurement apparatus corrects a measured result of the object by using a measured result of the fiducial member.

14. The processing system according to claim 12, wherein the fiducial member has an indicator that is measurable by the measurement apparatus.

15. The processing system according to claim 14, wherein the indicator is disposed at the light receiving apparatus, and
the light receiving apparatus optically receives the energy beam through the indicator.

16. The processing system according to claim 15, wherein the indicator has a light passing part through which the energy beam is allowed to pass.

17. The processing system according to claim 16, wherein the measurement apparatus is used to measure a position of the light passing part.

18. The processing system according to claim 1, wherein the light receiving apparatus optically receives the energy beam at a first position along an axis that intersects with a plane along which the object placing apparatus moves and optically receives the energy beam at a second position that is different from the first position along the axis.

19. The processing system according to claim 1, wherein the light receiving apparatus measures an intensity distribution of the energy beam in a plane along which the object placing apparatus moves or a plane that is parallel to the plane along which the object placing apparatus moves.

20. The processing system according to claim 1, wherein the reference part is on the object placing apparatus.

21. The processing system according to claim 1, wherein the reference part is a marker.

22. The processing system according to claim 1, wherein the control apparatus controls at least one of the position of the object placing apparatus at the time of the irradiation by the irradiation optical system and the position of the object placing apparatus at the time of the measurement by the measurement apparatus after the movement apparatus moved the object placing apparatus.

23. A processing method comprising:
irradiating, by an irradiation optical system, an object, which is placed on an object placing apparatus, with an energy beam from a light source;
optically receiving the energy beam from the irradiation optical system by using a light receiving apparatus that is disposed at the object placing apparatus;
measuring the object that is placed on the object placing apparatus by using a measurement apparatus;
moving the object placing apparatus to a position at which the light receiving apparatus is allowed to optically receive the energy beam from the irradiation optical system;
irradiating the light receiving apparatus with the energy beam while moving the object placing apparatus along a first direction;
irradiating the light receiving apparatus with the energy beam while moving the object placing apparatus along a second direction intersecting the first direction;
moving the object placing apparatus to a position at which the measurement apparatus is allowed to measure the light receiving apparatus; and
controlling at least one of the position of the object placing apparatus at a time of the irradiating by the irradiation optical system and the position of the object placing apparatus at a time of the measuring by the measurement apparatus by using (a) first information relating to the position of the object placing apparatus when the light receiving apparatus optically receives the energy beam that is acquired as a result of the energy beam being irradiated onto the light receiving apparatus while moving the object placing apparatus along each of the first and second directions, and (b) second information relating to the position of the object placing apparatus when the measurement apparatus measures at least a part of the light receiving apparatus.

24. The processing method according to claim 23, wherein
a shape of the object is measurable by using the measurement apparatus.

25. The processing method according to claim 23, wherein
the controlling includes controlling the movement apparatus to allow the measurement apparatus to measure an irradiation position on the object that is irradiated with the energy beam.

26. The processing method according to claim 23, wherein
the controlling includes controlling the movement apparatus so that at least a part of an area on the object that is measured by the measurement apparatus is irradiated with the energy beam.

27. The processing method according to claim 23, wherein
the controlling includes calculating a positional relationship between an irradiation position of the energy beam and a measurement area of the measurement apparatus by using the first information and the second information.

28. The processing method according to claim 23, wherein
the controlling includes allowing the measurement apparatus to measure at least a part of an area on the object that is irradiated with the energy beam by using third information relating to an irradiation position of the energy beam in a movement coordinate system of the object placing apparatus and fourth information relating to a relationship between the movement coordinate system and a measurement area of the measurement apparatus.

29. The processing method according to claim 23, wherein
the object placing apparatus is movable on a surface plate, and
the object placing apparatus is located on the surface plate when the light receiving apparatus optically receives the energy beam and when the measurement apparatus measures the light receiving apparatus.

30. The processing method according to claim 23, wherein
the measurement apparatus has a first measurement apparatus having a first measurement range and a second measurement apparatus having a second measurement range that is different from the first measurement range.

31. The processing method according to claim 30, wherein
the first measurement range is wider than the second measurement range, and
a measurement resolution of the second measurement apparatus is higher than a measurement resolution of the first measurement apparatus.

32. The processing method according to claim 23, further comprising:
measuring a fiducial member that is measurable by the measurement apparatus.

33. The processing method according to claim 32, further comprising:
correcting a measured result of the object by using a measured result of the fiducial member.

34. The processing method according to claim 33, wherein
the fiducial member has an indicator that is measurable by the measurement apparatus.

35. The processing method according to claim 34, wherein
the indicator is disposed at the light receiving apparatus, and
the light receiving apparatus optically receives the energy beam through the indicator.

36. The processing method according to claim 35, wherein
the indicator has a light passing part through which the energy beam is allowed to pass.

37. The processing method according to claim 36, wherein
  the measurement apparatus is used to measure a position of the light passing part.

38. The processing method according to claim 23, wherein
  the light receiving apparatus optically receives the energy beam at a first position along an axis that intersects with a plane along which the object placing apparatus moves and optically receives the energy beam at a second position that is different from the first position along the axis.

39. The processing method according to claim 23, wherein
  the light receiving apparatus measures an intensity distribution of the energy beam in a plane along which the object placing apparatus moves or a plane that is parallel to the plane along which the object placing apparatus moves.

* * * * *